United States Patent
Wang

(10) Patent No.: US 12,454,502 B2
(45) Date of Patent: Oct. 28, 2025

(54) SYNTHESIS OF DEUTERATED ALDEHYDES

(71) Applicant: ARIZONA BOARD OF REGENTS, Tucson, AZ (US)

(72) Inventor: Wei Wang, Tucson, AZ (US)

(73) Assignee: ARIZONA BOARD OF REGENTS ON BEHALF OF ATHE UNIVERSITY OF ARIZONA, Tucson, AZ (US)

( * ) Notice: Subject to any disclaimer, the term of this patent is extended or adjusted under 35 U.S.C. 154(b) by 768 days.

(21) Appl. No.: 17/639,750

(22) PCT Filed: Aug. 12, 2020

(86) PCT No.: PCT/US2020/045935
§ 371 (c)(1),
(2) Date: Mar. 2, 2022

(87) PCT Pub. No.: WO2021/045879
PCT Pub. Date: Mar. 11, 2021

(65) Prior Publication Data
US 2022/0356139 A1 Nov. 10, 2022

Related U.S. Application Data

(60) Provisional application No. 62/895,472, filed on Sep. 3, 2019.

(51) Int. Cl.
| | | |
|---|---|---|
| C07C 45/00 | (2006.01) |
| B01J 31/02 | (2006.01) |
| B01J 31/22 | (2006.01) |
| C07B 59/00 | (2006.01) |
| C07C 45/50 | (2006.01) |
| C07C 67/28 | (2006.01) |
| C07C 67/30 | (2006.01) |
| C07C 67/39 | (2006.01) |
| C07C 201/12 | (2006.01) |
| C07C 253/30 | (2006.01) |
| C07C 269/06 | (2006.01) |
| C07D 209/08 | (2006.01) |
| C07D 209/12 | (2006.01) |
| C07D 209/86 | (2006.01) |
| C07D 213/61 | (2006.01) |
| C07D 215/18 | (2006.01) |
| C07D 317/54 | (2006.01) |
| C07D 319/08 | (2006.01) |
| C07D 319/18 | (2006.01) |
| C07D 333/22 | (2006.01) |
| C07D 333/56 | (2006.01) |
| C07D 403/10 | (2006.01) |
| C07D 491/052 | (2006.01) |
| C07D 498/08 | (2006.01) |

(52) U.S. Cl.
CPC .......... *C07C 45/00* (2013.01); *B01J 31/0202* (2013.01); *B01J 31/0204* (2013.01); *B01J 31/0231* (2013.01); *B01J 31/0244* (2013.01); *B01J 31/0271* (2013.01); *B01J 31/2273* (2013.01); *C07B 59/001* (2013.01); *C07B 59/002* (2013.01); *C07B 59/005* (2013.01); *C07C 45/50* (2013.01); *C07C 67/28* (2013.01); *C07C 67/30* (2013.01); *C07C 67/39* (2013.01); *C07C 201/12* (2013.01); *C07C 253/30* (2013.01); *C07C 269/06* (2013.01); *C07D 209/08* (2013.01); *C07D 209/12* (2013.01); *C07D 209/86* (2013.01); *C07D 213/61* (2013.01); *C07D 215/18* (2013.01); *C07D 317/54* (2013.01); *C07D 319/08* (2013.01); *C07D 319/18* (2013.01); *C07D 333/22* (2013.01); *C07D 333/56* (2013.01); *C07D 403/10* (2013.01); *C07D 491/052* (2013.01); *C07D 498/08* (2013.01); *B01J 31/0247* (2013.01); *C07B 2200/05* (2013.01); *C07C 2601/14* (2017.05); *C07C 2601/16* (2017.05); *C07C 2602/42* (2017.05); *C07C 2603/24* (2017.05)

(58) Field of Classification Search
None
See application file for complete search history.

(56) References Cited

U.S. PATENT DOCUMENTS

| | | |
|---|---|---|
| 2011/0224431 A1 | 9/2011 | Rovis et al. |
| 2012/0142934 A1 | 6/2012 | Cheng et al. |

(Continued)

FOREIGN PATENT DOCUMENTS

| | | |
|---|---|---|
| CN | 103951568 A | 7/2014 |
| WO | 2007148141 A1 | 12/2007 |

(Continued)

OTHER PUBLICATIONS

Isbrandt, E. S. et al. "Catalytic Deuteration of Aldehydes with D2O"; Synlett 2017, 28, 2851-2854 and the Supporting Information pp. S1-S13 (Year: 2017).*

(Continued)

*Primary Examiner* — Medhanit W Bahta
(74) *Attorney, Agent, or Firm* — Michael Best & Fridrich LLP

(57) ABSTRACT

Described are methods for preparing a deuterated aldehyde using N-heterocyclic carbene catalysts in a solvent comprising $D_2O$. The methods may be used to convert a wide variety of aldehydes (e.g., aryl, alkyl, or alkenyl aldehydes) to C-1 deuterated aldehydes under mild reaction conditions without functionality manipulation.

23 Claims, 9 Drawing Sheets

(56) References Cited

U.S. PATENT DOCUMENTS

2014/0271537 A1 9/2014 Czarnik
2018/0140600 A1 5/2018 Li et al.

FOREIGN PATENT DOCUMENTS

WO 2012063085 A2 5/2012
WO 2012105667 A2 8/2012

OTHER PUBLICATIONS

PubChemI ("Phenylacetaldehyde", source Sigma-Aldrich, Deposit and available date Jul. 12, 2007) (Year: 2007).*
PubChemII ("CAS# 862095-91-8", source abcr GmbH, Deposit date May 7, 2016, Available date Aug. 2, 2016) (Year: 2016).*
Adcock, H. V., et al. Divergent C—H insertion-cyclization cascades of N-allyl ynamides. Angew. Chem. Int. Ed. 54, 15525-15529 (2015).
Aidouni, A., et al. "Facile microwave-assisted synthesis of cyclic amidinium salts." Journal of Combinatorial Chemistry 10.6 (2008): 886-892.
Atzrodt, J., et al. C—H Functionalization for hydrogen isotope exchange. Angew. Chem. Int. Ed. 57, 3022-3047 (2018).
Atzrodt, J., et al. Deuterium- and tritium-labelled compounds: Applications in the life sciences. Angew. Chem. Int. Ed. 57, 1758-1784 (2018).
Aycock, R. A., et al. "A practical and scalable system for heteroaryl amino acid synthesis." Chemical science 8.12 (2017): 7998-8003.
Aycock, R. A., et al. "Aminoalkyl radicals as powerful intermediates for the synthesis of unnatural amino acids and peptides." ACS Catalysis 8.10 (2018): 9115-9119.
Baldwin, J. E., et al. "Evidence for an insertion-homolysis mechanism for carbon-sulphur bond formation in penicillin biosynthesis." Journal of the Chemical Society, Chemical Communications 13 (1991): 856-858.
Baragwanath, L., et al. "Highly enantioselective benzoin condensation reactions involving a bifunctional protic pentafluorophenyl-substituted triazolium precatalyst." The Journal of Organic Chemistry 74.23 (2009): 9214-9217.
Bergin, E. Deoxygenative deuteration. Nat. Catal. 1, 898-898 (2018).
Bhatia, S. et al. "Stereoretentive H/D exchange via an electroactivated heterogeneous catalyst at sp3 C—H sites bearing amines or alcohols." European Journal of Organic Chemistry 2016.24 (2016): 4230-4235.
Bhawal, B. N. et al. Isodesmic reactions in catalysis—only the beginning? Isr. J. Chem. 58, 94-103 (2018).
Bottecchia, C. et al. "Photocatalytic modification of amino acids, peptides, and proteins." Chemistry—A European Journal 25.1 (2019): 26-42.
Breslow, R. On the mechanism of thiamine action. IV. evidence from studies on model systems. J. Am. Chem. Soc. 80, 3719-3726 (1958).
Bugaut, X. et al. "Organocatalytic umpolung: N-heterocyclic carbenes and beyond." Chemical Society Reviews 41.9 (2012): 3511-3522.
Burstein, C. et al. Organocatalyzed conjugate umpolung of α, β-unsaturated aldehydes for the synthesis of γ-butyrolactones. Angew. Chem. Int. Ed. 43, 6205-6208 (2004).
Cao, C., et al. "Green Synthesis of Alkane Bridged Bisimidazolium Salts Under Solvent-Free Conditions." Synthetic Communications 42.3 (2012): 380-387.
Capretz Agy, A., et al. "Palladium-Mediated Oxidative Annulation of δ-Indolyl-α, β-Unsaturated Compounds toward the Synthesis of Cyclopenta [b] indoles and Heterogeneous Hydrogenation to Access Fused Indolines." The Journal of Organic Chemistry 84.9 (2019): 5564-5581.
Cardinal-David, B., et al. Cooperative N-heterocyclic carbene/Lewis acid catalysis for highly stereoselective annulation reactions with homoenolates. J. Am. Chem. Soc. 132, 5345-5347 (2010).
Chandrasekhar, S. et al. "New Approaches to the Cannizzaro and Tishchenko Reactions." Synthetic Communications 39.24 (2009): 4473-4478.
Chang, C.-C., et al. "Antagonism of 4-substituted 1, 4-dihydropyridine-3, 5-dicarboxylates toward voltage-dependent L-type Ca2+ channels CaV1. 3 and CaV1. 2." Bioorganic & medicinal chemistry 18.9 (2010): 3147-3158.
Chatterjee, B. et al. "Selective a-deuteration of amines and amino acids using D2O." Organic letters 18.22 (2016): 5892-5895.
Choudary, B. M., et al. "A trifunctional catalyst for one-pot synthesis of chiral diols via heck Coupling-N-Oxidation-Asymmetric dihydroxylation: Application for the synthesis of diltiazem and taxol side chain." The Journal of organic chemistry 68.5 (2003): 1736-1746.
Church, N. et al. "Synthesis of the suicide substrate D-propargylglycine stereospecifically labelled with deuterium and investigation of its oxidation by D-amino acid oxidase 1." Journal of the Chemical Society, Perkin Transactions 19 (1998): 1475-1482.
Colbon, P., et al. "Double arylation of allyl alcohol via a one-pot Heck arylation-isomerization-acylation cascade." Organic letters 13.20 (2011): 5456-5459.
De Bruijn, A. D., et al. "Chemical modification of dehydrated amino acids in natural antimicrobial peptides by photoredox catalysis." Chemistry—A European Journal 24.44 (2018): 11314-11318.
Denard, C. A. et al. Cooperative tandem catalysis by an organometallic complex and a metalloenzyme. Angew. Chem. Int. Ed. 53, 465-469 (2014).
Dirocco, D. A., et al. "Catalytic asymmetric intermolecular Stetter reaction of heterocyclic aldehydes with hitroalkenes: Backbone fluorination improves selectivity." Journal of the American Chemical Society 131.31 (2009): 10872-10874.
Dubost, E., et al. "Palladium-Mediated Site-Selective C—H Radioiodination." Organic letters 20.19 (2018): 6302-6305.
Elemes, Y. et al. "Synthesis of enantiopure α-deuteriated Boc-L-amino acids." Journal of the Chemical Society, Perkin Transactions 1 6 (1996): 537-540.
Enders, D. et al. "Organocatalysis by N-heterocyclic carbenes." Chemical Reviews 107.12 (2007): 5606-5655.
Erkkilä, A. et al. "Iminium catalysis." Chemical Reviews 107.12 (2007): 5416-5470.
Ezzili, C., et al. "Reversible competitive α-ketoheterocycle inhibitors of fatty acid amide hydrolase containing additional conformational constraints in the acyl side chain: orally active, long-acting analgesics." Journal of medicinal chemistry 54.8 (2011): 2805-2822.
Faleev, N. G., et al. "Preparation of α-deuterated L-amino acids using E. coli B/It7-A cells containing tryptophanase." Tetrahedron letters 31.48 (1990): 7051-7054.
Fang, W., et al. "Novel robust benzimidazolylidene palladium complexes: synthesis, structure, and catalytic applications in amination of chloroarenes." Tetrahedron 69.2 (2013): 673-679.
Fang, X., et al. Catalytic reversible alkene-nitrile interconversion through controllable transfer hydrocyanation. Science 351, 832-836 (2016).
Fang, X., et al. CO- and HCl-free synthesis of acid chlorides from unsaturated hydrocarbons via shuttle catalysis. Nat. Chem. 9, 1105-1109 (2017).
Flanigan, D. M., et al. "Organocatalytic reactions enabled by N-heterocyclic carbenes." Chemical reviews 115.17 (2015): 9307-9387.
Frost, C. G., et al. "Tandem molybdenum catalyzed hydrosilylations: an expedient synthesis of β-aryl aldehydes." Organic Letters 9.21 (2007): 4259-4261.
Fujiwara, Y., et al. Method for regio-, chemo- and stereoselective deuterium labeling of sugars based on ruthenium-catalysed C—H bond activation. Chem. Commun. 46, 4977-4979 (2010).
Furuta, T. et al. "Evidence for a carbanion intermediate in the elimination of ammonia from L-histidine catalyzed by histidine ammonia-lyase." Journal of the American Chemical Society 112.9 (1990): 3633-3636.
Gant, T. G. "Using deuterium in drug discovery: leaving the label in the drug." Journal of medicinal chemistry 57.9 (2014): 3595-3611.

(56) References Cited

OTHER PUBLICATIONS

Gardner, K. H., et al. "Production and incorporation of 15N, 13C, 2H (1H-δ1 methyl) isoleucine into proteins for multidimensional NMR studies." Journal of the American Chemical Society 119.32 (1997): 7599-7600.
Ghosh, S., et al. "Hantzsch 1, 4-dihydropyridine synthesis in aqueous ethanol by visible light." Tetrahedron Letters 54.1 (2013): 58-62.
Hale, L. V. A. et al. Stereoretentive deuteration of α-chiral amines with D2O. J. Am. Chem. Soc. 138, 13489-13492 (2016).
Heppekausen, J., et al. Practical new silyloxy-based alkyne metathesis catalysts with optimized activity and selectivity profiles. J. Am. Chem. Soc. 132, 11045-11057 (2010).
Hilpert, L. J., et al. "Palladium-and Rhodium-Catalyzed Dynamic Kinetic Resolution of Racemic Internal Allenes Towards Chiral Pyrazoles." Angew. Chem. 2019, 131, 3416-3419.
Hirano, K., et al. "A modular synthesis of highly substituted imidazolium salts." Organic letters 11.4 (2009): 1019-1022.
Huang, H., et al. "Chemo-and regioselective organo-photoredox catalyzed hydroformylation of styrenes via a radical pathway." Journal of the American Chemical Society 139.29 (2017): 9799-9802.
Huang, H., et al. "Visible-Light-Promoted Nickel-and Organic-Dye-Cocatalyzed Formylation Reaction of Aryl Halides and Triflates and Vinyl Bromides with Diethoxyacetic Acid as a Formyl Equivalent." Angew. Chem. 2017, 129, 1522-1527.
Brahim, M. Y. S. et al. Palladium/rhodium cooperative catalysis for the production of aryl aldehydes and their deuterated analogues using the water-gas shift reaction. Angew. Chem. 2018, 130, 10519-10524.
Iglesias, M., et al. "Novel expanded ring N-heterocyclic carbenes: free carbenes, silver complexes, and structures." Organometallics 27.13 (2008): 3279-3289.
Ilies, L et al. "Iron-catalyzed chemo-and stereoselective hydromagnesiation of diarylalkynes and diynes." Journal of the American Chemical Society 134.41 (2012): 16951-16954.
International Preliminary Report on Patentability for Application No. PCT/US2020/045935 dated Mar. 8, 2022 (5 pages).
International Search Report and Written Opinion for Application No. PCT/US2020/045935 dated Nov. 24, 2020 (12 pages).
Isbrandt, E. S., et al. "Catalytic deuteration of aldehydes with D2O." Synlett 28.20 (2017): 2851-2854.
UPAC 1974 Recommendations for Section E, Fundamental Stereochemistry, in Pure Appl. Chem., 1976, 45: 13-30.
UPAC Gold Book. "Isodesmic Reaction". Compendium of Chemical Terminology, 2nd ed. (the "Gold Book"). Compiled by A. D. McNaught and A. Wilkinson. Blackwell Scientific Publications, Oxford (1997). Online version (2019-) created by S. J. Chalk. ,https://goldbook.iupac.org/html/l/103272.html> webpage available at least as early as Sep. 11, 2017.
Jacques, V., et al. "Differentiation of antiinflammatory and antitumorigenic properties of stabilized enantiomers of thalidomide analogs." Proceedings of the National Academy of Sciences 112.12 (2015): E1471-E1479.
Jere, F. T., et al. "Stereoretentive C—H bond activation in the aqueous phase catalytic hydrogenation of amino acids to amino alcohols." Organic Letters 5.4 (2003): 527-530.
Ji, P., et al. "Visible-light-mediated, chemo-and stereoselective radical process for the synthesis of C-glycoamino acids." Organic letters 21.9 (2019): 3086-3092.
Kampmeier, J. A., et al. "Intramolecular trapping of alkyl-and arylrhodium hydride intermediates in the decarbonylation of aldehydes by chlorotris (triphenylphosphine) rhodium." The Journal of Organic Chemistry 49.4 (1984): 621-625.
Kerr, M. S., et al. "An efficient synthesis of achiral and chiral 1, 2, 4-triazolium salts: bench stable precursors for N-heterocyclic carbenes." The Journal of organic chemistry 70.14 (2005): 5725-5728.
Kerr, W. J., et al. Iridium-catalyzed formyl-selective deuteration of aldehydes. Angew. Chem. Int. Ed. 56, 7808-7812 (2017).
Kitajima, M. et al. Asymmetric Total Synthesis of Novel Pentacyclic Indole Alkaloid, Kopsiyunnanine E, Isolated from Kopsia arborea Org. Lett. 2014, 16, 5000.
Koniarczyk, J. L., et al. "A general strategy for site-selective incorporation of deuterium and tritium into pyridines, diazines, and pharmaceuticals." Journal of the American Chemical Society 140.6 (2018): 1990-1993.
Kyan, R., et al. "Tuning the Catalyst Reactivity of Imidazolylidene Catalysts through Substituent Effects on the N-Aryl Groups." Organic letters 19.10 (2017): 2750-2753.
Lane, T. et al. "Iron-catalyzed formation of 2-aminopyridines from diynes and cyanamides." The Journal of organic chemistry 77.17 (2012): 7555-7563.
Lastra, E., et al. "Synthesis of compounds containing two adjacent carbon-13 labels by photolytic reactions of chromium carbene complexes." Journal of the American Chemical Society 115.1 (1993): 87-90.
Lee, J., et al. "Dynamic kinetic resolution of diarylmethanols with an activated lipoprotein lipase." ACS Catalysis 5.2 (2015): 683-689.
Leuthäußer, S., et al. "π-Face Donor Properties of N-Heterocyclic Carbenes in Grubbs II Complexes." Chemistry—A European Journal 14.18 (2008): 5465-5481.
Li, X. et al. One-pot synthesis of deuterated aldehydes from arylmethyl halides. Org. Lett. 20, 1712-1715 (2018).
Lian, L.-Y., et al. "Labelling approaches for protein structural studies by solution-state and solid-state NMR." Progress in Nuclear Magnetic Resonance Spectroscopy 3.39 (2001): 171-190.
Liang, X. et al. Efficient Brønsted-acid-catalyzed deuteration of arenes and their transformation to functionalized deuterated products. Asian J. Org. Chem. 6, 1063-1071 (2017).
Liu, F. et al. "Designing N-Heterocyclic Carbenes: Simultaneous Enhancement of Reactivity and Enantioselectivity in the Asymmetric Hydroacylation of Cyclopropenes." Angewandte Chemie International Edition 50.52 (2011): 12626-12630.
Liu, Q. et al. "Catalytic asymmetric intermolecular Stetter reaction of glyoxamides with alkylidenemalonates." Journal of the American Chemical Society 130.43 (2008): 14066-14067.
Loh, Y. Y. et al. Photoredox-catalyzed deuteration and tritiation of pharmaceutical compounds. Science 358, 1182-1187 (2017).
Ludwig, J. R., et al. Iron(III)-catalysed carbonyl-olefin metathesis. Nature, 533, 374-379 (2016).
Lygo, B. et al. "Enantioselective synthesis of α-carbon deuterium-labelled L-α-amino acids." Tetrahedron letters 43.37 (2002): 6677-6679.
Maegawa, T., et al. "Efficient and selective deuteration of phenylalanine derivatives catalyzed by Pd/C." Synlett 2005.05 (2005): 0845-0847.
Mahatthananchai, J. et al. On the mechanism of N-heterocyclic carbene-catalyzed reactions involving acyl azoliums. Acc. Chem. Res. 47, 696-707 (2014).
Maltais, F., et al. "In vitro and in vivo isotope effects with hepatitis C protease inhibitors: enhanced plasma exposure of deuterated telaprevir versus telaprevir in rats." Journal of medicinal chemistry 52.24 (2009): 7993-8001.
Mangold, S. L., et al. Z-Selective olefin metathesis on peptides: Investigation of side-chain influence, preorganization, and guidelines in substrate selection. J. Am. Chem. Soc. 136, 12469-12478 (2014).
Michelotti, A. et al. "40 Years of hydrogen-deuterium exchange adjacent to heteroatoms: a survey." Synthesis 51.06 (2019): 1319-1328.
Michelotti, A. et al. "Development and scale-up of stereoretentive α-deuteration of amines." Organic Process Research & Development 21.11 (2017): 1741-1744.
Milne, J. J., et al. "Enzymatic synthesis of α-deuterated amino acids." (1996): 133S-133S.
Mojtahedi, M. M., et al. Lithium bromide as a flexible, mild, and recyclable reagent for solvent-free Cannizzaro, Tishchenko, and Meerwein-Ponndorf-Verley reactions. Org. Lett., 9, 2791-2793 (2007).
Moozeh, K. et al. "Catalytic stereoinversion of L-alanine to deuterated D-alanine." Angewandte Chemie 127.32 (2015): 9513-9517.

(56) References Cited

OTHER PUBLICATIONS

Mukherjee, S. et al. "Cooperative catalysis: a strategy to synthesize trifluoromethyl-thioesters from aldehydes." ACS Catalysis 8.7 (2018): 5842-5846.
Mukherjee, S., et al. Asymmetric enamine catalysis. Chem. Rev. 107, 5471-5569 (2007).
Mullard, A. Deuterated drugs draw heavier backing. Nat. Rev. Drug Discovery 15, 219-221 (2016).
Murphy, S. K., et al. Rh-catalyzed C—C bond cleavage by transfer hydroformylation. Science 347, 56-60 (2015).
Muthukrishnan, S., et al. "Intramolecular H-atom abstraction in γ-azido-butyrophenones: formation of 1, 5 ketyl iminyl radicals." Organic Letters 11.11 (2009): 2345-2348.
Nagatomo, M., et al. "Et 3 B-mediated two-and three-component coupling reactions via radical decarbonylation of α-alkoxyacyl tellurides: single-step construction of densely oxygenated carboskeletons." Chemical science 6.5 (2015): 2765-2769.
Namitharan, K. et al. Metal and carbene organocatalytic relay activation of alkynes for stereoselective reactions. Nat. Commun. 5, 3982 (2014).
Oh, J.-S., et al. "Enantioselective synthesis of α-deuterium labelled chiral α-amino acids via dynamic kinetic resolution of racemic azlactones." Organic & Biomolecular Chemistry 9.23 (2011): 7983-7985.
Olsen, E. P. K., et al. Experimental and theoretical mechanistic investigation of the iridium-catalyzed dehydrogenative decarbonylation of primary alcohols. J. Am. Chem. Soc. 137, 834-842 (2015).
Phillips, E. M., et al. Discovering new reactions with N-heterocyclic carbene catalysis. Aldrichimica Acta 42, 55-66 (2009).
Piel, I., et al. "A Family of Thiazolium Salt Derived N-Heterocyclic Carbenes (NHCs) for Organocatalysis: Synthesis, Investigation and Application in Cross-Benzoin Condensation." (2011): 5475-5484.
Pirali, T., et al. Applications of deuterium in medicinal chemistry, J. Med. Chem. 62, 5276-5297 (2019).
Puleo, T. R., et al. Catalytic a-selective deuteration of styrene derivatives. J. Am. Chem. Soc. 141, 1467-1472 (2019).
Raap, J, et al. "Synthesis of isotopically labelled L-phenylalanine and L-tyrosine." European journal of organic chemistry Oct. 1999 (1999): 2609-2621.
Ren, Q., et al. Recent advances in N-heterocyclic carbene catalyzed achiral synthesis. Org. Biomol. Chem. 15, 1731-4749 (2017).
Roche, S. P., et al. "Synthesis of 1, 2 diamines under environmentally benign conditions: application for the preparation of imidazolidiniums." Tetrahedron Letters 51.9 (2010): 1265-1268.
Romanov-Michailidis, F. et al. "N-Heterocyclic carbene-catalyzed annulation of α-cyano-1, 4-diketones with ynals." Organic letters 14.18 (2012): 4906-4909.
Rose, J.E., et al. "Mechanisms and stereochemistry of the activation of (2 S)-and (2 R)-serine O-sulfate as suicide Inhibitors for *Escherichia coli* glutamic acid decarboxylase." Journal of the Chemical Society, Chemical Communications 24 (1992): 1784-1786.
Rose, J.E., et al. "Stereospecific synthesis of α-deuteriated α-amino acids: regiospecific deuteriation of chiral 3-isopropyl-2, 5-dimethoxy-3, 6-dihydropyrazines." Journal of the Chemical Society, Perkin Transactions 1 2 (1995): 157-165.
Rossolini, T., et al. "Photocatalytic three-component umpolung synthesis of 1, 3-diamines." Organic letters 20.21 (2018): 6794-6798.
Sack, I., et al. "Solid-state NMR determination of peptide torsion angles: Applications of H-2-dephased REDOR." Journal of the American Chemical Society 122.49 (2000): 12263-12269.
Sattler, A. Hydrogen/deuterium (H/D) exchange catalysis in alkanes. ACS Catal. 8, 2296-2312 (2018).
Schmidt, C. First deuterated drug approved. Nat. Biotechnol. 35, 493-494 (2017).
Shang, Y., et al. "Dehydrogenative desaturation-relay via formation of multicenter-stabilized radical intermediates." Nature communications 8.1 (2017): 1-8.
Shi, X.-X., et al. "Highly stereoselective Pictet-Spengler reaction of d-tryptophan methyl ester with piperonal: convenient syntheses of Cialis (Tadalafil), 12a-epi-Cialis, and their deuterated analogues." Tetrahedron: Asymmetry 19.4 (2008): 435-442.
Shirakawa, E., et al. "Iron-Copper Cooperative Catalysis in the Reactions of Alkyl Grignard Reagents: Exchange Reaction with Alkenes and Carbometalation of Alkynes." Journal of the American Chemical Society 134.1 (2012): 272-279.
Sim, J. et al. "Synthesis of α-fluoro-α-amino acid derivatives via photoredox-catalyzed carbofluorination." ACS catalysis 9.2 (2019): 1558-1563.
Simmons, E. M., et al. (2012). On the Interpretation of Deuterium Kinetic Isotope Effects in C□H Bond Functionalizations by Transition-Metal Complexes. Angewandte Chemie International Edition, 51(13), 3066-3072.
Sohn, S. S., et al. "Catalytic generation of activated carboxylates from enals: a product-determining role for the base." Organic Letters 7.18 (2005): 3873-3876.
Sohn, S. S., et al. N-Heterocyclic carbene-catalyzed generation of homoenolates: γ-butyrolactones by direct annulations of enals and aldehydes. J. Am. Chem. Soc. 126, 14370-14371 (2004).
Spletstoser, J. T., et al. Mild and selective hydrozirconation of amides to aldehydes using Cp2Zr(H)CI: scope and mechanistic insight. J. Am. Chem. Soc. 129, 3408-3419 (2007).
Spletstoser, J. T., et al. One-step facile synthesis of deuterium labeled aldehydes from tertiary amides using Cp2Zr(D)CI. Tetrahedron Lett. 45, 2787-2789 (2004).
Stevenson, D. E., et al. "Structural and stereochemical studies of methiomine decarboxylase from dryopteris felix-mas." Tetrahedron letters 27.46 (1986): 5661-5664.
Taglang, C., et al. "Enantiospecific CH Activation Using Ruthenium Nanocatalysts." Angewandte Chemie (International ed. in English) 54.36 (2015): 10474-10477.
Taglang, C., et al. "Late-stage deuteration of 13 C-enriched substrates for T 1 prolongation in hyperpolarized 13 C MRI." Chemical Communications 54.41 (2018): 5233-5236.
Takeda, R., et al. "Asymmetric synthesis of α-deuterated α-amino acids." Organic & Biomolecular Chemistry 15.33 (2017): 6978-6983.
Takikawa, H. et al. "Modified chiral triazolium salts for enantioselective benzoin cyclization of enolizable keto-aldehydes: Synthesis of (+)-Sappanone B." Organic Letters 9.14 (2007): 2713-2716.
Tang, P. et al. "Deoxyfluorination of phenols." Journal of the American Chemical Society 133.30 (2011): 11482-11484.
Taylor, PJM, et al. "An improved synthesis of deuterated Schollkopf's bis-lactim ether and its use for the asymmetric synthesis of (R)-[α-2H]-phenylalanine methyl esters." Tetrahedron: Asymmetry 17.8 (2006): 1170-1178.
Türkmen, H. et al. "1, 3-Diarylimidazolidin-2-ylidene (NHC) complexes of Pd (II): Electronic effects on cross-coupling reactions and thermal decompositions." Journal of organometallic chemistry 691. 18 (2006): 3749-3759.
Valdés, H., et al. "Experimental and Theoretical Approaches to the Influence of the Addition of Pyrene to a Series of Pd and Ni NHC-Based Complexes: Catalytic Consequences." Chemistry—A European Journal 21.4 (2015): 1578-1588.
Valero, M., et al. Highly selective directed iridium-catalyzed hydrogen isotope exchange reactions of aliphatic amides. Angew. Chem. Int. Ed. 57, 8159-8163 (2018).
Verho, O. et al. Chemoenzymatic dynamic kinetic resolution: a powerful tool for the preparation of enantiomerically bure alcohols and amines. J. Am. Chem. Soc. 137, 3996-4009 (2015).
Wang, X. et al General and practical potassium methoxide/disilane-mediated dehalogenative deuteration of (hetero) arylhalides. J. Am. Chem. Soc. 140, 10970-10974 (2018).
Wong, C. H. et al. "Enzyme-catalyzed organic synthesis: regeneration of deuterated nicotinamide cofactors for use in large-scale enzymatic synthesis of deuterated substances." Journal of the American Chemical Society 105.15 (1983): 5012-5014.
Xiao, J., et al. "Hexahydropyrrolo [2, 3-b] indoles: A New Class of Structurally Rigid Tricyclic Skeleton for Oxazaborolidine-Catalyzed Asymmetric Borane Reduction." Advanced Synthesis & Catalysis 352.7 (2010): 1107-1112.
Yamada, S.-i., et al "Optical resolution of a 1, 5-benzothiazepine derivative, a synthetic intermediate of diltiazem, by preferential

(56) References Cited

OTHER PUBLICATIONS crystallization and diastereomeric salt formation." Chemical and pharmaceutical bulletin 45.12 (1997): 1922-1927.
Yamamoto, T., et al. "Synthesis and configurational stability of (S)-and (R)-deuteriothalidomides." Chemical and pharmaceutical bulletin 58.1 (2010): 110-112.
Yang, J. in Deuterium: Discovery and Applications in Organic Chemistry, Elsevier, Amsterdam, 2016, pp. 83-92; 99-110.
Yu, R. P., et al. Iron-catalysed tritiation of pharmaceuticals. Nature 529, 195-199 (2016).
Zhang, M., et al. "Deoxygenative deuteration of carboxylic acids with D2O." Angewandte Chemie 131.1 (2019): 318-322.
Zhang, W. et al. Shape-persistent macrocycles: Structures and synthetic approaches from arylene and ethynylene building blocks. Angew. Chem. Int. Ed. 45, 4416-4439 (2006).
Zhang, Y., et al. "Organocatalytic transformation of aldehydes to thioesters with visible light." Chemistry—A European Journal 25.35 (2019): 8225-8228.
Zheng, Y., et al. "Octahedral ruthenium complex with exclusive metal-centered chirality for highly effective asymmetric catalysis." Journal of the American Chemical Society 139.12 (2017): 4322-4325.
Zhou, R., et al. "Visible-light-mediated deuteration of silanes with deuterium oxide." Chemical science 10.31 (2019): 7340-7344.

\* cited by examiner

Indirect approach

Using deuterated reductive reagents

Using D$_2$O as deuterium source but only working with arylaldehydes

Direct approach: Metal-catalyzed H-D exchange using D$_2$/D$_2$O, but only working with arylaldehydes only working with arylaldehydes D₂O cycle 1, Y/D 85/98
D₂O cycle 2, Y/D 90/98
D₂O cycle 3, Y/D 91/95

SYNTHESIS OF DEUTERATED ALDEHYDES

CROSS-REFERENCE TO RELATED APPLICATION(S)

This application is a U.S. national stage entry of International Patent Application No. PCT/US2020/045935, filed on Aug. 12, 2020, which claims the benefit of and priority to U.S. Provisional Patent Application No. 62/895,472, filed on Sep. 3, 2019, the entire contents of each of which are hereby incorporated by reference.

STATEMENT OF GOVERNMENT INTEREST

This invention was made with government support under Grant No. R01 GM125920, awarded by National Institutes of Health. The government has certain rights in the invention.

BACKGROUND

The recent surge in applications of deuterated pharmaceutical agents, including the FDA approval of the first deuterated drug, Austedo (deutetrabenazine) in 2017, has created an urgent demand for synthetic methods that efficiently generate deuterated building blocks. As one of the most widely utilized substances in synthesis, aldehydes serve as a synthetic linchpin enabling quick access to a wide array of fascinating and structurally diverse deuterated building blocks and to biologically important molecular architectures. Traditionally, deuterated aldehydes are produced from esters or amides by using reduction and/or oxidation sequences. Although these reagents can be employed to prepare both deuterated aromatic and aliphatic aldehydes, their high cost restricts their broad use. Other recent approaches to prepare deuterated aldehydes, such as functional group manipulation or hydrogen-deuterium exchange (HDE) catalysed by Ir or Ru, may involve intrinsic difficulties in controlling reactivity, non-selective deuteration, and/or high cost. Clearly, an urgent need exists for the development of a new processes that tolerate all types of aldehydes and is capable of achieving useful levels of deuterium incorporation (>95%).

SUMMARY OF THE INVENTION

In one aspect, the present disclosure relates to method for preparing a deuterated aldehyde of formula

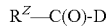

wherein
$R^Z$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^a$, and $R^Z$ is optionally deuterated;
$R^a$ at each occurrence is independently halogen, —CN, —OH, nitro, —O-benzyl, —NH(t-butoxycarbonyl), —NH(benzyloxycarbonyl), alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl, wherein the alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl is optionally substituted;

the method comprising:
contacting an aldehyde of formula

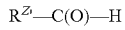

with an N-heterocyclic carbene catalyst in a solvent comprising $D_2O$, thereby producing the deuterated aldehyde,
wherein $R^{Z'}$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^b$;
$R^b$ at each occurrence is independently halogen, —CN, —OH, nitro, —O-benzyl, —NH(t-butoxycarbonyl), —NH(benzyloxycarbonyl), alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl, wherein the alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl is optionally substituted.

In some embodiments, the the N-heterocyclic carbene catalyst is a compound of formula (I)

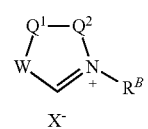

wherein
W is S or $NR^A$
$Q^1$ is $CR^C$ or N;
$Q^2$ is $CR^D$ or N; or
$Q^1$-$Q^2$ is $CR^{x1}R^{y1}$—$CR^{x2}R^{y2}$;
$R^A$ and $R^B$ are each independently an optionally substituted alkyl, an optionally substituted cycloalkyl, an optionally substituted aryl, an optionally substituted heteroaryl, or an optionally substituted heterocyclyl;
$R^C$, and $R^D$ are each independently hydrogen, an optionally substituted alkyl, an optionally substituted cycloalkyl, an optionally substituted aryl, an optionally substituted heteroaryl, or an optionally substituted heterocyclyl;
$R^A$ and $R^C$, $R^B$ and $R^D$, and/or $R^C$ and $R^D$ alternatively together with the N or C atoms they are attached to form a ring;
$R^B$ alternatively is an alkylene forming a dimer;
$R^{x1}$, $R^{y1}$, $R^{x2}$, and $R^{y2}$ are each independently hydrogen or alkyl; and
$X^-$ is counter ion.

BRIEF DESCRIPTION OF THE DRAWINGS

FIG. 1A shows indirect approaches involving transformations of different functional groups to deuterated aldehydes. FIG. 1B shows direct approach employing transition metal catalyzed hydrogen-deuterium exchange of aromatic formyl groups. FIG. 1C shows a representative process of the present disclosure using organocatalytic direct hydrogen-deuterium exchange of the aromatic, aliphatic and α, β-unsaturated formyl group.

3A shows representative results of NHC catalysed HDE with model aromatic aldehyde and representative catalysts. FIG. 3B shows representative results of NHC catalysed HDE with a variety of aromatic aldehydes. Unless specified, catalyst 5o is used. For products 7j, 7z, 7ad, 7ao, 7av-7ax, 7bd, and 7bf, 7bg, and 7i and 7bh-7bi, catalysts 5m, 5ag, and 5l, are used, respectively. Y refers to isolated yields of deuterated products. It is noted that protium aldehyde starting materials are completely converted in these reactions and the major side products arise from benzoin condensation, and D refers to D-incorporation percentages based on the calculation described herein.

DETAILED DESCRIPTION

Figure 1A:
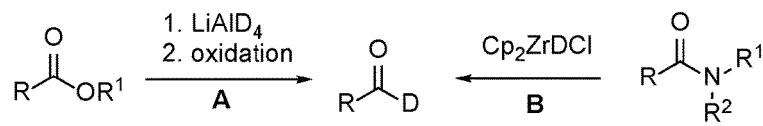
FIGS. 1A-1C show different methods for the synthesis of deuterated aldehydes.
Figure 1A:
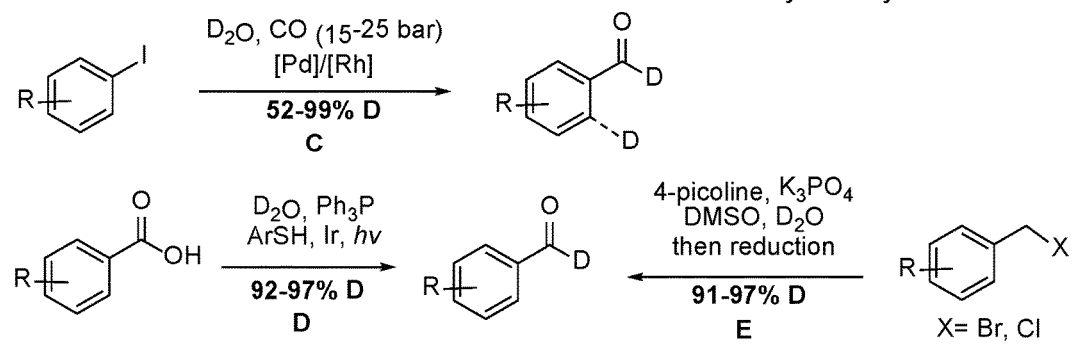

The present relates to the use of N-heterocyclic carbenes (NHC) to promote a reversible hydrogen-deuterium exchange (HDE) reaction with aldehydes, which may lead to a practical approach to synthetically valued C-1 deuterated aldehydes. The process disclosed herein may be used to directly convert aldehydes to C-1 deuterated counterparts using cheap, safe and operationally convenient $D_2O$ as the deuterium source under mild reaction conditions without requiring additional functionality manipulation and with minimal byproduct production. In particular embodiments, the reactivity of the well-established NHC catalysed formation of Breslow intermediates from aldehydes may be reengineered to overcome the overwhelmingly kinetically favorable, irreversible benzoin condensation reaction and achieve the critical reversibility to drive the formation of desired deuterated products when an excess of $D_2O$ is employed. Remarkably, this operationally simple and cost-effective process disclosed herein may serve as a general and truly practical approach to a wide variety of 1-D-aldehydes including aryl, alkyl and alkenyl aldehydes, which are difficult to access by existing methods. Further, the process disclosed herein may remarkably enable chemoselective late-stage deuteration of complex, native therapeutic agents and natural products with uniformly high levels of deuterium incorporation (>95% for a total of 104 substrates probed).

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5th Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3rd Edition, Cambridge University Press, Cambridge, 1987; the entire contents of each of which are incorporated herein by reference.

The term "alkoxy" as used herein, refers to an alkyl group, as defined herein, appended to the parent molecular moiety through an oxygen atom. Representative examples of alkoxy include, but are not limited to, methoxy, ethoxy, propoxy, 2-propoxy, butoxy and tert-butoxy.

The term "alkyl" as used herein, means a straight or branched, saturated hydrocarbon chain containing from 1 to 20 carbon atoms. The term "lower alkyl" or "$C_{1-6}$alkyl" means a straight or branched chain hydrocarbon containing from 1 to 6 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl.

The term "alkenyl" as used herein, means an unsaturated hydrocarbon chain containing from 2 to 20 carbon atoms and at least one carbon-carbon double bond.

The term "alkynyl" as used herein, means an unsaturated hydrocarbon chain containing from 2 to 20 carbon atoms and at least one carbon-carbon triple bond.

The term "alkylene", as used herein, refers to a divalent group derived from a straight or branched chain hydrocarbon of 1 to 10 carbon atoms, for example, of 2 to 5 carbon atoms. Representative examples of alkylene include, but are not limited to, —CH$_2$CH$_2$—, —CH$_2$CH$_2$CH$_2$—, —CH$_2$CH$_2$CH$_2$CH$_2$—, and —CH$_2$CH$_2$CH$_2$CH$_2$CH$_2$—.

The term "aryl" as used herein, refers to a phenyl group, or a bicyclic fused ring system. Bicyclic fused ring systems are exemplified by a phenyl group appended to the parent molecular moiety and fused to a cycloalkyl group, as defined herein, a phenyl group, a heteroaryl group, as defined herein, or a heterocycle, as defined herein. Representative examples of aryl include, but are not limited to, indolyl, naphthyl, phenyl, quinolinyl and tetrahydroquinolinyl.

The term "haloalkyl" as used herein, means an alkyl group, as defined herein, in which one, two, three, four, five, six, seven or eight hydrogen atoms are replaced by a halogen. Representative examples of haloalkyl include, but are not limited to, 2-fluoroethyl, 2,2,2-trifluoroethyl, trifluoromethyl, difluoromethyl, pentafluoroethyl, and trifluoropropyl such as 3,3,3-trifluoropropyl.

The term "cycloalkyl" as used herein, means a monovalent group derived from an all-carbon ring system containing zero heteroatoms as ring atoms, and zero double bonds. The all-carbon ring system can be a monocyclic, bicylic, or tricyclic ring system, and can be a fused ring system, a bridged ring system, or a spiro ring system, or combinations thereof. Examples of cycloalkyls include, but are not limited to, cyclopropyl, cyclobutyl, cyclopentyl, cyclohexyl, cycloheptyl, cyclooctyl, and

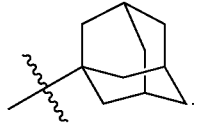 [SMILES: *C12CC3CC(CC(C3)C1)C2]

The cycloalkyl groups described herein can be appended to the parent molecular moiety through any substitutable carbon atom.

The term "cycloalkenyl" as used herein, means a non-aromatic monocyclic or multicyclic ring system containing at least one carbon-carbon double bond and preferably having from 5-10 carbon atoms per ring. Exemplary monocyclic cycloalkenyl rings include cyclopentenyl, cyclohexenyl or cycloheptenyl.

The term "halogen" as used herein, means Cl, Br, I, or F.

The term "heteroaryl" as used herein, refers to an aromatic monocyclic ring or an aromatic bicyclic ring system or an aromatic tricyclic ring system. The aromatic monocyclic rings are five or six membered rings containing at least one heteroatom independently selected from the group consisting of N, O, and S (e.g. 1, 2, 3, or 4 heteroatoms independently selected from O, S, and N). The five membered aromatic monocyclic rings have two double bonds and the six membered six membered aromatic monocyclic rings have three double bonds. The bicyclic heteroaryl groups are exemplified by a monocyclic heteroaryl ring appended to the parent molecular moiety and fused to a monocyclic cycloalkyl group, as defined herein, a monocyclic aryl group, as defined herein, a monocyclic heteroaryl group, as defined herein, or a monocyclic heterocycle, as defined herein. The tricyclic heteroaryl groups are exemplified by a monocyclic heteroaryl ring appended to the parent molecular moiety and fused to two of a monocyclic cycloalkyl group, as defined herein, a monocyclic aryl group, as defined herein, a monocyclic heteroaryl group, as defined herein, or a monocyclic heterocycle, as defined herein. Representative examples of monocyclic heteroaryl include, but are not limited to, pyridinyl (including pyridin-2-yl, pyridin-3-yl, pyridin-4-yl), pyrimidinyl, pyrazinyl, thienyl, furyl, thiazolyl, thiadiazolyl, isoxazolyl, pyrazolyl, and 2-oxo-1,2-dihydropyridinyl. Representative examples of bicyclic heteroaryl include, but are not limited to, chromenyl, benzothienyl, benzodioxolyl, benzotriazolyl, quinolinyl, thienopyrrolyl, thienothienyl, imidazothiazolyl, benzothiazolyl, benzofuranyl, indolyl, quinolinyl, imidazopyridine, benzooxadiazolyl, and benzopyrazolyl. Representative examples of tricyclic heteroaryl include, but are not limited to, dibenzofuranyl and dibenzothienyl. The monocyclic, bicyclic, and tricyclic heteroaryls are connected to the parent molecular moiety through any carbon atom or any nitrogen atom contained within the rings.

The term "heterocycle" or "heterocyclic" as used herein, means a monocyclic heterocycle, a bicyclic heterocycle, or a tricyclic heterocycle. The monocyclic heterocycle is a three-, four-, five-, six-, seven-, or eight-membered ring containing at least one heteroatom independently selected from the group consisting of O, N, and S. The three- or four-membered ring contains zero or one double bond, and one heteroatom selected from the group consisting of O, N, and S. The five-membered ring contains zero or one double bond and one, two or three heteroatoms selected from the group consisting of O, N and S. The six-membered ring contains zero, one or two double bonds and one, two, or three heteroatoms selected from the group consisting of O, N, and S. The seven- and eight-membered rings contains zero, one, two, or three double bonds and one, two, or three heteroatoms selected from the group consisting of O, N, and S. Representative examples of monocyclic heterocycles include, but are not limited to, azetidinyl, azepanyl, aziridinyl, diazepanyl, 1,3-dioxanyl, 1,3-dioxolanyl, 1,3-dithiolanyl, 1,3-dithianyl, 1,3-dimethylpyrimidine-2,4(1H,3H)-dione, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, oxetanyl, piperazinyl, piperidinyl, pyranyl, pyrazolinyl, pyrazolidinyl, pyrrolinyl, pyrrolidinyl, tetrahydrofuranyl, tetrahydropyranyl, tetrahydropyridinyl, tetrahydrothienyl, thiadiazolinyl, thiadiazolidinyl, 1,2-thiazinanyl, 1,3-thiazinanyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to a phenyl group, or a monocyclic heterocycle fused to a monocyclic cycloalkyl, or a monocyclic heterocycle fused to a monocyclic cycloalkenyl, or a monocyclic heterocycle fused to a monocyclic heterocycle, or a spiro heterocycle group, or a bridged monocyclic heterocycle ring system in which two non-adjacent atoms of the ring are linked by an alkylene bridge of 1, 2, 3, or 4 carbon atoms, or an alkenylene bridge of two, three, or four carbon atoms. Representative examples of bicyclic heterocycles include, but are not limited to, benzopyranyl, benzothiopyranyl, chromanyl, 2,3-dihydrobenzofuranyl, 2,3-dihydrobenzothienyl, 2,3-dihydroisoquinoline, 2-azaspiro[3.3] heptan-2-yl, azabicyclo[2.2.1]heptyl (including 2-azabicyclo[2.2.1]hept-2-yl), 2,3-dihydro-1H-indolyl, isoindolinyl, octahydrocyclopenta[c]pyrrolyl, octahydropyrrolopyridinyl, and tetrahydroisoquinolinyl. Tricyclic heterocycles are exemplified by a bicyclic heterocycle fused to a phenyl group, or a bicyclic heterocycle fused to a monocyclic cycloalkyl, or a bicyclic heterocycle fused to a monocyclic cycloalkenyl, or a bicyclic heterocycle fused to a monocyclic heterocycle, or a bicyclic heterocycle in which two non-adjacent atoms of the bicyclic ring are linked by an alkylene bridge of 1, 2, 3, or 4 carbon atoms, or an alkenylene bridge of two, three, or four carbon atoms. Examples of tricyclic heterocycles include, but are not limited to, octahydro-2,5-epoxypentalene, hexahydro-2H-2,5-methanocyclopenta[b]furan, hexahydro-1H-1,4-methanocyclopenta[c]furan, aza-adamantane (1-azatricyclo[3.3.1.1$^{3,7}$]decane), and oxa-adamantane (2-oxatricyclo[3.3.1.1$^{3,7}$] decane). The monocyclic, bicyclic, and tricyclic heterocycles are connected to the parent molecular moiety through any carbon atom or any nitrogen atom contained within the rings.

In some instances, the number of carbon atoms in a hydrocarbyl substituent (e.g., alkyl or cycloalkyl) is indicated by the prefix "$C_{x-y}$" or "$C_x$-$C_y$—", wherein x is the minimum and y is the maximum number of carbon atoms in the substituent. Thus, for example, "$C_{1-4}$alkyl" or "$C_1$-$C_4$-alkyl" refers to an alkyl substituent containing from 1 to 4 carbon atoms.

The molecules and substituent groups as described herein are not deuterated, unless explicitly indicated otherwise. The term "deuterated" as used herein refers to a molecule or substituent group in which 1, 2, 3, 4, 5, 6, 7, or 8 hydrogen atoms are replaced by deuterium.

The term "N-heterocyclic carbene catalyst" refers to a heterocyclic compound, or a salt thereof, that has at least one nitrogen and a carbene carbon (C:) as members of the heterocyclic ring.

The term "level of deuterium incorporation" as used herein refers to the extent of deuterium labeling as determined by $^1$H NMR spectroscopy, and is measured by percentage deuteration as shown in Equation 1.

$$\% \text{ Deuteration} = 100 - \left[\left(\frac{\text{residual integral}}{\text{number of labelling sites}}\right) \times 100\right] \quad \text{Equation 1}$$

For compounds described herein, groups and substituents thereof may be selected in accordance with permitted valence of the atoms and the substituents, such that the selections and substitutions result in a stable compound, e.g., which does not spontaneously undergo transformation such as by rearrangement, cyclization, elimination, etc.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated

2. Method

Figure 1B:
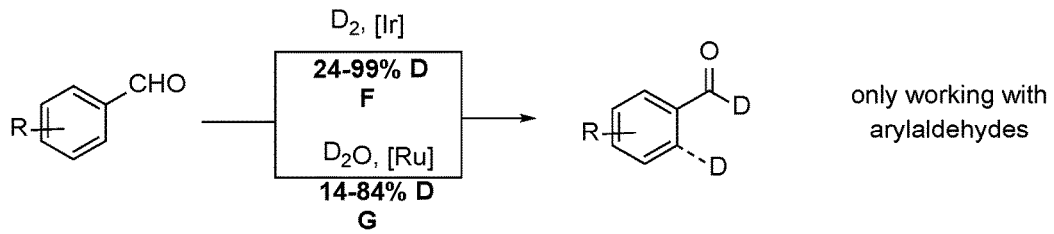

Traditionally, deuterated aldehydes are produced from esters (FIG. 1A, reaction A) or amides (reaction B) by using reduction and/or oxidation sequences. Although these reagents can be employed to prepare both deuterated aromatic and aliphatic aldehydes, their high cost restricts their broad use. Recently, several approaches were reported for the synthesis of aromatic deuterated aldehydes from the corresponding aryl iodides (reaction C), carboxylic acids (reaction D), or benzyl halides (reaction E). High yielding hydrogen-deuterium exchange (HDE) processes catalysed by Ir (FIG. 1B, reaction F, $D_2$ as deuterium source) or Ru (reaction G, $D_2O$ as deuterium source) were developed to produce deuterated aromatic aldehydes directly without the need for functional group manipulation. However, it is recognized that an intrinsic difficulty exists in controlling reactivity (reactions C and F), which often cause accompanying non-selective deuteration of aromatic rings. Furthermore, these protocols only resulted in moderate degrees of D-incorporation (14-84%) and their use is restricted to aromatic aldehydes.

Figure 1C:
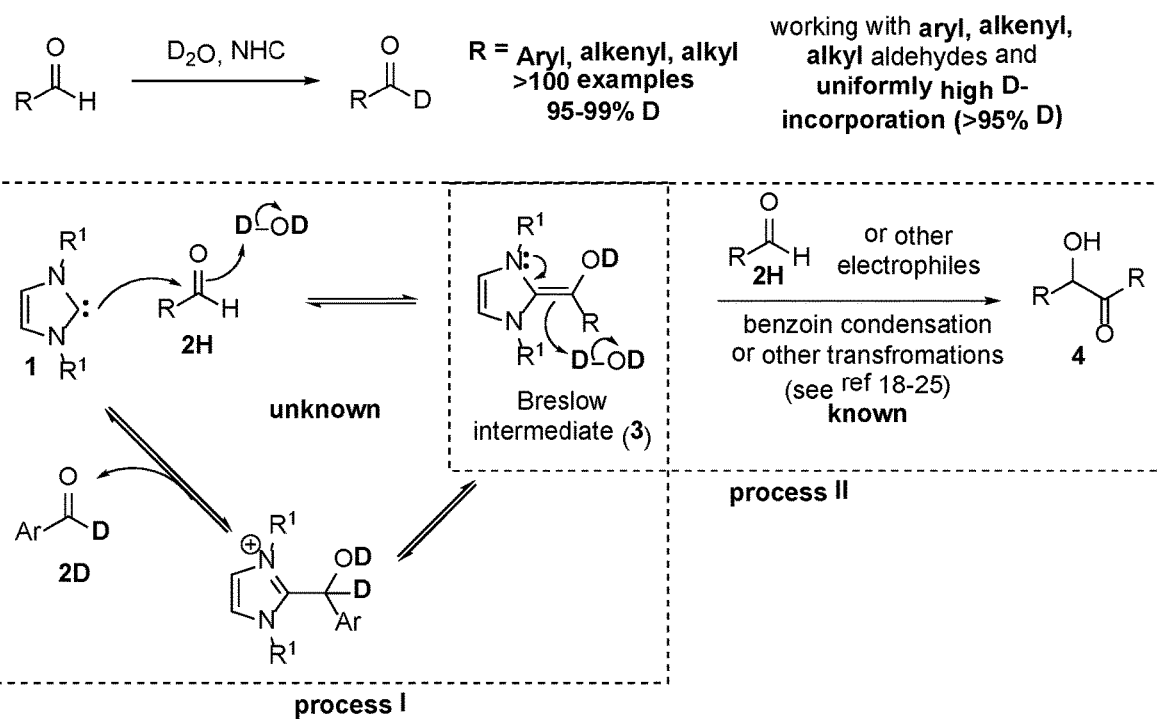

Kinetically controlled, irreversible reactions have dominated in organic synthesis. In contrast, reversible reactions have been much less studied, probably because the surmountable energy barriers for the forward and reverse reaction present the daunting challenge in controlling the selectivity. This is particularly problematic for isodesmic reactions, in which all bonds broken in the reactants are reformed in the products. However, this strategy may provide opportunities for developing unique transformations that are difficult to be achieved by traditional, irreversible approaches. The present disclosure demonstrates that organocatalytic N-heterocyclic carbenes (NHC) may promote isodesmic hydrogen-deuterium exchange (HDE) reactions with a wide variety of aldehydes, including aryl, alkyl and alkenyl aldehydes (FIG. 1C). This process may directly convert aldehydes to C-1 deuterated counterparts using cheap, safe and operationally convenient $D_2O$ as the deuterium source under mild reaction conditions without requiring additional functionality manipulation and with minimal byproduct production.

Without being limited by any theory, it is hypothesized that Breslow intermediates may be redirected to create a novel isodesmic HDE process for transforming readily accessible aldehydes into their 1-D-analogs. Specifically, a reaction of an aldehyde with an NHC carried out in $D_2O$ may reversibly produce the deuterated Breslow intermediate 3 (Process I) and that 3 may react with $D_2O$ to produce the desired deuterated aldehyde 2D with concurrent regeneration of the catalyst. Driving the reversible reaction towards the desired product 2D may be achieved by the formation of more stable C-D bond (bond energy of C-D as 341.4 kJ/mol and C—H as 338 kJ/mol) and by employing a large access amount of $D_2O$. Under specific circumstances, the thermodynamic process may be complicated by the existence of competitive, kinetically favored benzoin condensation reaction that is known to occur under the reaction conditions (Process II). In particular, the HDE reactions of electron-withdrawing group (EWG) substituted aromatic aldehydes may be more prone to undergo condensation reactions with Breslow intermediates (e.g., 4).

In one aspect, the present disclosure relates to a a deuterated aldehyde of formula,

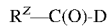

wherein
$R^Z$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^a$, and $R^Z$ is optionally deuterated;
$R^a$ at each occurrence is independently halogen, —CN, —OH, nitro, —O-benzyl, —NH(t-butoxycarbonyl), —NH(benzyloxycarbonyl), alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl, wherein the alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl is optionally substituted;

the method comprising:

contacting an aldehyde of formula

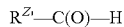

with an N-heterocyclic carbene catalyst in a solvent comprising D$_2$O, thereby producing the deuterated aldehyde, wherein R$^{Z1}$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more R$^b$;

R$^b$ at each occurrence is independently halogen, —CN, —OH, nitro, —O-benzyl, —NH(t-butoxycarbonyl), —NH(benzyloxycarbonyl), alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl, wherein the alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl is optionally substituted.

In some embodiments, R$^Z$ is an optionally substituted aryl or an optionally substituted heteroaryl. For example, R$^Z$ may be

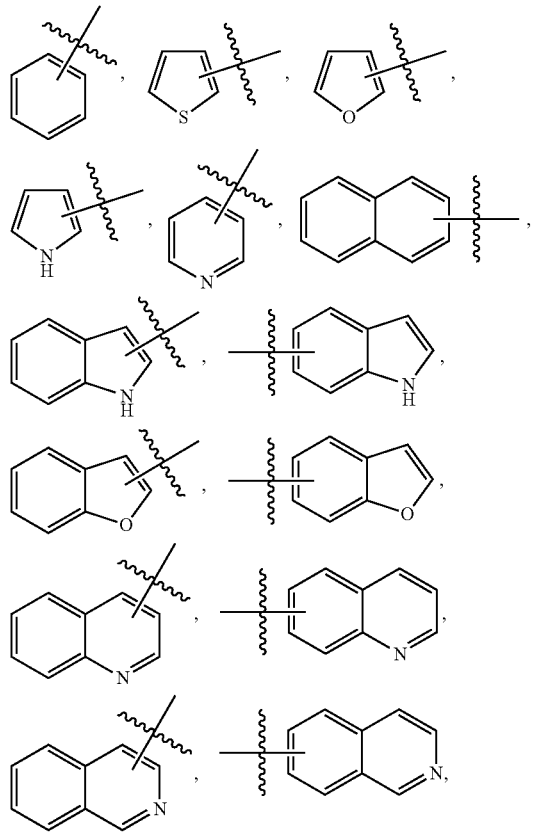

-continued

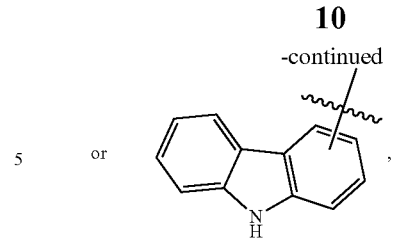

each of which is optionally substituted.

In some embodiments, R$^Z$ is an optionally substituted alkenyl or an optionally substituted cycloalkenyl. For example, R$^Z$ may be wherein R$^1$ and R$^2$ are independently hydrogen, alkyl, aryl, or heteroaryl, wherein the alkyl, aryl, and heteroaryl are optionally substituted; and R$^3$ is hydrogen, alkyl, or aryl, wherein the alkyl and aryl are optionally substituted, or R$^1$ and R$^3$ together with the carbon atoms to which they are attached form a 6- to 8-membered ring, which is optionally substituted.

In some embodiments, R$^Z$ is an optionally substituted alkyl or an optionally substituted cycloalkyl. In some embodiments, R$^Z$ is R$^W$—(CR$^{aa}$R$^{bb}$)$_p$—, wherein R$^W$ is hydrogen, deuterium, —NH(benzyloxycarbonyl), alkenyl, alkynyl, aryl, —C(O)-aryl, heteroaryl, or heterocyclyl, wherein the alkenyl, alkynyl, aryl, —C(O)-aryl, heteroaryl, and heterocyclyl are optionally substituted;

R$^{aa}$ and R$^{bb}$ at each occurrence are independently hydrogen, deuterium, alkyl, —NH(t-butoxycarbonyl), or —O-benzyl; and p is 1, 2, 3, 4, 5, 6, 7, or 8.

In some embodiments, R$^{Z1}$ has a structure that is the same as the structure of R$^Z$. In some embodiments, R$^Z$ is a deuterated group, and R$^{Z1}$ has a structure that is different from the structure of R$^Z$ only in that the positions corresponding to the deuterium atoms in R$^Z$ are occupied by hydrogen in R$^{Z1}$. In other words, R$^{Z1}$ may be a non-deuterated equivalent of a deuterated R$^Z$ group. In some embodiments, the method as disclosed herein may produce R$^Z$—C(O)-D, in which R$^Z$ is deuterated, from a starting material R$^{Z1}$—C(O)—H, in which R$^{Z1}$ is not deuterated.

In some embodiments, the solvent further comprises an organic solvent. The organic solvent may include, for example, tetrahydrofuran (THF), dichloromethane (CH$_2$Cl$_2$ or DCM), toluene, or a combination thereof.

In some embodiments, the reaction disclosed herein may be carried out in the presence of a base, such as K$_2$CO$_3$, KOAc, N, N-Diisopropylethylamine (DIPEA), NaHCO$_3$, or a combination thereof.

In some embodiments, the N-heterocyclic carbene catalyst is a compound of formula (I)

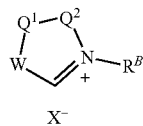

(I)

wherein
W is S or NR$^A$
Q$^1$ is CR$^C$ or N;
Q$^2$ is CR$^D$ or N; or
Q$^1$-Q$^2$ is CR$^{x1}$R$^{y1}$—CR$^{x2}$R$^{y2}$;
R$^A$ and R$^B$ are each independently an optionally substituted alkyl, an optionally substituted cycloalkyl, an optionally substituted aryl, an optionally substituted heteroaryl, or an optionally substituted heterocyclyl;
R$^C$, and R$^D$ are each independently hydrogen, an optionally substituted alkyl, an optionally substituted cycloalkyl, an optionally substituted aryl, an optionally substituted heteroaryl, or an optionally substituted heterocyclyl;
R$^A$ and R$^C$, R$^B$ and R$^D$, and/or R$^C$ and R$^D$ alternatively together with the N or C atoms they are attached to form a ring;
R$^B$ alternatively is an alkylene forming a dimer;
R$^{x1}$, R$^{y1}$, R$^{x2}$, and R$^{y2}$ are each independently hydrogen or alkyl; and
X$^-$ is counter ion.

In some embodiments, W is NR$^A$.

In some embodiments, Q$^1$ is CR$^C$ and Q$^2$ is CR$^D$. In some embodiments, Q$^1$ is CR$^C$ and Q$^2$ is N. In some embodiments, Q$^1$-Q$^2$ is CR$^{x1}$R$^{y1}$—CR$^{x2}$R$^{y2}$.

In some embodiments, W is NR$^A$, R$^A$ and R$^B$ are each independently an optionally substituted alkyl, an optionally substituted cycloalkyl, an optionally substituted aryl, an optionally substituted heteroaryl, or an optionally substituted heterocyclyl, and R$^C$ and R$^D$ are each independently hydrogen, an optionally substituted alkyl, an optionally substituted cycloalkyl, an optionally substituted aryl, an optionally substituted heteroaryl, or an optionally substituted heterocyclyl.

In some embodiments, W is NR$^A$, and R$^A$ and R$^C$, R$^B$ and R$^D$, or R$^C$ and R$^D$ together with the N or C atoms they are attached to form a ring.

In some embodiments, Q$^1$-Q$^2$ is CR$^{x1}$R$^{y1}$—CR$^{x2}$R$^{y2}$, and R$^A$ and R$^B$ are as defined above. In some some embodiments, Q$^1$-Q$^2$ is CR$^{x1}$R$^{y1}$—CR$^{x2}$R$^{y2}$, and R$^A$ and R$^B$ are each independently an optionally substituted aryl, such as an optionally substituted phenyl.

In some embodiments, the N-heterocyclic carbene catalyst of formula (I) is a compound of formula (I-a), (I-b), (I-c), or (I-d)

(I-a)

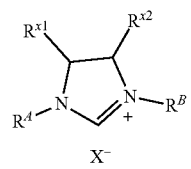

(I-b)

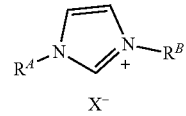

(I-c)

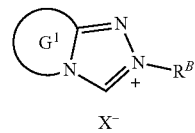

(I-d)

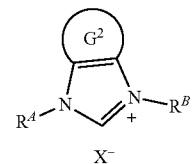

wherein
G$^1$ is an optionally substituted heterocycle; and
G$^2$ is an optionally substituted aryl;
R$^A$, R$^B$, R$^{x1}$, R$^{y1}$, and X$^-$ are as defined in formula (I).

In some embodiments, X$^-$ is Cl$^-$, Br$^-$, I$^-$, or BF$_4^-$. Other suitable counter ion may be used for the present method.

Suitable N-heterocyclic carbene catalysts of formula (I) include a compound selected from the group consisting of 5a

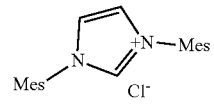

5b

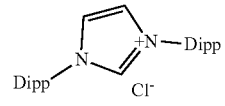

5c

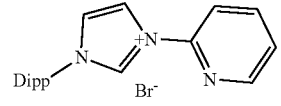

5d

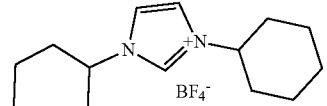

5e

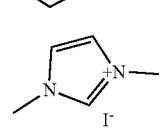

5f

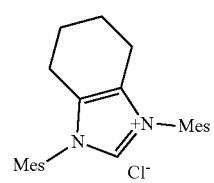

5g

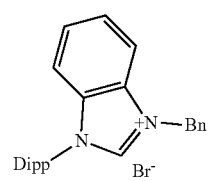

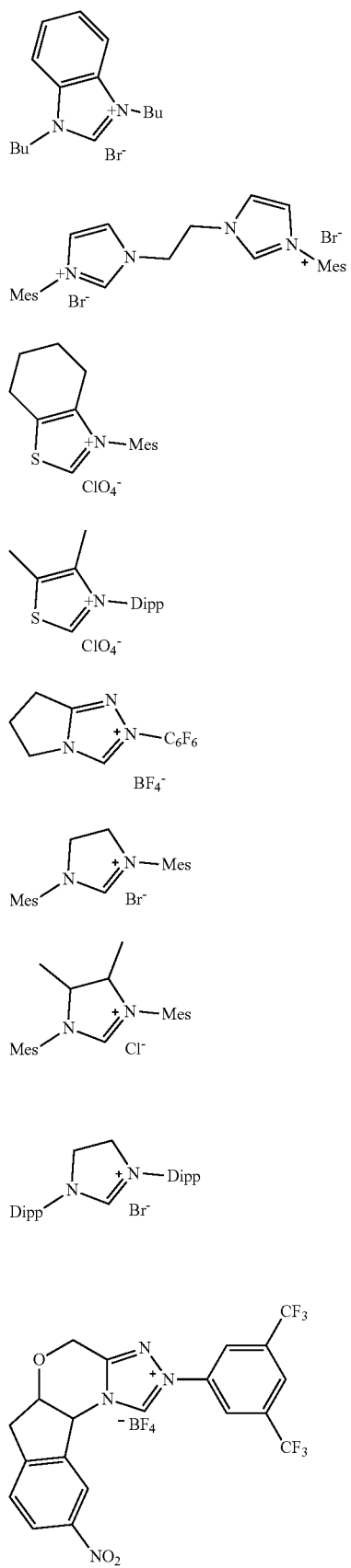

-continued
5y
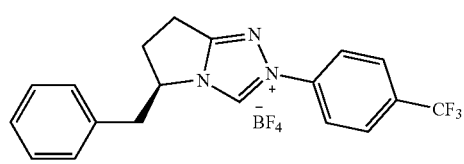
5z
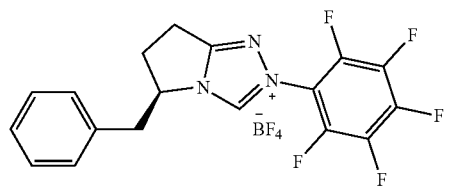
5aa
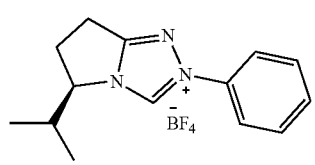
5ab
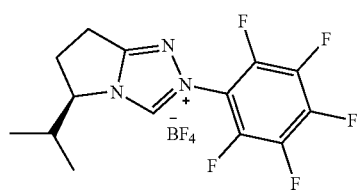
5ac
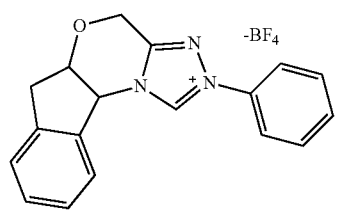
5ad
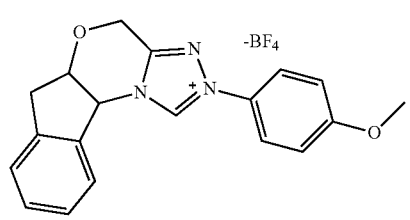
5ae
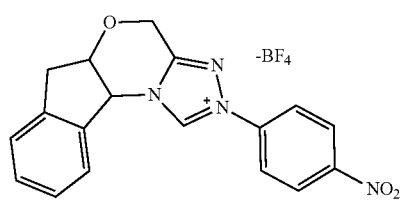
5af
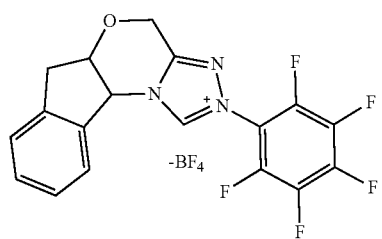
-continued
5ag
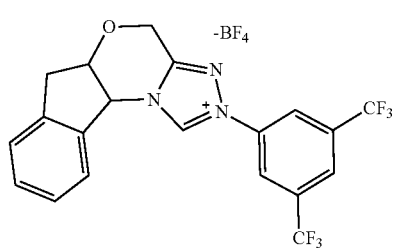
5ah
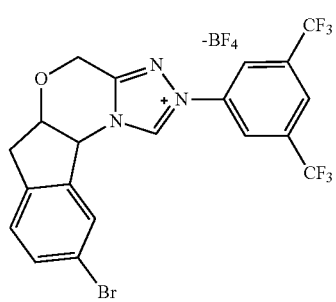
5ai
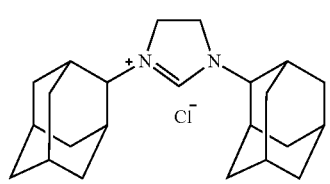
5aj
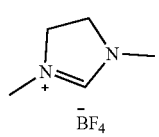
5ak
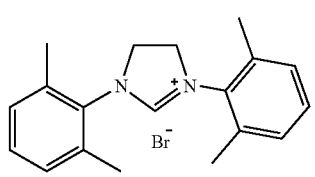
5al
and
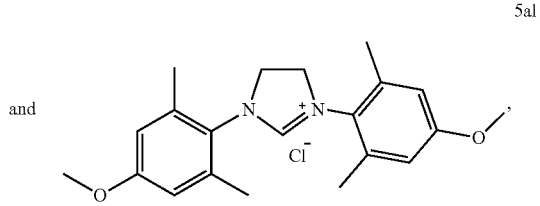
in which Mes is
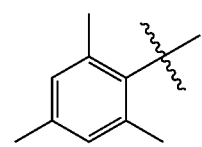 [SMILES: *c1c(C)cc(C)cc1C]

and Dipp is

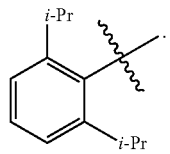 [SMILES: *c1c(C(C)C)cccc1C(C)C]

In some embodiments, the N-heterocyclic carbene catalyst is a compound of formula (I-a) or (I-c), and $R^Z$ is an optionally substituted aryl or an optionally substituted heteroaryl. For example, in these embodiments, the N-heterocyclic carbene catalyst is

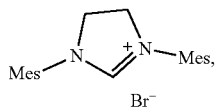
5m

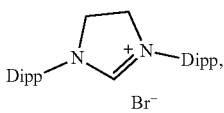
5o

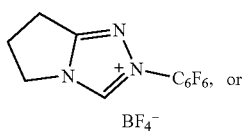
5l

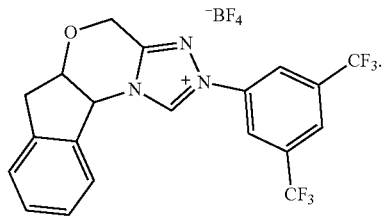
5ag

In some embodiments, the N-heterocyclic carbene catalyst is a compound of formula (I-a) or (I-c), such as 5m, 5o, 5l, or 5ag, and $R^Z$ is

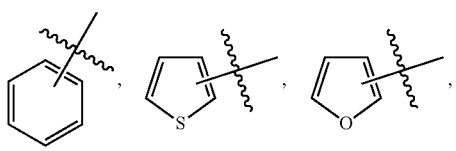

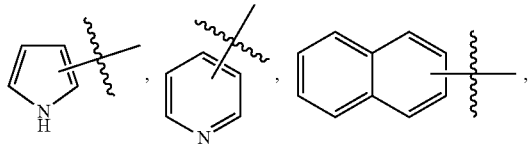

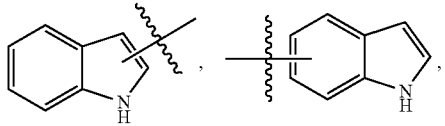

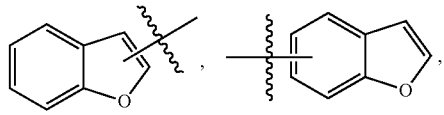

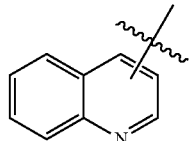

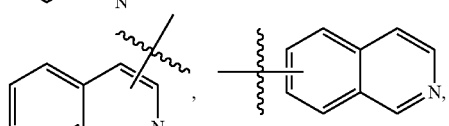

or

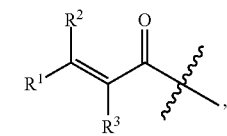

each of which is optionally substituted.

In some embodiments, the N-heterocyclic carbene catalyst is a compound of formula (I-c), and $R^Z$ is an optionally substituted alkenyl or an optionally substituted cycloalkenyl. For example, in these embodiments, the N-heterocyclic carbene catalyst is 5p

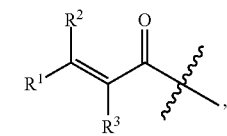

51

In some embodiments, the N-heterocyclic carbene catalyst is a compound of formula (I-c), such as 5p or 5l, and $R^Z$ is wherein
$R^1$ and $R^2$ are independently hydrogen, alkyl, aryl, or heteroaryl, wherein the alkyl, aryl, and heteroaryl are optionally substituted; and R³ is hydrogen, alkyl, or aryl, wherein the alkyl and aryl are optionally substituted, or R¹ and R³ together with the carbon atoms to which they are attached form a 6- to 8-membered ring, which is optionally substituted.

In some embodiments, the N-heterocyclic carbene catalyst is a compound of formula (I-a) or (I-c), and R$^Z$ is an optionally substituted alkyl or an optionally substituted cycloalkyl. For example, in these embodiments, the N-heterocyclic carbene catalyst is

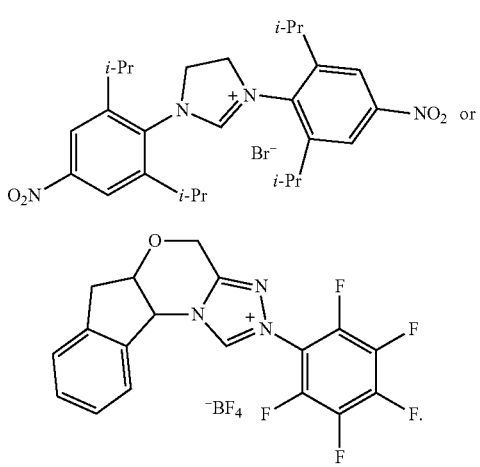

In some embodiments, the N-heterocyclic carbene catalyst is a compound of formula (I-a) or (I-c), such as 5q or 5af, and R$^Z$ is R$^W$—(CR$^{aa}$R$^{bb}$)$_p$—, wherein R$^W$ is hydrogen, deuterium, —NH(benzyloxycarbonyl), alkenyl, alkynyl, aryl, —C(O)-aryl, heteroaryl, or heterocyclyl, wherein the alkenyl, alkynyl, aryl, —C(O)-aryl, heteroaryl, and heterocyclyl are optionally substituted;

R$^{aa}$ and R$^{bb}$ at each occurrence are independently hydrogen, deuterium, alkyl, —NH(t-butoxycarbonyl), or —O-benzyl; and p is 1, 2, 3, 4, 5, 6, 7, or 8.

In some embodiments, the method disclosed herein further includes isolating the produced deuterated aldehyde. Suitable method for isolating the deuterated aldehyde product may include those known in the art, such as chromatographic procedures.

In some embodiments, the method disclosed herein produces a level of deuterium incorporation of the —C(O)-D moiety of at least 90%. The level of deuterium incorporation of the —C(O)-D moiety may be at least 91%, at least 92%, at least 93%, at least 94%, at least 95%, at least 96%, at least 97%, at least 98%, at least 99%, or even at least 99.5%. The level of deuterium incorporation of the —C(O)-D moiety may be about 90% to 99.9%, about 92% to 99.9%, about 95% to 99.9%, about 97% to 99.9%, or even about 99% to 99.9%. In particular embodiments, the level of deuterium incorporation of the —C(O)-D moiety is at least 95%.

In another aspect, the present disclosure provides a deuterated aldehyde produced by the method disclosed herein.

In another aspect, the present disclosure provides an isolated deuterated aldehyde produced by the method disclosed herein.

The deuterated aldehyde or isolated deuterated aldehyde products as disclosed herein may be used as starting materials for the preparation of other compounds, including, for example, deuterated alcohols and deuterated pharmaceutical compounds.

Compound names are assigned by using Struct=Name naming algorithm as part of CHEMDRAW® ULTRA v. 12.0.

The compound may exist as a stereoisomer wherein asymmetric or chiral centers are present. The stereoisomer is "R" or "S" depending on the configuration of substituents around the chiral carbon atom. The terms "R" and "S" used herein are configurations as defined in IUPAC 1974 Recommendations for Section E, Fundamental Stereochemistry, in Pure Appl. Chem., 1976, 45: 13-30. The disclosure contemplates various stereoisomers and mixtures thereof and these are specifically included within the scope of this invention. Stereoisomers include enantiomers and diastereomers, and mixtures of enantiomers or diastereomers. Individual stereoisomers of the compounds may be prepared synthetically from commercially available starting materials, which contain asymmetric or chiral centers or by preparation of racemic mixtures followed by methods of resolution well-known to those of ordinary skill in the art. These methods of resolution are exemplified by (1) attachment of a mixture of enantiomers to a chiral auxiliary, separation of the resulting mixture of diastereomers by recrystallization or chromatography and optional liberation of the optically pure product from the auxiliary as described in Furniss, Hannaford, Smith, and Tatchell, "Vogel's Textbook of Practical Organic Chemistry", 5th edition (1989), Longman Scientific & Technical, Essex CM20 2JE, England, or (2) direct separation of the mixture of optical enantiomers on chiral chromatographic columns or (3) fractional recrystallization methods.

It should be understood that the compound may possess tautomeric forms, as well as geometric isomers, and that these also constitute an aspect of the invention.

3. Examples

General Information. Commercial reagents and solvents were used as received, unless otherwise stated. Organic solution was concentrated under reduced pressure on a Büchi rotary evaporator. Analytical thin layer chromatography (TLC) was performed on 0.25 mm silica gel plates (Qingdao Haiyang Chemical China), and the compounds were visualized with a UV light at 254 nm. Further visualization was achieved by staining with iodine. Flash chromatography was performed on silica gel 200-300 mesh (purchased from Qingdao Haiyang Chemical China) with commercial solvents (purchased from Adamas-beta®). The ¹H NMR and ¹³C NMR spectra were recorded on a Bruker AM 400 Spectrometer (400 and 100 MHz for ¹H NMR and ¹³C NMR, respectively) and are internally referenced to residual solvent signals (note: CDCl₃ referenced at 7.26 ppm in ¹H NMR; DMSO-d⁶ referenced at 2.50 ppm in ¹H NMR, respectively). Multiplicities were given as s (singlet), d (doublet), t (triplet), dd (double of doublet), and m (multiplets). Coupling constants were reported in Hertz (Hz). Data for ¹³C NMR are reported in terms of chemical shift. High-resolution mass spectrometry (HRMS) was recorded on Waters LCT Premier XE spectrometer. The NHC catalysts 5d, 5e and 5s were purchased from Adamas-beta, and 5a, 5b, 5c, 5f, 5g, 5h, 5i, 5j, 5k, 5l, 5m, 5n, 5o, 5q, 5r, 5t, 5u, 5v, 5w, 5x, 5y, 5z, 5aa, 5ab, 5ac, 5ad, 5ae, 5af, 5ag, 5ai, 5aj, 5ak, 5al were prepared according to literature procedures.

The level of deuterium incorporation in the substrate was determined by ¹H NMR spectroscopy. The integrals were calibrated against a peak corresponding to a position not expected to be labelled. The extent of labeling (percentage of deuteration) at any specific position was calculated using Equation 1.

$$\% \text{ Deuteration} = 100 - \left[\left(\frac{\text{residual integral}}{\text{number of labelling sites}}\right) \times 100\right] \quad \text{Equation 1}$$

Example 1. NHC Promoted HDE Process for Aromatic Aldehydes

Figure 2:
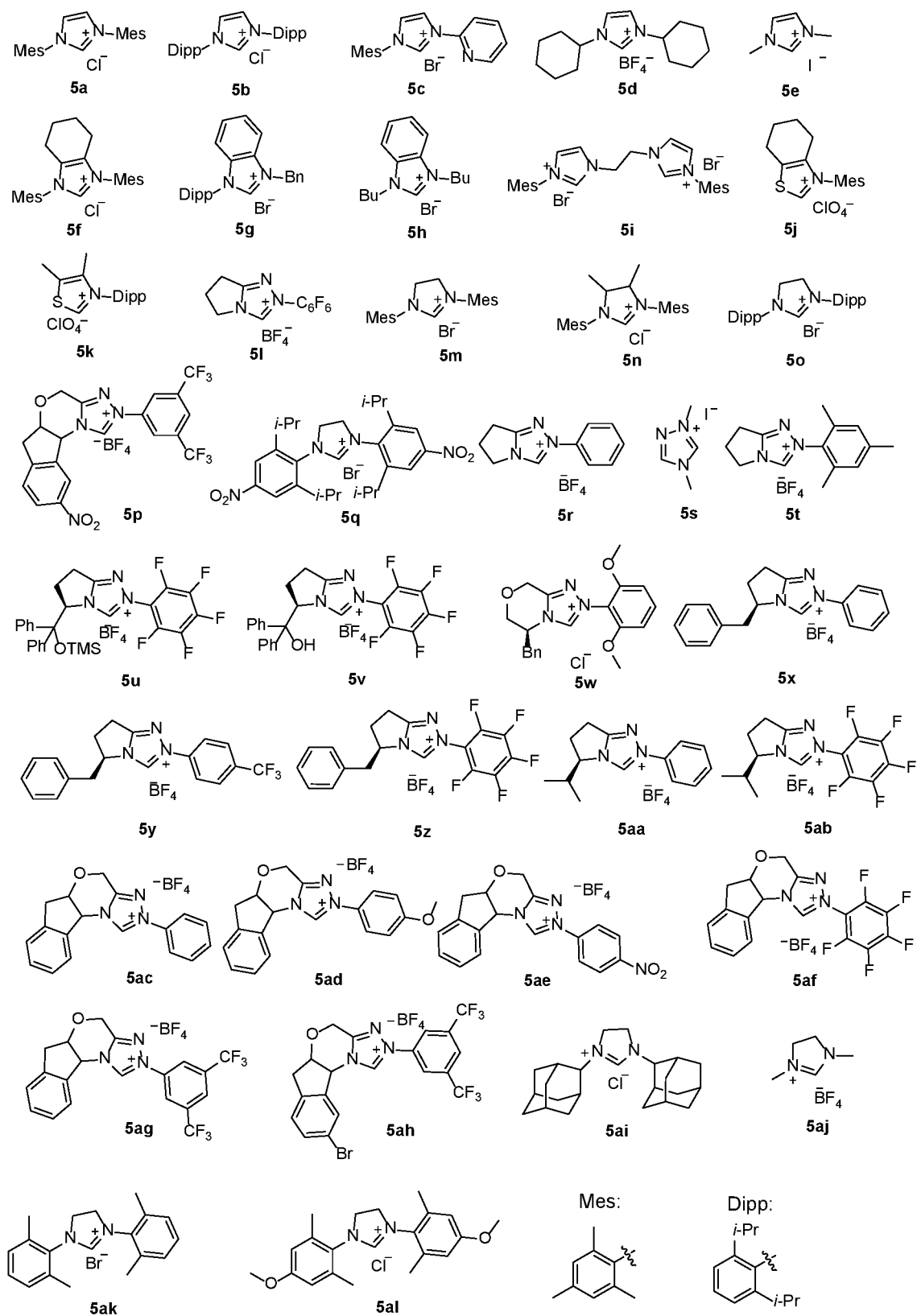
FIG. 2 shows the structures of various NHC catalysts.
Figure 3A:
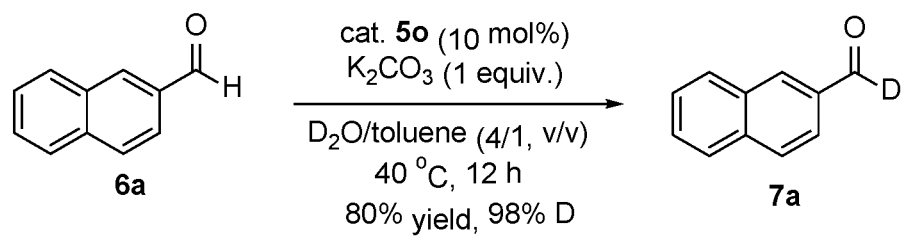
FIGS. 3A and 3B show representative results of NHC catalysed HDE with aromatic aldehydes (61 examples). FIG.
Figure 3A:
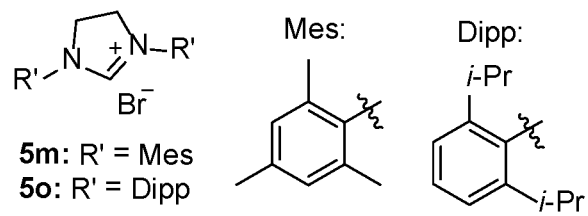
Figure 3A:
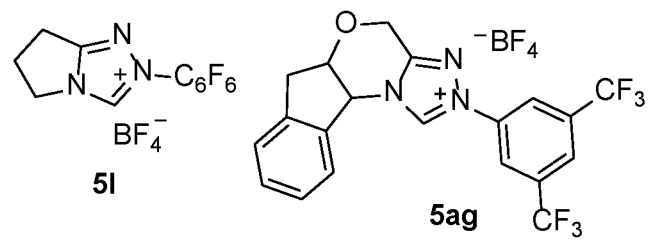

The HDE process of the electron-neutral 2-naphthaldehyde (6a) was studied using various NHC catalysts (FIG. 2), catalyst loading, base, solvent, time and temperature, and amount of $D_2O$ (Table 1). These experiments led to establishment of the reagents, time and temperatures that promote most efficient HED reactions. Specifically, for effective reactions, it may be advantageous to utilize bulky NHC catalysts such as the N,N-dimesityl- or 2,6-diisopropyimidazolium bromides 5m or 5o, 5-10 mol % $K_2CO_3$, $NaHCO_3$ or KOAc as base (1.0 equiv), toluene or $CH_2Cl_2$ containing 1/4 v/v $D_2O$ as solvent, temperatures in the 40-60° C. range and a 12 h reaction time (FIG. 3A).

TABLE 1

Reaction Conditions for Aromatic Aldehyde[a]

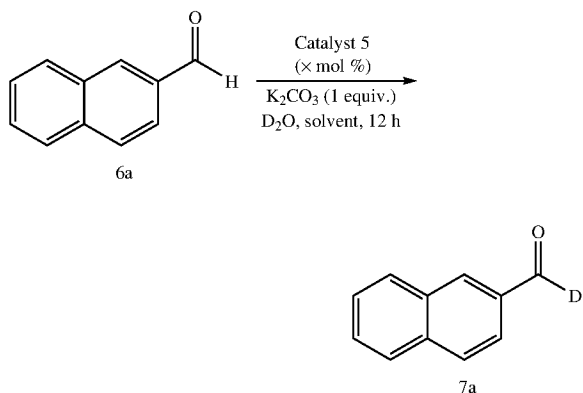

| Entry | Catalyst | Solvent | T (° C.) | Yield (%)[b] | D (%)[c] |
|---|---|---|---|---|---|
| 1 | — | THF | 60 | 98 | 0 |
| 2 | 5a | THF | 60 | 40 | 99 |
| 3 | 5b-i | THF | 60 | 0-99 | 5-80 |
| 4 | 5j | THF | 60 | 40 | 11 |
| 5 | 5k | THF | 60 | 26 | 98 |
| 6 | 5l | THF | 60 | 15 | 90 |
| 7 | 5m | THF | 60 | 50 | 94 |
| 8 | 5n | THF | 60 | 26 | 99 |
| 9 | 5o | THF | 60 | 48 | 98 |
| 10 | 5o | THF | 40 | 58 | 97 |
| 11 | 5o | THF | 25 | 96 | 8 |
| 12 | 5o | $CH_2Cl_2$ | 40 | 80 | 98 |
| 13 | 5o | toluene | 40 | 81 | 98 |
| 14[d] | 5o | toluene | 40 | 73 | 98 |
| 15[e] | 5o | toluene | 40 | 40 | 98 |
| 16[f] | 5o | toluene | 40 | 82 | 97 |
| 17[g] | 5o | toluene | 40 | 81 | 91 |

[a]Reaction conditions unless otherwise stated: 6a (0.5 mmol), catalysts 5 (10 mol %) and $K_2CO_3$ (1.0 equiv) in $D_2O$ (1 mL) and solvent (0.25 mL) was vigorously stirred for 12 hours.
[b]Isolated yield.
[c]Determined by $^1H$ NMR.
[d]5% catalyst was used.
[e]20% catalyst was used.
[f]0.5 mL $D_2O$ was used.
[g]10 eq $D_2O$ was used.

A study using various aromatic aldehydes (FIG. 3B) showed that the conditions needed to bring about maximum yields and high levels of D-incorporation may be substrate dependent (61 examples). Under appropriate conditions, HDE reactions of structurally diverse benzaldehydes and heteroaromatic aldehydes take place with uniformly high to excellent levels of D-incorporation (95-99%). Electron-poor aromatic aldehydes are competent substrates to deliver corresponding deuterated aldehydes in moderate to good yields (44-86%) (7c, 7k-7p, 7s-7w, 7aa-ab, and 7ae). Of particular note is the observation that the strong electron-withdrawing 3-nitro group substituted benzaldehyde 7w undergoes smooth HDE when 5o (5 mol %) is utilized as the catalyst, KOAc is employed as the base and 80° C. is the temperature. In contrast, reactions of electron-rich aryl aldehydes (7b, 7e, 7f, 7q, 7r, 7x-7z, 7ac, 7ad, 7ah-al) take place in higher yields as a consequence of the attenuation of undesired benzoin condensations. Notably, free phenolic hydroxyl groups have limited effects on the exchange reactions, as is demonstrated by the observations that 7y and 7an produce the deuterio-analogs with 98% D-incorporation. Moreover, the methodology may be employed to introduce deuterium into a substrate (6ag) containing two aldehyde groups. In this case, efficient double HDE occurs to produce the bis-deuterated counterpart 7ag in high yield and with an excellent level of D-incorporation. In addition to benzaldehyde derivatives, various electron-rich (7ap-7ar, 7au-7ax, 7bc-7bd, 7bc, 7bd) and poor (7as, 7at, 7ay-7bb) heteroaromatics, and polycyclic aromatics (7am-7ao) are viable substrates for the new HDE reaction. Finally, advantages associated with the mild nature and selectivity of the new metal free methodology are illustrated by the tolerance of transition metal sensitive halogen substituted substrates (7c, 7l, 7s, 7t, 7aa, 7ab, 7at, 7az and 7ba). Of further significance is the observation that the protocol enables late-stage HDE exchange reactions of structurally complex aldehydes (7be-7bi) in impressive yields (52-73%) and levels of D-incorporation (96-98%). Remarkably, the level of D-incorporation can be improved by simply carrying out a second HDE reaction with the product of an initial HDE reaction (eg. 7v from 95% to 99%).

Example 2. NHC Catalysed HDE for Enals and Aliphatic Aldehydes

Figure 4A:
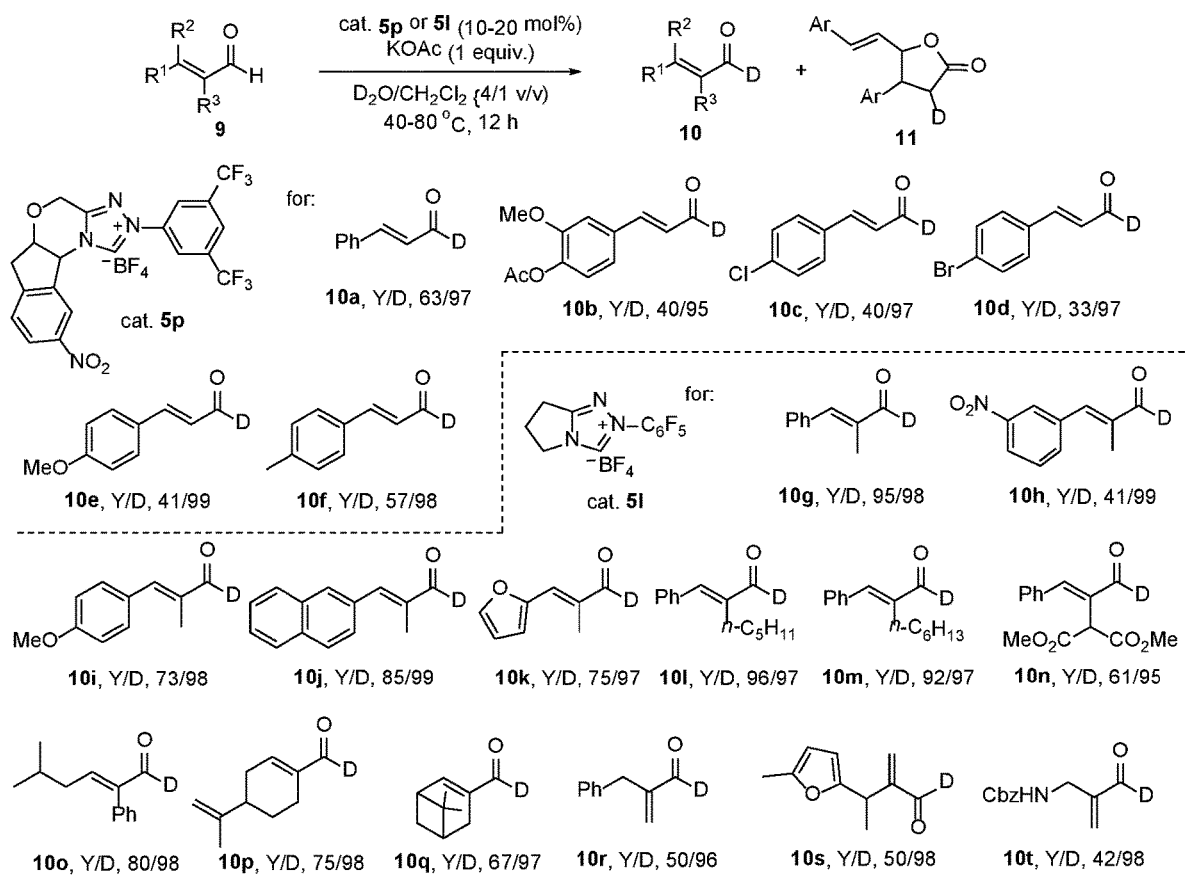
FIG. 4A shows representative results of NHC catalysed HDE reactions of enals (20 examples) and representative catalysts.

Formation of 1-D-substituted enals using the NHC catalysed HDE process was also studied (FIG. 4A). These reactions may involve potentially more problematic substrates owing to their higher tendency to form γ-butyrolactones 11 under NHC catalysis conditions. Furthermore, unexpectedly the conditions and NHC catalysts used to promote HDE reactions of aromatic aldehydes do not lead to deuteration of enals like cinnamaldehyde (Table 2).

TABLE 2

Reaction Conditions for Cinnamaldehyde[a]

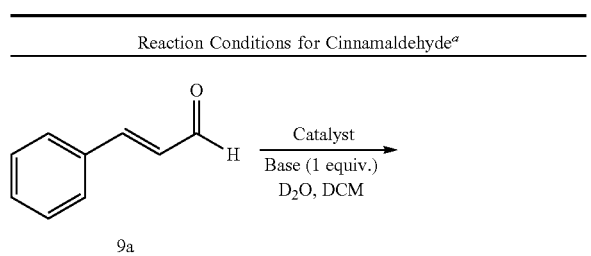

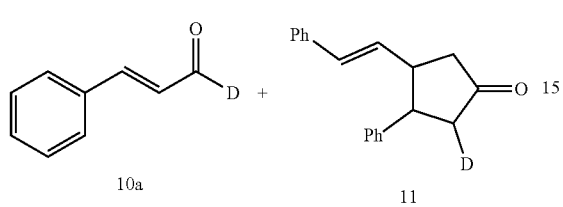

| Entry | Catalyst | Base | T (° C.) | Yield (%)[b] | % D[d] | Yield (%)[c] |
|---|---|---|---|---|---|---|
| 1 | 5a | $K_2CO_3$ | 40 | — | — | 50 |
| 2 | 5b | $K_2CO_3$ | 40 | — | — | 50 |
| 3 | 5m | $K_2CO_3$ | 40 | 60 | 0 | 10 |
| 4 | 5o | $K_2CO_3$ | 40 | 80 | 0 | 0 |
| 5 | 5r | $K_2CO_3$ | 40 | — | — | — |
| 6 | 5l | KOAc | 40 | — | — | — |
| 7 | 5l | DIPEA | 40 | 20 | 20 | — |
| 8 | 5s | KOAc | 40 | 92 | 0 | — |
| 9 | 5t | KOAc | 40 | 80 | 0 | — |
| 10 | 5u | KOAc | 40 | 87 | 7 | — |
| 11 | 5v | KOAc | 40 | 60 | 15 | — |
| 12 | 5w | KOAc | 40 | 87 | 4 | — |
| 13 | 5x | KOAc | 40 | 65 | 0 | — |
| 14 | 5y | KOAc | 40 | 55 | 4 | — |
| 15 | 5z | KOAc | 40 | 33 | 12 | — |
| 16 | 5aa | KOAc | 40 | 80 | 0 | — |
| 17 | 5ab | KOAc | 40 | 20 | 18 | — |
| 18 | 5ac | KOAc | 40 | 40 | 40 | — |
| 19 | 5ad | KOAc | 40 | 43 | 22 | — |
| 20 | 5ae | KOAc | 40 | 72 | 0 | — |
| 21 | 5af | KOAc | 40 | 50 | 32 | — |
| 22 | 5ag | KOAc | 40 | 86 | 58 | — |
| 23 | 5ag | KOAc | 60 | 95 | 45 | — |
| 24 | 5ah | KOAc | 60 | 67 | 95 | — |
| 25 | 5p | KOAc | 60 | 63 | 97 | — |

[a]Reaction conditions unless otherwise stated: 9a (0.25 mmol), catalyst 5 (10 mol %) and KOAc (1.0 equiv) in $D_2O$ (1 mL) and DCM (0.25 mL) was vigorously stirred at 40° C. for 12 hours.
[b]Yield of isolated product of 10a.
[c]Yield of isolated product of 11.
[d]Deuterium incorporations (%) were determined by $^1H$ NMR spectroscopy.

As shown in FIG. 4A, HDE reaction of cinnamaldehyde promoted by the triazolium salt 5p generates the corresponding 1-D-analog 10a in 63% yield with 97% D-incorporation. The process using 5p represents a general approach to the preparation of deuterated cinnamaldehyde derivatives 10b-f (95-99% D-incorporation in albeit moderate yields). In HDE reactions of 2,3-disubstituted enals 9g-q, use of triazolium salt 5l rather than 5p enables formation of the corresponding 1-D-aldehydes with uniformly high levels of D-incorporation (97-99%) (Table 3). Further, under the mild reaction conditions, HDE reactions of sensitive β-nonsubstituted enals 9r-t take place smoothly to produce the corresponding deuterated aldehydes 10r-t.

TABLE 3

Reaction Conditions for Other Enals[a]

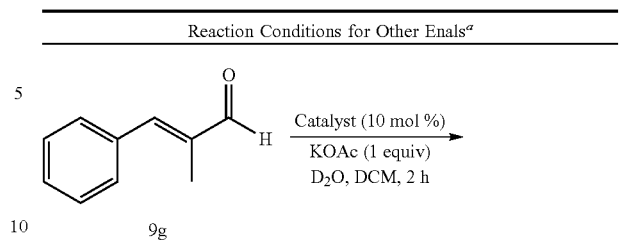

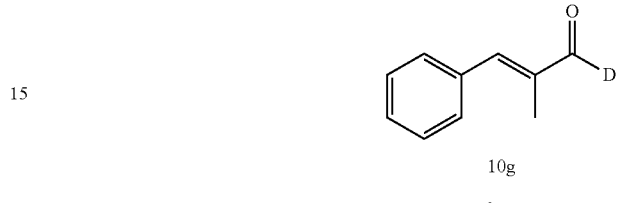

| Entry | Catalyst | T (° C.) | Yield (%)[b] | % D[c] |
|---|---|---|---|---|
| 1 | 5a | 25 | 98 | 0 |
| 2 | 5b | 25 | 96 | 0 |
| 3 | 5m | 25 | 92 | 0 |
| 4 | 5o | 25 | 95 | 0 |
| 5 | 5r | 25 | 94 | 15 |
| 6 | 5ag | 25 | 89 | 67 |
| 7 | 5l | 25 | 96 | 94 |
| 8 | 5l | 40 | 95 | 98 |

[a]Reaction conditions unless otherwise stated: 9g (0.25 mmol), catalyst 5 (10 mol %) and KOAc (1.0 equiv) in $D_2O$ (1 mL) and DCM (0.25 m) was vigorously stirred at 25° C. for 12 hours.
[b]Yield of isolated product.
[c]Deuterium incorporations (%) were determined by $^1H$ NMR spectroscopy.

The roles played by aliphatic aldehydes (alkanals) in organic synthesis are equal to those of aromatic aldehydes and enals. However, the preparation of 1-D analogs of alkanals remains an unsolved problem. Furthermore, as compared with aromatic and α,β-unsaturated counterparts, alkanals have been used less often in NHC catalysed processes. These issues are associated with the presence in alkanals of multiple reactive sites, particularly enolizable α-positions, at which side reactions can occur.

Figure 4B:
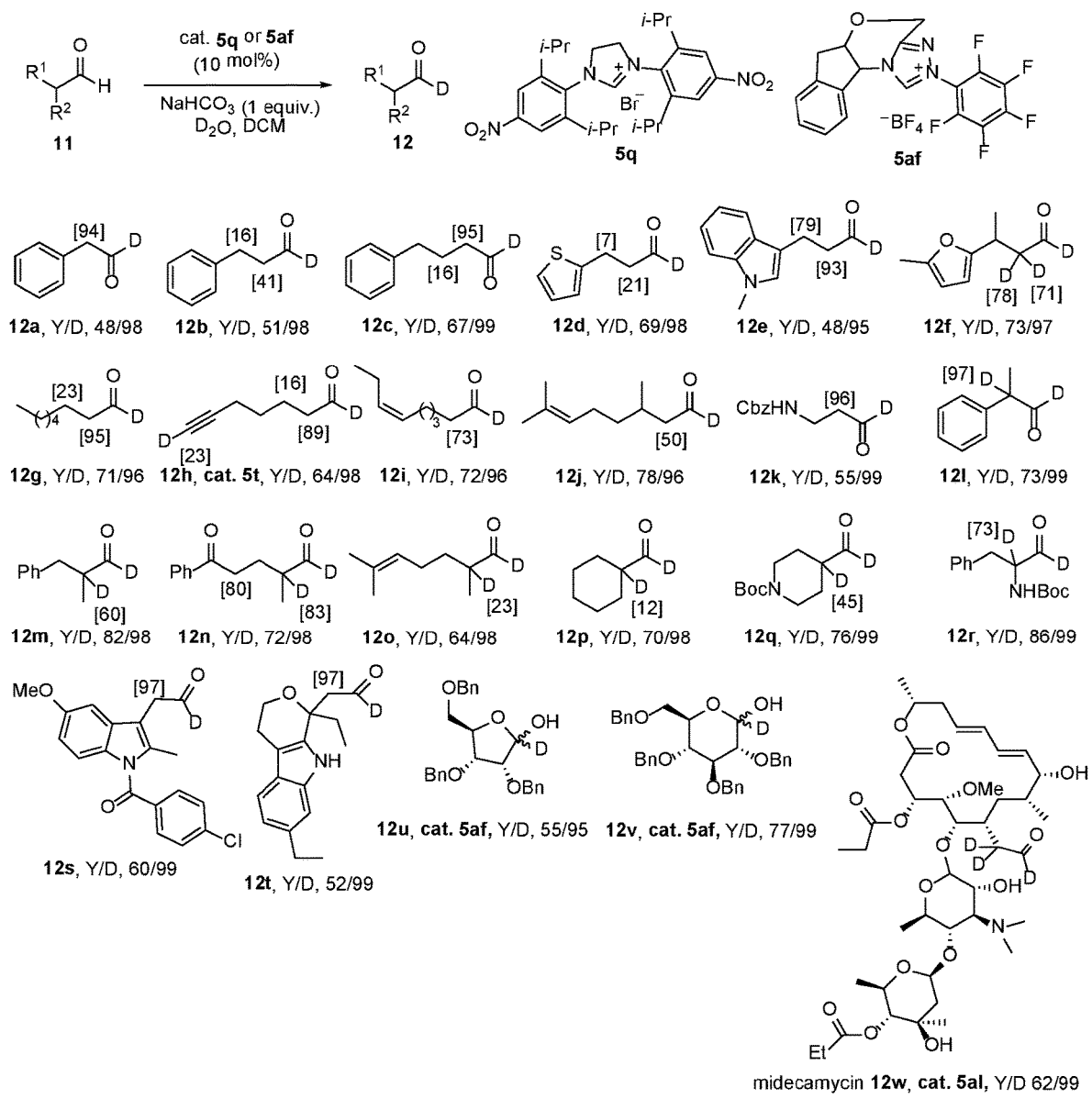
FIG. 4B shows representative results NHC catalysed HDE reactions of aliphatic aldehydes (23 examples) and representative catalysts.
Figure 4C:
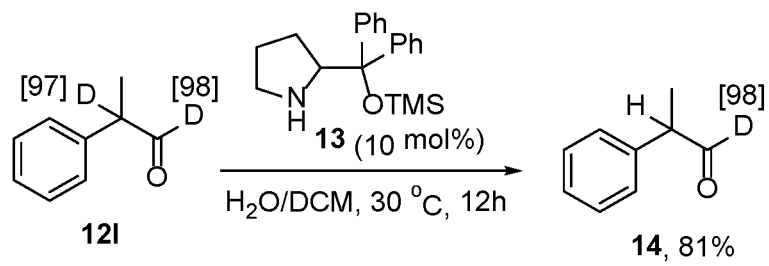
FIG. 4C shows representative results of amine catalysed selective α-dedeuteration of bis-deuterated aldehydes.

Further studies were conducted to assess the applicability of the new NHC promoted HDE reactions to alkanals, and there results demonstrated that optimal conditions are substrate dependent (Table 4). An extensive evaluation of catalysts revealed the nitro-group containing imidazolinium salt 5q may be an ideal choice. In reactions using 5q as catalyst, $NaHCO_3$ as base and $CH_2Cl_2$ as solvent, a large number of structurally diverse alkanals, such as linear 11a-k ($R^2$=H), α-branched 11l-q, amine α-functionalized 11r and complex 11s-w derivatives are efficiently transformed to their respective 1-D-analogs (FIG. 4B). Notably, benzyl protected D-ribofuranose and D-glucose bearing hemiacetal can effectively participate in the process with 5af as promoter to give only α-deuterated products 12u-v. This protocol is complementary to a Ru-catalysed HDE process, in which deuterium substitutes hydrogen occurring at the hydroxyl tethered carbon. Furthermore, the new protocol enables highly chemoselective deuteration of the aldehyde moiety in the densely functionalized macrolide antibiotic midecamycin (11w). In some experiments, deuteration also takes place at α- and/or β-positions of alkanals. However, a C1-deuterated aldehyde may be produced by subjecting the bis-deuterio product to a base promoted exchange reaction in $H_2O$. For example, treatment of 12l with pyrrolidine derivative 13 in $H_2O/CH_2Cl_2$ forms the 1-D-aldehyde 14 in 81% yield (FIG. 4C).

TABLE 4

Reaction Conditions for Aliphatic Aldehydes [a]

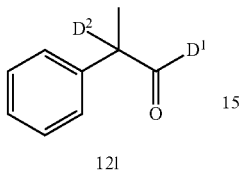

| Entry | Catalyst | T (° C.) | Yield (%)[b] | % D[1c] | % D[2c] |
|---|---|---|---|---|---|
| 1 | 5a | 40 | 35 | 12 | 37 |
| 2 | 5b | 40 | 55 | 35 | 41 |
| 3 | 5c | 40 | 71 | 30 | 84 |
| 4 | 5g | 40 | — | — | — |
| 5 | 5h | 40 | 65 | 0 | 76 |
| 6 | 5i | 40 | 44 | 11 | 48 |
| 7 | 5j | 40 | 52 | 40 | 97 |
| 8 | 5k | 40 | 64 | 73 | 95 |
| 9 | 5l | 40 | 39 | 60 | 97 |
| 10 | 5m | 40 | 32 | 98 | 98 |
| 11 | 5n | 40 | 33 | 95 | 98 |
| 12 | 5o | 40 | 35 | 95 | 81 |
| 13 | 5ai | 40 | 70 | 10 | 95 |
| 14 | 5aj | 40 | 85 | 7 | 15 |
| 15 | 5ak | 40 | 40 | 83 | 82 |
| 16 | 5al | 40 | 65 | 18 | 45 |
| 17 | 5q | 40 | 64 | 98 | 92 |
| 18 | 5q | 30 | 73 | 99 | 97 |

[a] Reaction conditions unless otherwise stated 11l (0.5 mmol), catalysts 5 (10 mol %) and NaHCO₃ (1.0 equiv) in D₂O (1 mL) and DCM (0.25 mL) was vigorously stirred at 40° C. for 12 hours.
[b] Yield of isolated product.
[c] Deuterium incorporations (%) were determined by ¹H NMR spectroscopy.

Example 3 Experiment Procedures and Product Characterization

General Procedure for Deuteration of Aldehydes Catalysed by NHC

Aldehyde (1 equiv), NHC catalyst (x mol %) and base (1 equiv) were dissolved in a mixture of D₂O (1 mL) and organic solvent (0.25 mL) in a reaction vessel (5 mL). Then the reaction mixture was vigorously stirred at specified temperature for 12 hours. After cooling to room temperature, the reaction was extracted with DCM, dried over anhydrous sodium sulfate, concentrated in vacuo, and purified by column chromatography to afford the deuterated product. The level of deuterium incorporation of the product was determined by ¹H NMR spectroscopy. The integrals were calibrated against Equation 1.

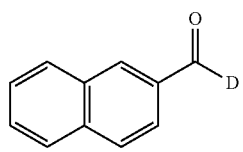 [SMILES: [2H]C(=O)c1ccc2ccccc2c1]

2-Naphthaldehyde-α-d₁ (7a)

2-Naphthaldehyde (0.5 mmol), 5o (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 40° C. for 12 hours. 7c was obtained as a white solid in 81% yield with 98% D-incorporation. ¹H NMR (400 MHz, CDCl₃) δ 10.14 (s, 0.02H), 8.31 (s, 1H), 8.00-7.88 (m, 4H), 7.66-7.56 (m, 2H); ¹³C NMR (100 MHz, CDCl₃) δ 192.0 (t, J=26.6 Hz), 136.4 (s), 134.6 (s), 134.0 (t, J=3.5 Hz), 132.6 (s), 129.5 (s), 129.1 (s), 129.1 (s), 128.1 (s), 127.1 (s), 122.7 (s); HRMS (EI): m/z calcd for C₁₁H₇DO [(M)⁺]: 157.0638, found: 157.0639.

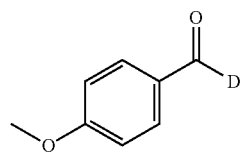

4-Methoxybenzaldehyde-α-d₁ (7b)

4-Methoxybenzaldehyde (0.5 mmol), 5o (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 60° C. for 12 hours. 7a was obtained as a colorless oil in 93% yield with 98% D-incorporation. ¹H NMR (400 MHz, CDCl₃) δ 9.86 (s, 0.02H), 7.82 (dt, J=8.8, 2.4 Hz, 2H), 6.98 (dt, J=8.8, 2.4 Hz, 2H), 3.87 (s, 3H); ¹³C NMR (100 MHz, CDCl₃) δ 190.5 (t, J=26.3 Hz), 164.6 (s), 132.0 (s), 129.9 (t, J=3.5 Hz), 114.3 (s), 55.6 (s); HRMS (EI): m/z calcd for C₈H₇DO₂ [(M)⁺]: 137.0587, found: 137.0588.

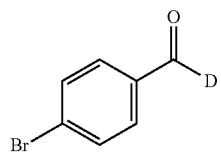

4-Bromobenzaldehyde-α-d₁ (7c)

4-Bromobenzaldehyde (0.5 mmol), 5o (10 mol %) and NaHCO₃ (0.5 mmol, 1 equiv) was dissolved in a mixture of D₂O (1 mL) and toluene (0.25 mL) in a reaction vessel (5 mL). Then the reaction mixture was vigorously stirred at 40° C. for 12 hours. 7b was obtained as a yellow solid in 86% yield with 98% D-incorporation. ¹H NMR (400 MHz, CDCl₃) δ 9.96 (s, 0.02H), 7.73 (dt, J=8.4, 2.0 Hz, 2H), 7.66 (dt, J=8.4, 2.0 Hz, 2H); ¹³C NMR (100 MHz, CDCl₃) δ 190.8 (t, J=26.8 Hz), 135.0 (t, J=3.7 Hz), 132.4 (s), 131.0 (s), 129.8 (s); HRMS (EI): m/z calcd for C₇H₄DBrO [(M)⁺]: 184.9587, found: 184.9589.

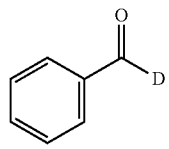

Benzaldehyde-α-d₁ (7d)

Benzaldehyde (0.5 mmol), 5o (10 mol %) and NaHCO₃ (0.5 mmol, 1 equiv) was dissolved in a mixture of D₂O (1 mL) and DCM (0.25 mL) in a reaction vessel (5 mL). Then the reaction mixture was vigorously stirred at 60° C. for 12 hours. 7d was obtained as a colorless oil in 70% yield with 97% D-incorporation. ¹H NMR (400 MHz, CDCl₃) δ 10.02 (s, 0.03H), 7.90-7.87 (m, 2H), 7.64 (t, J=7.4 Hz, 1H), 7.54 (t, J=7.5 Hz, 2H); ¹³C NMR (100 MHz, CDCl₃) δ 192.1 (t, J=26.5 Hz), 136.3 (t, J=3.6 Hz), 134.5 (s), 129.8 (s), 129.0 (s); HRMS (EI): m/z calcd for C₇H₅DO [(M)⁺]: 107.0481, found: 107.0482.

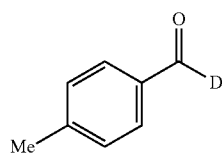

4-Methylbenzaldehyde-α-d₁ (7e)

4-Methylbenzaldehyde (0.5 mmol), 5o (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 40° C. for 12 hours. 7e was obtained as a colorless oil in 74% yield with 98% D-incorporation. ¹H NMR (400 MHz, CDCl₃) δ 9.95 (s, 0.02H), 7.77 (dd, J=8.4, 1.6 Hz, 2H), 7.32 (dd, J=8.3, 0.5 Hz, 2H), 2.43 (s, 3H); ¹³C NMR (100 MHz, CDCl₃) δ 191.7 (t, J=26.3 Hz), 145.6 (s), 134.1 (t, J=3.6 Hz), 129.9 (s), 129.7 (s), 21.9 (s); HRMS (EI): m/z calcd for C₈H₇DO [(M)⁺]: 121.0638, found: 121.0639.

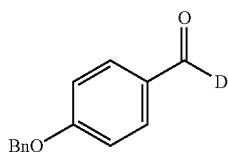 [SMILES: [2H]C(=O)c1ccc(OCc2ccccc2)cc1]

4-Benzyloxybenzaldehyde-α-d₁ (7f)

4-Benzyloxybenzaldehyde (0.5 mmol), 5o (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 40° C. for 12 hours. 7f was obtained as a yellow solid in 98% yield with 98% D-incorporation. ¹H NMR (400 MHz, CDCl₃) δ 9.89 (s, 0.02H), 7.84 (d, J=8.8 Hz, 2H), 7.46-7.35 (m, 5H), 7.08 (d, J=8.8 Hz, 2H), 5.15 (s, 2H); ¹³C NMR (100 MHz, CDCl₃) δ 190.5 (t, J=26.2 Hz), 163.8 (s), 136.0 (s), 132.0 (s), 130.1 (t, J=3.5 Hz), 128.8 (s), 128.4 (s), 127.5 (s), 115.2 (s), 70.3 (s); HRMS (EI): m/z calcd for C₁₄H₁₁DO₂ [(M)⁺]: 213.0900, found: 213.0904.

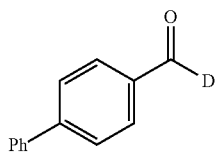

[1,1'-Biphenyl]-4-carbaldehyde-α-d₁ (7g)

[1,1'-biphenyl]-4-carbaldehyde (0.5 mmol), 5o (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 40° C. for 12 hours. 7g was obtained as a white solid in 95% yield with 98% D-incorporation. ¹H NMR (400 MHz, CDCl₃) δ 10.06 (s, 0.02H), 7.96 (d, J=8.4 Hz, 2H), 7.75 (d, J=8.4 Hz, 2H), 7.66-7.62 (m, 2H), 7.51-7.46 (m, 2H), 7.45-7.39 (m, 1H); ¹³C NMR (100 MHz, CDCl₃) δ 191.7 (t, J=26.5 Hz), 147.2 (s), 139.7 (s), 135.1 (t, J=3.5 Hz), 130.3 (s), 129.1 (s), 128.5 (s), 127.7 (s), 127.4 (s); HRMS (EI): m/z calcd for C₁₃H₉DO [(M)⁺]: 183.0794, found: 183.0796.

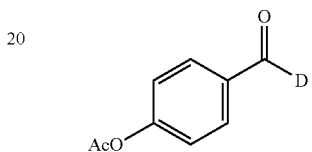

4-Acetoxybenzaldehyde-α-d₁ (7h)

4-Acetoxybenzaldehyde (0.5 mmol), 5o (10 mol %) and NaHCO₃ (0.5 mmol, 1 equiv), was dissolved in a mixture of D₂O (1 mL) and toluene (0.25 mL) in a reaction vessel (5 mL). Then the reaction mixture was vigorously stirred at 60° C. for 12 hours. 7h was obtained colorless as a oil in 47% yield with 97% D-incorporation. ¹H NMR (400 MHz, CDCl₃) δ 9.99 (s, 0.03H), 7.92 (d, J=8.6 Hz, 2H), 7.28 (d, J=8.6 Hz, 2H), 2.34 (s, 3H); ¹³C NMR (100 MHz, CDCl₃) δ 190.6 (t, J=26.6 Hz), 168.7 (s), 155.4 (s), 133.9 (t, J=3.6 Hz), 131.2 (s), 122.4 (s), 21.2 (s); HRMS (EI): m/z calcd for C₉H₇DO₃ [(M)⁺]: 165.0536, found: 165.0537.

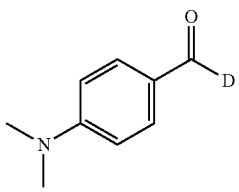

4-Dimethylaminobenzaldehyde-α-d₁ (7i)

4-Dimethylaminobenzaldehyde (0.5 mmol), 5ag (30 mol %) and AcOK (1 mmol, 2 equiv) was dissolved in a mixture of D₂O (1 mL) and toluene (0.25 mL) in a reaction vessel (5 mL). Then the reaction mixture was vigorously stirred at 80° C. for 12 hours. 7i was obtained as a white solid in 83% yield with 98% D-incorporation. ¹H NMR (400 MHz, CDCl₃) δ 9.73 (s, 0.02H), 7.73 (d, J=9.0 Hz, 2H), 6.69 (d, J=9.0 Hz, 2H), 3.07 (s, 6H); ¹³C NMR (100 MHz, CDCl₃) δ 190.1 (t, J=25.8 Hz), 154.4 (s), 132.0 (s), 125.0 (t, J=3.4 Hz), 111.0 (s), 40.1 (s); HRMS (EI): m/z calcd for C₉H₁₀DNO [(M)⁺]: 150.0903, found: 150.0903.

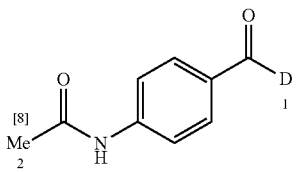 [SMILES: [2H]C(=O)c1ccc(NC(C)=O)cc1]

4-Acetamidobenzaldehyde-1,2-d$_1$,d$_3$ (7j)

4-Acetamidobenzaldehyde (0.5 mmol), 5m (10 mol %) and K$_2$CO$_3$ (0.5 mmol, 1 equiv) was dissolved in a mixture of D$_2$O (1 mL) and toluene (0.25 mL) in a reaction vessel (5 mL). Then the reaction mixture was vigorously stirred at 80° C. for 12 hours. 7j was obtained as a white solid in 64% yield with 99% D-incorporation at position 1 and 8% D-incorporation at position 2. $^1$H NMR (400 MHz, DMSO-d$_6$) δ 10.38 (s, 1H), 9.86 (s, 0.01H), 7.85 (d, J=8.8 Hz, 2H), 7.78 (d, J=8.8 Hz, 2H), 2.13-2.05 (m, 2.77H); $^{13}$C NMR (100 MHz, DMSO-d$_6$) δ 191.2 (t, J=26.7 Hz), 169.1 (s), 144.8 (s), 131.0 (s), 130.8 (s), 118.5 (s), 24.2-23.7 (m); HRMS (EI): m/z calcd for C$_9$H$_8$DNO$_2$ [(M)$^+$]: 164.0696 Found: 164.0696; C$_9$H$_7$D$_2$NO$_2$ [(M)$^+$]: 165.0759, found: 165.0758.

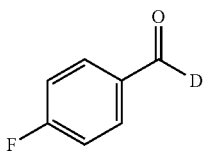

4-Fluorobenzaldehyde-α-d$_1$ (7k)

4-Fluorobenzaldehyde (0.5 mmol), 5o (10 mol %) and NaHCO$_3$ (0.5 mmol, 1 equiv), was dissolved in a mixture of D$_2$O (1 mL) and DCM (0.25 mL) in a reaction vessel (5 mL). Then the reaction mixture was vigorously stirred at 60° C. for 12 hours. 7k was obtained as a colorless oil in 50% yield with 98% D-incorporation. $^1$H NMR (400 MHz, CDCl$_3$) δ 9.97 (s, 0.02H), 7.93-7.89 (m, 2H), 7.25-7.18 (m, 2H); $^{13}$C NMR (100 MHz, CDCl$_3$) δ 190.2 (t, J=26.6 Hz), 166.6 (d, J=256.7 Hz), 132.9 (t, J=3.3 Hz), 132.3 (d, J=9.7 Hz), 116.4 (d, J=22.3 Hz); HRMS (EI): m/z calcd for C$_7$H$_4$DFO [(M)$^+$]: 125.0387, found: 125.0386.

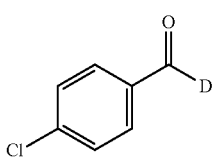

4-Chlorobenzaldehyde-α-d$_1$ (7l)

4-Chlorobenzaldehyde (0.5 mmol), 5o (10 mol %) and NaHCO$_3$ (0.5 mmol, 1 equiv), was dissolved in a mixture of D$_2$O (1 mL) and toluene (0.25 mL) in a reaction vessel (5 mL). Then the reaction mixture was vigorously stirred at 40° C. for 12 hours. 7l was obtained as a shite solid in 79% yield with 98% D-incorporation. $^1$H NMR (400 MHz, CDCl$_3$): δ 9.96 (s, 0.02H), 7.81 (d, J=8.6 Hz, 2H), 7.49 (d, J=8.6 Hz, 2H); $^{13}$C NMR (100 MHz, CDCl$_3$): δ 190.6 (t, J=26.7 Hz), 141.0 (s), 134.6 (t, J=3.7 Hz), 130.9 (s), 129.5 (s); HRMS (EI): m/z calcd for C$_7$H$_4$DClO [(M)$^+$]: 141.0092, found: 141.0091.

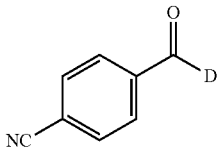

4-Formylbenzonitrile-α-d$_1$ (7m)

4-formylbenzonitrile (0.5 mmol), 5o (10 mol %) and KOAc (0.5 mmol, 1 equiv) was dissolved in a mixture of D$_2$O (1 mL) and toluene (0.25 mL) in a reaction vessel (5 mL). Then the reaction mixture was vigorously stirred at 60° C. for 12 hours. 7m was obtained as a yellow solid in 75% yield with 98% D-incorporation. $^1$H NMR (400 MHz, CDCl$_3$) δ 10.08 (s, 0.02H), 7.99 (d, J=8.4 Hz, 2H), 7.84 (d, J=8.4 Hz, 2H); $^{13}$C NMR (100 MHz, CDCl$_3$) δ 190.4 (t, J=27.2 Hz), 138.7 (t, J=3.7 Hz), 132.9 (s), 129.9 (s), 117.76 (s), 117.6 (s); HRMS (EI): m/z calcd for C$_8$H$_4$DNO [(M)$^+$]: 132.0434, found: 132.0436.

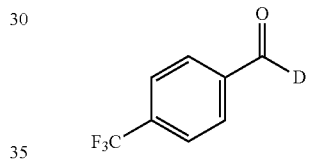

4-(Trifluoromethyl)benzaldehyde-α-d$_1$ (7n)

4-(Trifluoromethyl)benzaldehyde (0.5 mmol), 5o (10 mol %) and KOAc (0.5 mmol, 1 equiv) was dissolved in a mixture of D$_2$O (1 mL) and toluene (0.25 mL) in a reaction vessel (5 mL). Then the reaction mixture was vigorously stirred at 80° C. for 12 hours. 7n was obtained as a yellow oil in 44% yield with 98% D-incorporation. $^1$H NMR (400 MHz, CDCl$_3$) δ 10.10 (s, 0.02H), 8.01 (d, J=8.2 Hz, 2H), 7.81 (d, J=8.2 Hz, 2H); $^{13}$C NMR (100 MHz, CDCl$_3$) δ 190.8 (t, J=27.0 Hz), 138.6 (s), 135.6 (q, J=32.6 Hz), 129.9 (s), 126.1 (q, J=3.8 Hz), 123.4 (d, J=272.9 Hz); HRMS (EI): m/z calcd for C$_8$H$_4$DF$_3$O [(M)$^+$]: 175.0355, found: 175.0356.

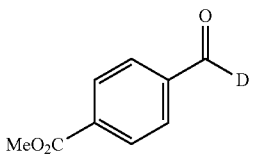

Methyl 4-formylbenzoate-α-d$_1$ (7o)

Methyl 4-formylbenzoate (0.5 mmol), 5o (10 mol %) and NaHCO$_3$ (0.5 mmol, 1 equiv) was dissolved in a mixture of D$_2$O (1 mL) and toluene (0.25 mL) in a reaction vessel (5 mL). Then the reaction mixture was vigorously stirred at 40°

C. for 12 hours. 7o was obtained as a white solid in 68% yield with 99% D-incorporation. $^1$H NMR (400 MHz, CDCl$_3$) δ 10.08 (s, 0.01H), 8.18 (dt, J=8.4, 1.6 Hz, 2H), 7.94 (dt, J=8.5, 2.0 Hz, 2H), 3.94 (s, 3H); $^{13}$C NMR (100 MHz, CDCl$_3$) δ 191.4 (t, J=26.9 Hz), 166.1 (s), 139.1 (t, J=3.6 Hz), 135.1 (s), 130.2 (s), 129.5 (s), 52.6 (s); HRMS (EI): m/z calcd for C$_7$H$_9$DO$_3$: 165.0536, found: 165.0538.

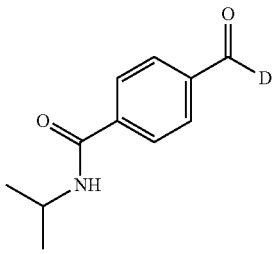

4-Formyl-N-isopropylbenzamide-α-d$_1$ (7p)

4-Formyl-N-isopropylbenzamide (0.5 mmol), 5o (10 mol %) and NaHCO$_3$ (0.5 mmol, 1 equiv) was dissolved in a mixture of D$_2$O (1 mL) and toluene (0.25 mL) in a reaction vessel (5 mL). Then the reaction mixture was vigorously stirred at 60° C. for 12 hours. 7p was obtained as a white solid in 75% yield with 99% D-incorporation. $^1$H NMR (400 MHz, DMSO-d$_6$) δ 10.07 (s, 0.01H), 8.45 (d, J=7.6 Hz, 1H), 8.02 (d, J=8.5 Hz, 2H), 7.98 (d, J=8.4 Hz, 2H), 4.15-4.07 (m, 1H), 1.17 (d, J=6.6 Hz, 6H); $^{13}$C NMR (100 MHz, DMSO-d$_6$) δ 192.6 (t, J=26.9 Hz), 164.5 (s), 139.8 (s), 137.5 (s), 129.3 (s), 127.9 (s), 41.2 (s), 22.2 (s); HRMS (EI): m/z calcd for C$_{11}$H$_{12}$DNO$_2$ [(M)$^+$]: 192.1009, found: 192.1011.

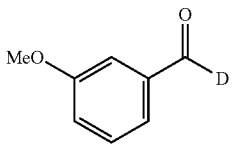 [SMILES: [2H]C(=O)c1cccc(OC)c1]

3-Methoxybenzaldehyde-α-d$_1$ (7q)

3-methoxybenzaldehyde (0.5 mmol), 5o (10 mol %) and NaHCO$_3$ (0.5 mmol, 1 equiv), was dissolved in a mixture of D$_2$O (1 mL) and toluene (0.25 mL) in a reaction vessel (5 mL). Then the reaction mixture was vigorously stirred at 40° C. for 12 hours. 7q was obtained as a yellow oil in 92% yield with 98% D-incorporation. $^1$H NMR (400 MHz, CDCl$_3$) δ 9.95 (s, 0.03H), 7.46-7.40 (m, 2H), 7.37 (d, J=2.0 Hz, 1H), 7.18-7.14 (m, 1H), 3.84 (s, 3H); $^{13}$C NMR (100 MHz, CDCl$_3$) δ 191.8 (t, J=26.6 Hz), 160.2 (s), 137.7 (t, J=3.6 Hz), 130.0 (s), 123.5 (s), 121.5 (s), 112.0 (s), 55.5 (d, J=1.1 Hz); HRMS (EI): m/z calcd for C$_8$H$_7$DO$_2$ [(M)$^+$]: 137.0587, found: 137.0588.

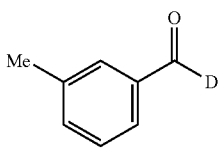

m-Tolualdehyde-α-d$_1$ (7r)

M-Tolualdehyde (0.5 mmol), 5o (10 mol %) and NaHCO$_3$ (0.5 mmol, 1 equiv) was dissolved in a mixture of D$_2$O (1 mL) and toluene (0.25 mL) in a reaction vessel (5 mL). Then the reaction mixture was vigorously stirred at 60° C. for 12 hours. 7r was obtained as a colorless oil in 91% yield with 98% D-incorporation. $^1$H NMR (400 MHz, CDCl$_3$) δ 9.98 (s, 0.02H), 7.70-7.67 (m, 2H), 7.46-7.39 (m, 2H), 2.43 (s, 3H); $^{13}$C NMR (100 MHz, CDCl$_3$) δ 192.3 (t, J=26.5 Hz), 138.9 (s), 136.4 (t, J=3.5 Hz), 135.3 (s), 130.0 (s), 128.9 (s), 127.2 (s), 21.2 (s); HRMS (EI): m/z calcd for C$_8$H$_7$DO [(M)$^+$]: 121.0638, found: 121.0639.

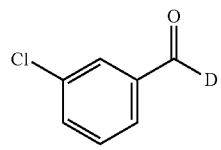

3-Chlorobenzaldehyde-α-d$_1$ (7s)

3-Chlorobenzaldehyde (0.5 mmol), 5o (5 mol %) and NaHCO$_3$ (0.5 mmol, 1 equiv), was dissolved in a mixture of D$_2$O (1 mL) and toluene (0.25 mL) in a reaction vessel (5 mL). Then the reaction mixture was vigorously stirred at 40° C. for 12 hours. 7s was obtained as a colorless oil in 71% yield with 98% D-incorporation. $^1$H NMR (400 MHz, CDCl$_3$) δ 9.97 (s, 0.02H), 7.85 (t, J=1.8 Hz, 1H), 7.76 (dt, J=7.6, 1.2 Hz, 1H), 7.62-7.58 (m, 1H), 7.48 (t, J=7.8 Hz, 1H); $^{13}$C NMR (100 MHz, CDCl$_3$) δ 190.5 (t, J=27 Hz), 137.8 (t, J=3.7 Hz), 135.5 (s), 134.4 (s), 130.4 (s), 129.3 (s), 128.0 (s); HRMS (EI): m/z calcd for C$_7$H$_4$DClO [(M)$^+$]: 141.0092, found: 141.0091.

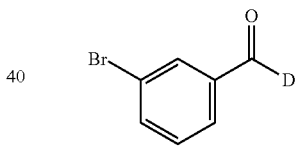

3-Bromobenzaldehyde-α-d$_1$ (7t)

3-Bromobenzaldehyde (0.5 mmol), 5o (5 mol %) and NaHCO$_3$ (0.5 mmol, 1 equiv) was dissolved in a mixture of D$_2$O (1 mL) and toluene (0.25 mL) in a reaction vessel (5 mL). Then the reaction mixture was vigorously stirred at 40° C. for 12 hours. 7t was obtained as a colorless oil in 86% yield with 99% D-incorporation. $^1$H NMR (400 MHz, CDCl$_3$) δ 9.95 (s, 0.01H), 8.00 (t, J=1.7 Hz, 1H), 7.80 (dt, J=7.6, 1.2 Hz, 1H), 7.76-7.72 (m, 1H), 7.42 (t, J=7.8 Hz, 1H); $^{13}$C NMR (100 MHz, CDCl$_3$) δ 190.4 (t, J=26.9 Hz), 137.9 (t, J=3.7 Hz), 137.3 (s), 132.4 (s), 130.6 (s), 128.4 (s), 123.4 (s); HRMS (EI): m/z calcd for C$_7$H$_4$DBrO [(M)$^+$]: 184.9587, found: 184.9588.

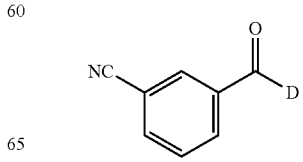

3-Formylbenzonitrile-α-d₁ (7u)

3-Formylbenzonitrile (0.5 mmol), 5o (10 mol %) and KOAc (0.5 mmol, 1 equiv) was dissolved in a mixture of D₂O (1 mL) and toluene (0.25 mL) in a reaction vessel (5 mL). Then the reaction mixture was vigorously stirred at 60° C. for 12 hours. 3-formylbenzonitrile-α-d₁ was obtained as a yellow solid in 81% yield with 95% D-incorporation.

3-Formylbenzonitrile-α-d₁ (95% D, 0.40 mmol), 5o (10 mol %) and KOAc (0.40 mmol, 1 equiv) was dissolved in a mixture of D₂O (1 mL) and toluene (0.25 mL) in a reaction vessel (5 mL). Then the reaction mixture was vigorously stirred at 60° C. for 12 hours again. 7u was obtained as a colorless solid in 59% yield (for two steps) with 99% D-incorporation. $^1$H NMR (400 MHz, CDCl₃) δ 10.04 (s, 0.01H), 8.16 (s, 1H), 8.12 (d, J=7.8 Hz, 1H), 7.91 (d, J=7.7 Hz, 1H), 7.69 (t, J=7.7 Hz, 1H); $^{13}$C NMR (100 MHz, CDCl₃) δ 188.7 (t, J=27.2 Hz), 136.2 (s), 135.8 (t, J=3.8 Hz), 132.3 (s), 132.1 (s), 129.1 (s), 116.6 (s), 112.7 (s); HRMS (EI): m/z calcd for C₈H₄DNO [(M)⁺]: 132.0434, found: 132.0435.

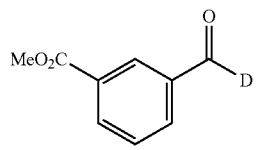

Methyl 3-formylbenzoate-α-d₁ (7v)

Methyl 3-formylbenzoate (0.5 mmol), 5o (10 mol %) and NaHCO₃ (0.5 mmol, 1 equiv) was dissolved in a mixture of D₂O (1 mL) and toluene (0.25 mL) in a reaction vessel (5 mL). Then the reaction mixture was vigorously stirred at 40° C. for 12 hours. 7v was obtained as a yellow oil in 59% yield with 99% D-incorporation. $^1$H NMR (400 MHz, CDCl₃) δ 10.07 (s, 0.01H), 8.54-8.52 (m, 1H), 8.29 (dt, J=7.6, 1.6 Hz, 1H), 8.08 (dt, J=7.7, 1.4 Hz, 1H), 7.63 (t, J=11.4, 1H), 3.96 (s, 3H); $^{13}$C NMR (100 MHz, CDCl₃) δ 191.1 (t, J=26.8 Hz), 166.0 (s), 136.5 (d, J=3.5 Hz), 135.2 (s), 133.1 (s), 131.3 (d, J=7.1 Hz), 129.3 (s), 52.5 (s); HRMS (EI): m/z calcd for C₇H₉DO₃[(M)⁺]: 165.0536, found: 165.0538.

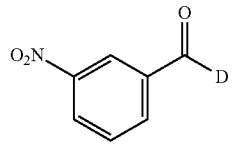 [SMILES: [2H]C(=O)c1cccc([N+](=O)[O-])c1]

3-Nitrobenzaldehyde-α-d₁ (7w)

3-Nitrobenzaldehyde (0.5 mmol), 5o (5 mol %) and KOAc (0.5 mmol, 1 equiv) was dissolved in a mixture of D₂O (1 mL) and toluene (0.25 mL) in a reaction vessel (5 mL). Then the reaction mixture was vigorously stirred at 80° C. for 12 hours. 7w was obtained as a yellow solid in 55% yield with 99% D-incorporation. $^1$H NMR (400 MHz, CDCl₃) δ 10.12 (s, 0.01H), 8.72 (s, 1H), 8.51-8.48 (m, 1H), 8.24 (d, J=7.6, 1H), 7.77 (t, J=7.9 Hz, 1H); $^{13}$C NMR (100 MHz, CDCl₃) δ 189.5 (t, J=27.3 Hz), 148.8 (s), 137.3 (t, J=3.8 Hz), 134.7 (s), 130.4 (s), 128.6 (s), 124.5 (s); HRMS (EI): m/z calcd for C₇H₄NDO₃ [(M)⁺]: 152.0332, found: 152.0333.

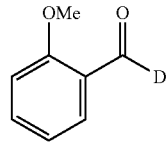

2-Methoxybenzaldehyde-α-d₁ (7x)

2-Methoxybenzaldehyde (0.5 mmol), 5o (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 60° C. for 12 hours. 7x was obtained as a yellow oil in 95% yield with 98% D-incorporation. $^1$H NMR (400 MHz, CDCl₃) δ 10.43 (s, 0.02H), 7.79 (dd, J=7.7, 1.8 Hz, 1H), 7.54-7.49 (m, 1H), 7.00-6.93 (m, 2H), 3.88 (s, 3H); $^{13}$C NMR (100 MHz, CDCl₃) δ 189.5 (t, J=27.5 Hz), 161.9 (s), 136.0 (s), 128.4 (s), 124.7 (t, J=3.3 Hz), 120.6 (s), 111.6 (s), 55.6 (s); HRMS (EI): m/z calcd for C₈H₇DO₂ [(M)⁺]: 137.0587, found: 137.0588.

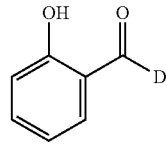

Salicylaldehyde-α-d₁ (7y)

Salicylaldehyde (0.5 mmol), 5o (10 mol %) and NaHCO₃ (0.5 mmol, 1 equiv) was dissolved in a mixture of D₂O (1 mL) and toluene (0.25 mL) in a reaction vessel (5 mL). Then the reaction mixture was vigorously stirred at 80° C. for 12 hours. 7y was obtained as a colorless oil in 47% yield with 99% D-incorporation. $^1$H NMR (400 MHz, CDCl₃) δ 11.04 (s, 1H), 9.89 (s, 0.01H), 7.57-7.50 (m, 2H), 7.04-6.97 (m, 2H); $^{13}$C NMR (100 MHz, CDCl₃) δ 196.3 (t, J=26.9 Hz), 161.7 (s), 137.0 (s), 133.7 (s), 120.6 (t. J=3.0 Hz), 119.9 (s), 117.6 (s); HRMS (EI): m/z calcd for C₇H₅DO₂ [(M)⁺]: 123.0431, found: 123.0432.

N-(2-Formylphenyl)acetamide-α-d₁ (7z)

N-(2-Formylphenyl)acetamide (0.5 mmol), 5m (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 80° C. for 12 hours. 7z was obtained as a yellow solid in 90% yield with 99% D-incorporation. $^1$H NMR (400 MHz, CDCl$_3$) δ 11.15 (s, 1H), 9.92 (s, 0.01H), 8.74 (d, J=8.5 Hz, 1H), 7.68 (dd, J=7.6, 1.5 Hz, 1H), 7.61 (dt, J=8.5, 1.5 Hz, 1H), 7.23 (t, J=7.5 Hz, 1H), 2.26 (s, 3H); $^{13}$C NMR (100 MHz, CDCl$_3$) δ 195.2 (t, J=27.0), 169.6 (s), 140.9 (s), 136.2 (s), 136.0 (s), 122.8 (s), 121.3 (t, J=3.0 Hz), 119.7 (s), 25.4 (s); HRMS (EI): m/z calcd for C$_9$H$_8$DNO$_2$ [(M)$^+$]: 164.0696, found: 164.0697.

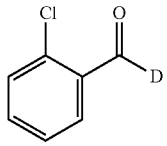

2-Chloorbenzaldehyde-α-d$_1$ (7aa)

2-chloorbenzaldehyde (0.5 mmol), 5o (10 mol %) and K$_2$CO$_3$ (0.5 mmol, 1 equiv) was dissolved in a mixture of D$_2$O (1 mL) and toluene (0.25 mL) in a reaction vessel (5 mL). Then the reaction mixture was vigorously stirred at 40° C. for 12 hours. 7aa was obtained as a yellow oil in 79% yield with 97% D-incorporation. $^1$H NMR (400 MHz, CDCl$_3$) δ 10.47 (s, 0.03H), 7.91 (dd, J=7.7, 1.6 Hz, 1H), 7.52 (dt, J=8.1, 1.7 Hz, 1H), 7.44 (d, J=7.3 Hz, 1H), 7.40-7.35 (m, 1H); $^{13}$C NMR (100 MHz, CDCl$_3$) δ 189.5 (t, J=27.8 Hz), 138.0 (s), 135.1 (s), 132.4 (t, J=3.5 Hz), 130.6 (s), 129.4 (s), 127.3 (s); HRMS (EI): m/z calcd for C$_7$H$_4$DClO [(M)$^+$]: 141.0092, found: 141.0090.

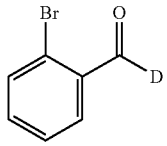

2-Bromobenzaldehyde-α-d$_1$ (7ab)

2-Bromobenzaldehyde (0.5 mmol), 5o (10 mol %) and K$_2$CO$_3$ (0.5 mmol, 1 equiv) was dissolved in a mixture of D$_2$O (1 mL) and toluene (0.25 mL) in a reaction vessel (5 mL). Then the reaction mixture was vigorously stirred at 40° C. for 12 hours. 7ab was obtained as a yellow oil in 93% yield with 99% D-incorporation. $^1$H NMR (400 MHz, DMSO) δ 10.33 (s, 0.01H), 7.90-7.87 (m, 1H), 7.63-7.60 (m, 1H), 7.45-7.37 (m, 2H); $^{13}$C NMR (100 MHz, CDCl$_3$) δ 190.4 (t, J=27.9 Hz), 134.3 (s), 132.8 (s), 132.4 (t, J=3.5 Hz), 128.8 (s), 126.9 (s), 126.1 (s); HRMS (EI): m/z calcd for C$_7$H$_4$DBrO [(M)$^+$]: 184.9587, found: 184.9586.

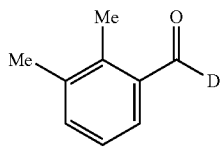 [SMILES: [2H]C(=O)c1cccc(C)c1C]

2,3-Dimethylbenzalde-α-d$_1$ (7ac)

2,3-Dimethylbenzalde (0.5 mmol), 5o (10 mol %) and K$_2$CO$_3$ (0.5 mmol, 1 equiv) was dissolved in a mixture of D$_2$O (1 mL) and toluene (0.25 mL) in a reaction vessel (5 mL). Then the reaction mixture was vigorously stirred at 40° C. for 12 hours. 7ac was obtained as a colorless oil in 83% yield with 98% D-incorporation. $^1$H NMR (400 MHz, CDCl$_3$) δ 10.22 (s, 0.02H), 7.56 (d, J=7.7 Hz, 1H), 7.29 (d, J=7.4 Hz, 1H), 7.16 (t, J=7.6 Hz, 1H), 2.49 (s, 3H), 2.25 (s, 3H); $^{13}$C NMR (100 MHz, CDCl$_3$) δ 192.9 (t, J=26.4 Hz), 139.2 (s), 138.3 (s), 135.3 (s), 134.3 (t, J=3.4 Hz), 129.8 (s), 125.8 (s), 20.0 (s), 14.4 (s); HRMS (EI): m/z calcd for C$_9$H$_9$DO [(M)$^+$]: 135.0794, found: 135.0795.

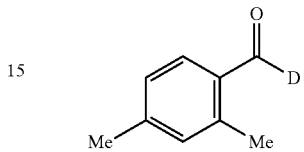

2,4-DiMethylbenzaldehyde-α-d$_1$ (7ad)

2,4-DiMethylbenzaldehyde (0.5 mmol), 5m (10 mol %) and K$_2$CO$_3$ (0.5 mmol, 1 equiv) was dissolved in a mixture of D$_2$O (1 mL) and toluene (0.25 mL) in a reaction vessel (5 mL). Then the reaction mixture was vigorously stirred at 60° C. for 12 hours. 7ad was obtained as a colorless oil in 88% yield with 98% D-incorporation. $^1$H NMR (400 MHz, CDCl$_3$) δ 10.18 (s, 0.02H), 7.68 (d, J=7.8 Hz, 1H), 7.14 (d, J=7.8 Hz, 1H), 7.05 (s, 1H), 2.62 (s, 3H), 2.37 (s, 3H); $^{13}$C NMR (100 MHz, CDCl$_3$) δ 192.1 (t, J=26.3 Hz), 144.6 (s), 140.6 (s), 132.6 (s), 132.4 (s), 132.06-131.9 (t, J=3.4 Hz), 127.1 (s), 21.7 (s), 19.6 (s); HRMS (EI): m/z calcd for C$_9$H$_9$DO [(M)$^+$]: 135.0794, found: 135.0795.

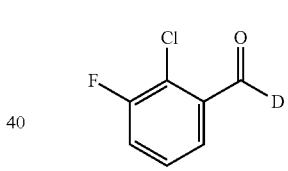

2-Chloro-3-fluorobenzaldehyde-α-d$_1$ (7ae)

2-Chloro-3-fluorobenzaldehyde (0.5 mmol), 5o (10 mol %) and NaHCO$_3$ (0.5 mmol, 1 equiv) was dissolved in a mixture of D$_2$O (1 mL) and toluene (0.25 mL) in a reaction vessel (5 mL). Then the reaction mixture was vigorously stirred at 60° C. for 12 hours. 7ae was obtained as a white solid in 86% yield with 98% D-incorporation. $^1$H NMR (400 MHz, CDCl$_3$) δ 10.44 (s, 0.02H), 7.74-7.71 (m, 1H), 7.42-7.33 (m, 2H); $^{13}$C NMR (100 MHz, CDCl$_3$) δ 188.2 (td, J=28.1, 3.8 Hz), 158.4 (d, J=250.8 Hz), 133.9 (t, J=3.5), 128.0 (d, J=7.4 Hz), 124.9 (d, J=18.5 Hz), 124.7 (d, J=3.5 Hz), 121.8 (d, J=21.4 Hz); HRMS (EI): m/z calcd for C$_7$H$_3$DClFO [(M)$^+$]: 158.9997, found: 158.9998.

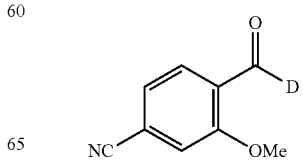

4-Formyl-3-methoxybenzonitrile-α-d₁ (7af)

4-Formyl-3-methoxybenzonitrile (0.5 mmol), 5o (10 mol %) and NaHCO₃ (0.5 mmol, 1 equiv) was dissolved in a mixture of D₂O (1 mL) and toluene (0.25 mL) in a reaction vessel (5 mL). Then the reaction mixture was vigorously stirred at 60° C. for 12 hours. 7af was obtained as a yellow solid in 81% yield with 99% D-incorporation. $^1$H NMR (400 MHz, CDCl₃) δ 10.49 (s, 0.01H), 7.91 (d, J=7.9 Hz, 1H), 7.34 (d, J=7.9 Hz, 1H), 7.29 (s, 1H), 4.00 (s, 3H); $^{13}$C NMR (100 MHz, CDCl₃) δ 188.0 (t, J=28.2 Hz), 161.3 (s), 129.2 (s), 127.5 (t, J=3.4 Hz), 124.4 (s), 118.5 (s), 117.8 (s), 115.4 (s), 56.2 (s); HRMS (EI): m/z calcd for C₉H₆DNO₂ [(M)⁺]: 162.0540, found: 162.0541.

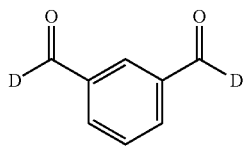

Isophthalaldehyde-1,3-d₁,d₁ (7ag)

Isophthalaldehyde (0.5 mmol), 5o (20 mol %) and KOAc (1 mmol, 2 equiv) was dissolved in a mixture of D₂O (1 mL) and toluene (0.25 mL) in a reaction vessel (5 mL). Then the reaction mixture was vigorously stirred at 60° C. for 12 hours. 7ag was obtained as a white solid in 68% yield with 97.5% D-incorporation. $^1$H NMR (400 MHz, CDCl₃) δ 10.10 (s, 0.05H), 8.37 (t, J=1.4 Hz, 1H), 8.15 (dd, J=7.6, 1.6 Hz, 2H), 7.72 (t, J=7.6 Hz, 1H); $^{13}$C NMR (100 MHz, CDCl₃) δ 190.8 (t, J=27 Hz), 136.9 (t, J=3.7 Hz), 134.7 (s), 131.0 (s), 129.9 (s); HRMS (EI): m/z calcd for C₈H₄D₂O₂ [(M)⁺]: 136.0493, found: 136.0494.

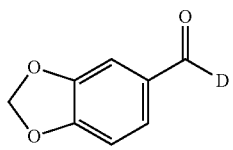 [SMILES: [2H]C(=O)c1ccc2c(c1)OCO2]

Piperonal-α-d₁ (7ah)

Piperonal (0.5 mmol), 5o (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 40° C. for 12 hours. 7ah was obtained as a colorless solid in 98% yield with 99% D-incorporation. $^1$H NMR (400 MHz, CDCl₃) δ 9.79 (s, 0.01H), 7.39 (dd, J=7.9, 1.5 Hz, 1H), 7.31 (d, J=1.5 Hz, 1H), 6.91 (d, J=7.9 Hz, 1H), 6.06 (s, 2H); $^{13}$C NMR (100 MHz, CDCl₃) δ 190.0 (t, J=26.5 Hz), 153.1 (s), 148.7 (s), 131.8 (t, J=3.6 Hz), 128.7 (s), 108.4 (s), 106.9 (s), 102.1 (s); HRMS (EI): m/z calcd for C₈H₅DO₃ [(M)⁺]: 151.0380, found: 151.0381.

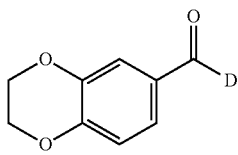 [SMILES: [2H]C(=O)c1ccc2c(c1)OCCO2]

1,4-Benzodioxin-6-carboxaldehyde-α-d₁ (7ai)

1,4-Benzodioxin-6-carboxaldehyde (0.5 mmol), 5o (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 40° C. for 12 hours. 7ai was obtained as a yellow solid in 99% yield with 98% D-incorporation. $^1$H NMR (400 MHz, CDCl₃) δ 9.80 (s, 0.02H), 7.40-7.37 (m, 2H), 6.98-6.94 (m, 1H), 4.34-4.26 (m, 4H); $^{13}$C NMR (100 MHz, CDCl₃) δ 190.5 (t, J=26.4 Hz), 149.3 (s), 143.9 (s), 130.6 (t, J=3.6 Hz), 124.2 (s), 118.4 (s), 117.8 (s), 64.7 (s), 64.1 (s); HRMS (EI): m/z calcd for C₉H₇DO₃ [(M)⁺]: 165.0536, found: 165.0537.

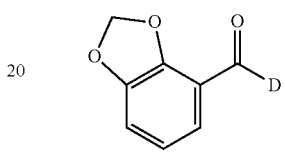

2,3-(Methylenedioxy)benzaldehyde-α-d₁ (7aj)

2,3-(Methylenedioxy)benzaldehyde (0.5 mmol), 5o (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 40° C. for 12 hours. 7aj was obtained as a colorless solid in 81% yield with 97% D-incorporation. $^1$H NMR (400 MHz, CDCl₃) δ 10.09 (s, 0.03H), 7.25 (dd, J=7.7, 1.2 Hz, 1H), 6.99 (dd, J=7.7, 1.2 Hz, 1H), 6.90 (t, J=7.9 Hz, 1H), 6.10 (s, 2H); $^{13}$C NMR (100 MHz, CDCl₃) δ 186.7 (t, J=27.1 Hz), 148.2 (s), 147.9 (s), 120.7 (s), 120.1 (s), 118.3 (t, J=3.6 Hz), 112.4 (s), 101.5 (s); HRMS (EI): m/z calcd for C₈H₅DO₃ [(M)⁺]: 151.0380, found: 151.0381.

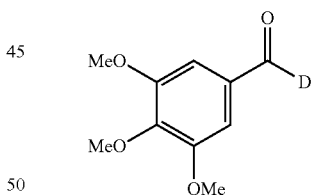

3,4,5-Trimethoxybenzaldehyde-α-d₁ (7ak)

3,4,5-Trimethoxybenzaldehyde (0.5 mmol), 5o (10 mol %) and NaHCO₃ (0.5 mmol, 1 equiv) was dissolved in a mixture of D₂O (1 mL) and toluene (0.25 mL) in a reaction vessel (5 mL). Then the reaction mixture was vigorously stirred at 60° C. for 12 hours. 7ak was obtained as a white solid in 88% yield with 99% D-incorporation. $^1$H NMR (400 MHz, CDCl₃) δ 9.79 (s, 0.01H), 7.06 (s, 2H), 3.87 (s, 3H), 3.86 (s, 6H); $^{13}$C NMR (100 MHz, CDCl₃) δ 190.7 (t, J=26.6 Hz), 153.6 (s), 143.5 (s), 131.6 (t, J=3.2 Hz), 106.6 (s), 60.9 (d, J=2.6 Hz), 56.2 (d, J=2.5 Hz); HRMS (EI): m/z calcd for C₁₁H₁₁DO₄ [(M)⁺]: 197.0798, found: 197.0796.

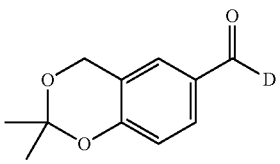

2,2-Dimethyl-4H-benzo[d][1,3]dioxine-6-carbaldehyde-α-$d_1$ (7al)

2,2-Dimethyl-4H-benzo[d][1,3]dioxine-6-carbaldehyde (0.5 mmol), 5o (10 mol %), $K_2CO_3$ (0.5 mmol, 1 equiv) was dissolved in a mixture of $D_2O$ (1 mL) and toluene (0.25 mL) in a reaction vessel (5 mL). Then the reaction mixture was vigorously stirred at 40° C. for 12 hours. 7al was obtained as a in 88% yield with 98% D-incorporation. $^1$H NMR (400 MHz, CDCl$_3$) δ 9.81 (s, 0.02H), 7.66 (dd, J=8.5, 2.0 Hz, 1H), 7.51 (t, J=0.8 Hz, 1H), 6.89 (d, J=8.5 Hz, 1H), 4.86 (s, 2H), 1.53 (s, 6H); $^{13}$C NMR (100 MHz, CDCl$_3$) δ 190.5 (t, J=26.3 Hz), 156.8 (s), 130.4 (s), 129.3 (t, J=3.4 Hz), 126.9 (s), 119.7 (s), 117.7 (s), 100.76 (s), 60.6 (s), 24.8 (s); HRMS (EI): m/z calcd for $C_{11}H_{11}DO_3$ [(M)$^+$]: 193.0849, found: 193.0850.

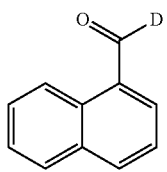 [SMILES: [2H]C(=O)c1cccc2ccccc12]

1-Naphthaldehyde-α-$d_1$ (7am)

1-Naphthaldehyde (0.5 mmol), 5o (10 mol %) and $K_2CO_3$ (0.5 mmol, 1 equiv) was dissolved in a mixture of $D_2O$ (1 mL) and toluene (0.25 mL) in a reaction vessel (5 mL). Then the reaction mixture was vigorously stirred at 40° C. for 12 hours. 7am was obtained as a colorless oil in 88% yield with 98% D-incorporation. $^1$H NMR (400 MHz, CDCl$_3$) δ 10.27 (s, 0.02H), 9.23 (d, J=8.7 Hz, 1H), 7.92 (d, J=8.2 Hz, 1H), 7.82-7.75 (m, 2H), 7.62-7.57 (m, 1H), 7.51-7.42 (m, 2H); $^{13}$C NMR (100 MHz, CDCl$_3$) δ 193.2 (t, J=26.5 Hz), 136.7 (s), 135.2 (s), 133.7 (s), 131.4-131.1 (m), 130.4 (s), 129.0 (s), 128.5 (s), 126.9 (s), 124.9 (s); HRMS (EI): m/z calcd for $C_{11}H_7DO$ [(M)$^+$]: 157.0638, found: 157.0638.

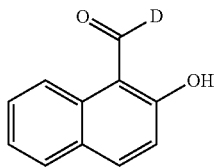 [SMILES: [2H]C(=O)c1c(O)ccc2ccccc12]

2-Hydroxy-1-naphthaldehyde-α-$d_1$ (7an)

2-Hydroxy-1-naphthaldehyde (0.5 mmol), 5o (20 mol %) and NaHCO$_3$ (1 mmol, 2 equiv) was dissolved in a mixture of $D_2O$ (1 mL) and toluene (0.25 mL) in a reaction vessel (5 mL). Then the reaction mixture was vigorously stirred at 80° C. for 12 hours. 7an was obtained as a white solid in 65% yield with 98% D-incorporation. $^1$H NMR (400 MHz, CDCl$_3$) δ 13.18 (s, 1H), 10.73 (s, 0.02H), 8.26 (d, J=8.5 Hz, 1H), 7.92 (d, J=9.1 Hz, 1H), 7.76 (d, J=8.0 Hz, 1H), 7.62-7.55 (m, 1H), 7.44-7.38 (m, 1H), 7.10 (d, J=9.1 Hz, 1H); $^{13}$C NMR (100 MHz, CDCl$_3$) δ 182.9 (t, J=26.8 Hz), 165.0 (s), 139.1 (s), 132.9 (s), 129.5 (s), 129.1 (s), 127.8 (s), 124.5 (s), 119.2 (s), 118.6 (s), 111.2 (t, J=2.5 Hz); HRMS (EI): m/z calcd for $C_{11}H_7DO_2$ [(M)$^+$]: 173.0587, found: 173.0588.

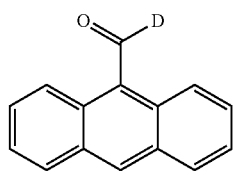 [SMILES: [2H]C(=O)c1c2ccccc2cc2ccccc12]

9-Anthraldehyde-α-$d_1$ (7ao)

9-Anthraldehyde (0.5 mmol), 5m (10 mol %) and $K_2CO_3$ (0.5 mmol, 1 equiv) was dissolved in a mixture of $D_2O$ (1 mL) and toluene (0.25 mL) in a reaction vessel (5 mL). Then the reaction mixture was vigorously stirred at 60° C. for 12 hours. 7ao was obtained as a yellow solid in 88% yield with 99% D-incorporation. $^1$H NMR (400 MHz, CDCl$_3$) δ 11.37 (s, 0.01H), 8.87 (d, J=9.0 Hz, 2H), 8.48 (s, 1H), 7.91 (d, J=8.4 Hz, 2H), 7.63-7.57 (m, 2H), 7.50-7.43 (m, 2H); $^{13}$C NMR (100 MHz, CDCl$_3$) δ 191.4 (t, J=26.5 Hz), 134.0 (s), 130.9 (s), 129.8 (s), 128.1 (s), 127.9 (s), 124.5 (s), 123.2 (t, J=3.2 Hz), 122.3 (s); HRMS (EI): m/z calcd for $C_{15}H_9DO$ [(M)$^+$]: 207.0794, found: 207.0796.

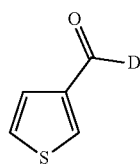

Thiophene-3-carboxaldehyde-α-$d_1$ (7ap)

Thiophene-3-carboxaldehyde (0.5 mmol), 5o (10 mol %) and NaHCO$_3$ (0.5 mmol, 1 equiv) was dissolved in a mixture of $D_2O$ (1 mL) and toluene (0.25 mL) in a reaction vessel (5 mL). Then the reaction mixture was vigorously stirred at 60° C. for 12 hours. 7ap was obtained as a yellow oil in 67% yield with 98% D-incorporation. $^1$H NMR (400 MHz, CDCl$_3$) δ 9.94 (s, 0.02H), 8.13 (dd, J=2.8, 1.1 Hz, 1H), 7.56 (dd, J=5.1, 1.0 Hz, 1H), 7.39 (dd, J=5.1, 2.9 Hz, 1H); $^{13}$C NMR (100 MHz, CDCl$_3$) δ 184.7 (t, J=26.8 Hz), 143.0 (t, J=3.8 Hz), 136.8 (s), 127.4 (s), 125.4 (s); HRMS (EI): m/z calcd for $C_5H_3DOS$ [(M)$^+$]: 113.0046, found: 113.0047.

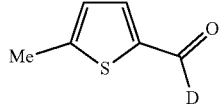

5-Methylthiophene-2-carboxaldehyde-α-d₁ (7aq)

5-Methylthiophene-2-carboxaldehyde (0.5 mmol), 5o (10 mol %) and NaHCO₃ (0.5 mmol, 1 equiv) was dissolved in a mixture of D₂O (1 mL) and toluene (0.25 mL) in a reaction vessel (5 mL). Then the reaction mixture was vigorously stirred at 80° C. for 12 hours. 7aq was obtained as a yellow oil in 84% yield with 97% D-incorporation. $^1$H NMR (400 MHz, CDCl₃) δ 9.77 (s, 0.03H), 7.57 (d, J=3.6 Hz, 1H), 6.86 (d, J=3.6 Hz, 1H), 2.54 (s, 3H); $^{13}$C NMR (100 MHz, CDCl₃) δ 182.4 (t, J=26.9 Hz), 151.7 (s), 141.9 (t, J=4.9 Hz), 137.4 (s), 127.1 (s), 16.3 (s); HRMS (EI): m/z calcd for C₆H₅DOS [(M)⁺]: 127.0202, found: 127.0203.

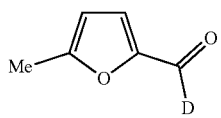

5-Methyl furfural-α-d₁ (7ar)

5-Methyl furfural (0.5 mmol), 5o (20 mol %) and NaHCO₃ (0.5 mmol, 1 equiv) was dissolved in a mixture of D₂O (1 mL) and toluene (0.25 mL) in a reaction vessel (5 mL). Then the reaction mixture was vigorously stirred at 40° C. for 12 hours. 7ar was obtained as a yellow oil in 50% yield with 99% D-incorporation. $^1$H NMR (400 MHz, CDCl₃) δ 9.49 (s, 0.01H), 7.15 (d, J=3.5 Hz, 1H), 6.22 (dd, J=3.5, 0.8 Hz, 1H), 2.40 (s, 3H); $^{13}$C NMR (100 MHz, CDCl₃) δ 176.6 (t, J=27.9 Hz), 159.8 (s), 151.8 (t, J=4.7 Hz), 124.0 (s), 109.5 (s), 14.1 (s); HRMS (EI): m/z calcd for C₆H₅DO₂: 111.0431, found: 111.0432.

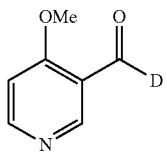

4-Methoxy-3-pyridinecarboxaldehyde-α-d₁ (7as)

4-Methoxy-3-pyridinecarboxaldehyde (0.5 mmol), 5o (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 40° C. for 12 hours. 7as was obtained as a yellow solid in 98% yield with 98% D-incorporation. $^1$H NMR (400 MHz, CDCl₃) δ 10.39 (s, 0.02H), 8.82 (s, 1H), 8.58 (d, J=5.9 Hz, 1H), 6.90 (d, J=5.9 Hz, 1H), 3.95 (s, 3H); $^{13}$C NMR (100 MHz, CDCl₃) δ 187.4 (t, J=27.8 Hz), 165.7 (s), 155.1 (s), 149.9 (s), 119.5 (t, J=3.4 Hz), 106.3 (s), 54.9 (d, J=1.3 Hz); HRMS (EI): m/z calcd for C₇H₆DNO₂ [(M)⁺]: 138.0540, found: 138.0541.

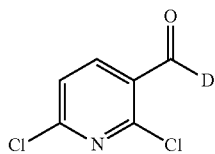 [SMILES: [2H]C(=O)c1ccc(Cl)nc1Cl]

2,6-Dichloro-3-pyridinecarbaldehyde-α-d₁ (7at)

2,6-Dichloro-3-pyridinecarbaldehyde (0.5 mmol), 5o (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 40° C. for 12 hours. 7at was obtained as a white solid in 93% yield with 98% D-incorporation. $^1$H NMR (400 MHz, CDCl₃) δ 10.38 (d, J=0.7 Hz, 0.02H), 8.18 (d, J=8.1 Hz, 1H), 7.43 (d, J=8.1 Hz, 1H); $^{13}$C NMR (100 MHz, CDCl₃) δ 187.7 (t, J=28.6 Hz), 155.4 (s), 152.9 (s), 140.0 (s), 127.6 (t, J=3.7 Hz), 124.2 (s); HRMS (EI): m/z calcd for C₆H₂DCl₂NO [(M)⁺]: 175.9654, found: 175.9656.

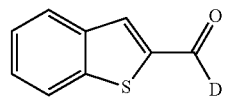 [SMILES: [2H]C(=O)c1cc2ccccc2s1]

Benzothiophene-2-carboxaldehyde-α-d₁ (7au)

Benzothiophene-2-carboxaldehyde (0.5 mmol), 5o (10 mol %) and NaHCO₃ (0.5 mmol, 1 equiv) was dissolved in a mixture of D₂O (1 mL) and toluene (0.25 mL) in a reaction vessel (5 mL). Then the reaction mixture was vigorously stirred at 60° C. for 12 hours. 7au was obtained as a yellow solid in 58% yield with 98% D-incorporation. $^1$H NMR (400 MHz, CDCl₃) δ 10.08 (s, 0.02H), 8.0 (s, 1H), 7.92 (d, J=8.0 Hz, 1H), 7.87 (d, J=8.0 Hz, 1H), 7.51-7.45 (m, 1H), 7.44-7.38 (m, 1H); $^{13}$C NMR (100 MHz, CDCl₃) δ 184.5 (t, J=27.4 Hz), 143.3 (t, J=5.0 Hz), 142.7 (s), 138.6 (s), 134.6 (s), 128.2 (s), 126.3 (s), 125.3 (s), 123.3 (s); HRMS (EI): m/z calcd for C₉H₅DOS [(M)⁺]: 163.0202, found: 163.0203.

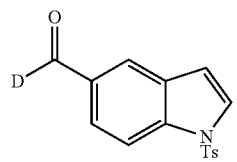

Tosyl-1H-indole-5-carboxaldehyde-α-d₁ (7av)

Tosyl-1H-indole-5-carboxaldehyde (0.5 mmol), 5m (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 80° C. for 12 hours. 7av was obtained as a yellow solid in 85% yield with 99% D-incorporation. $^1$H NMR (400 MHz, CDCl₃) δ 10.01 (s, 0.01H), 8.10 (d, J=8.6 Hz, 1H), 8.05 (d, J=1.0 Hz, 1H), 7.85 (dd, J=8.6, 1.5 Hz, 1H), 7.78 (d, J=8.4 Hz, 2H), 7.67 (d, J=3.7 Hz, 1H), 7.24 (d, J=8.1 Hz, 2H), 6.77 (dd, J=3.7, 0.5 Hz, 1H), 2.33 (s, 3H); $^{13}$C NMR (100 MHz, CDCl₃) δ 191.5 (t, J=26.4 Hz), 145.6 (s), 138.1 (s), 134.9 (s), 132.1 (t, J=2.9 Hz), 130.9 (s), 130.1 (s), 128.0 (s), 126.9 (s), 125.2 (s), 124.8 (s), 113.9 (s), 109.4 (s), 21.6 (s); HRMS (EI): m/z calcd for C₁₆H₁₂DNO₃S [(M)⁺]: 300.0679, found: 300.0681.

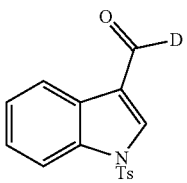 [SMILES: [2H]C(=O)c1cn(S(=O)(=O)c2ccc(C)cc2)c2ccccc12]

Tosyl-1H-indole-3-carboxaldehyde-α-d₁ (7aw)

Tosyl-1H-indole-3-carboxaldehyde (0.5 mmol), 5m (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 80° C. for 12 hours. 7aw was obtained yellow solid in 62% yield with 99% D-incorporation. ¹H NMR (400 MHz, CDCl₃) δ 10.09 (s, 0.01H), 8.25 (d, J=9.1 Hz, 1H), 8.24 (s, 1H), 7.95 (d, J=8.1 Hz, 1H), 7.85 (d, J=8.4 Hz, 2H), 7.44-7.33 (m, 2H), 7.28 (d, J=8.1 Hz, 2H), 2.36 (s, 3H); ¹³C NMR (100 MHz, CDCl₃) δ 185.2 (t, J=26.6), 146.2 (s), 136.3 (s), 135.2 (s), 134.3 (s), 130.4 (s), 127.3 (s), 126.3 (s), 125.1 (s), 122.6 (s), 122.2 (t, J=3.4), 113.3 (s), 21.7 (s); HRMS (EI): m/z calcd for $C_{16}H_{12}DNO_3S$ [(M)⁺]: 300.0679, found: 300.0681.

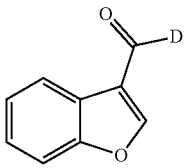 [SMILES: [2H]C(=O)c1coc2ccccc12]

3-Benzofurancarboxaldehyde-α-d₁ (7ax)

3-Benzofurancarboxaldehyde (0.5 mmol), 5m (10 mol %) and K₂CO₃ (0.5 mmol, 1 equiv) was dissolved in a mixture of D₂O (1 mL) and toluene (0.25 mL) in a reaction vessel (5 mL). Then the reaction mixture was vigorously stirred at 40° C. for 12 hours. 7ax was obtained as a white solid in 56% yield with 99% D-incorporation. ¹H NMR (400 MHz, CDCl₃) δ 10.18 (s, 0.01H), 8.28 (s, 1H), 8.22-8.18 (m, 1H), 7.58-7.54 (m, 1H), 7.45-7.37 (m, 2H); ¹³C NMR (100 MHz, CDCl₃) δ 184.5 (t, J=26.7 Hz), 156.0 (s), 155.4 (s), 126.3 (s), 124.9 (s), 123.6 (t, J=3.9 Hz), 122.9 (s), 122.6 (s), 111.7 (s); HRMS (EI): m/z calcd for $C_9H_5DO_2$ [(M)⁺]: 147.0431, found: 147.0432.

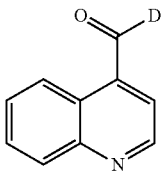 [SMILES: [2H]C(=O)c1ccnc2ccccc12]

4-Quinoline carboxaldehyde-α-d₁ (7ay)

4-Quinoline carboxaldehyde (0.5 mmol), 5o (10 mol %) and KOAc (0.5 mmol, 1 equiv) was dissolved in a mixture of D₂O (1 mL) and toluene (0.25 mL) in a reaction vessel (5 mL). Then the reaction mixture was vigorously stirred at 60° C. for 12 hours. 7ay was obtained as a white solid in 69% yield with 98% D-incorporation. ¹H NMR (400 MHz, CDCl₃) δ 10.49 (s, 0.02H), 9.18 (d, J=4.2 Hz, 1H), 9.00 (dd, J=8.8, 0.9 Hz, 1H), 8.20 (dd, J=8.6, 0.5 Hz, 1H), 7.83-7.78 (m, 1H), 7.77 (d, J=4.2 Hz, 1H), 7.75-7.69 (m, 1H); ¹³C NMR (100 MHz, CDCl₃) δ 191.5 (t, J=27.2 Hz), 149.4 (s), 148.2 (s), 135.6 (t, J=3.7 Hz), 129.2 (s), 129.0 (s), 128.4 (s), 124.7 (s), 123.4 (s), 122.9 (s); HRMS (EI): m/z calcd for $C_{10}H_6DNO$ [(M)⁺]: 158.0590, found: 158.0591.

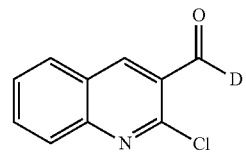 [SMILES: [2H]C(=O)c1cc2ccccc2nc1Cl]

2-Chloroqinoline-3-carboxaldehyde-α-d₁ (7az)

2-Chloroqinoline-3-carboxaldehyde (0.5 mmol), 5o (10 mol %) and KOAc (0.5 mmol, 1 equiv) was dissolved in a mixture of D₂O (2 mL) and toluene (0.5 mL) in a reaction vessel (5 mL). Then the reaction mixture was vigorously stirred at 60° C. for 12 hours. 7az was obtained as a yellow solid in 73% yield with 99% D-incorporation. ¹H NMR (400 MHz, CDCl₃) δ 10.54 (s, 0.01H), 8.74 (s, 1H), 8.05 (d, J=8.5 Hz, 1H), 7.97 (d, J=8.2 Hz, 1H), 7.91-7.83 (m, 1H), 7.64 (t, J=7.6 Hz, 1H); ¹³C NMR (100 MHz, CDCl₃) δ 188.8 (t, J=28.3 Hz), 150.1 (s), 149.6 (s), 140.3 (s), 133.6 (s), 129.7 (s), 128.6 (s), 128.2 (s), 126.5 (s), 126.3 (t, J=3.4 Hz); HRMS (EI): m/z calcd for $C_{10}H_5DClNO$ [(M)⁺]: 192.0201, found: 192.0202.

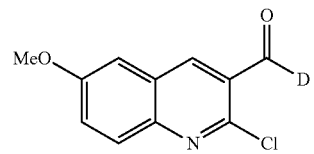 [SMILES: [2H]C(=O)c1cc2cc(OC)ccc2nc1Cl]

6-Methoxy2-Chloroqinoline-3-carboxaldehyde-α-d₁ (7ba)

6-Methoxy2-Chloroqinoline-3-carboxaldehyde (0.5 mmol), 5o (10 mol %) and KOAc (0.5 mmol, 1 equiv) was dissolved in a mixture of D₂O (2 mL) and toluene (0.5 mL) in a reaction vessel (5 mL). Then the reaction mixture was vigorously stirred at 60° C. for 12 hours. 6-Methoxy-2-chloroqinoline-3-carboxaldehyde-α-d₁ was obtained as a white solid in 93% yield with 94% D-incorporation.

6-Methoxy2-Chloroqinoline-3-carboxaldehyde-α-d₁ (deuteration 94%, 0.46 mmol), 5o (10 mol %) and KOAc (0.46 mmol, 1 equiv) was dissolved in a mixture of D₂O (2 mL) and toluene (0.5 mL) in a reaction vessel (5 mL). Then the reaction mixture was vigorously stirred at 60° C. for 12 hours. 7ba was obtained as a yellow solid in 69% yield (for two steps) with 99% D-incorporation. ¹H NMR (400 MHz, CDCl₃) δ 10.53 (s, 0.01H), 8.62 (s, 1H), 7.94 (d, J=9.2 Hz, 1H), 7.50 (dd, J=9.2, 2.7 Hz, 1H), 7.17 (d, J=2.7 Hz, 1H), 3.94 (s, 3H); ¹³C NMR (100 MHz, CDCl₃) δ 189.1 (t, J=27.8 Hz), 158.8 (s), 147.7 (s), 145.8 (s), 138.7 (s), 129.9 (s), 127.8

(s), 126.6 (s), 126.3 (t, J=3.3 Hz), 106.4 (s), 55.8 (s); HRMS (EI): m/z calcd for $C_{11}H_7DClNO_2$ [(M)$^+$]: 222.0306, found: 222.0308.

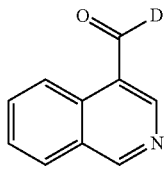 [SMILES: [2H]C(=O)c1cncc2ccccc12]

Isoquinoline-4-carbaldehyde-α-$d_1$ (7bb)

Isoquinoline-4-carbaldehyde (0.5 mmol), 5o (10 mol %) and KOAc (0.5 mmol, 1 equiv) was dissolved in a mixture of $D_2O$ (1 mL) and toluene (0.25 mL) in a reaction vessel (5 mL). Then the reaction mixture was vigorously stirred at 80° C. for 12 hours. 7bb was obtained as a yellow solid in 84% yield with 96% D-incorporation. $^1$H NMR (400 MHz, CDCl$_3$) δ 10.29 (s, 0.04H), 9.32 (s, 1H), 9.08 (d, J=8.4 Hz, 1H), 8.84 (s, 1H), 7.97 (d, J=8.4 Hz, 1H), 7.83-7.77 (m, 1H), 7.67-7.61 (m, 1H); $^{13}$C NMR (100 MHz, CDCl$_3$) δ 192.5 (t, J=26.8 Hz), 158.3 (s), 152.8 (s), 133.5 (s), 132.2 (s), 128.4 (s), 128.3 (s), 128.3 (s), 124.7 (t, J=3.5 Hz), 124.3 (s); HRMS (EI): m/z calcd for $C_{10}H_6DNO$ [(M)$^+$]: 158.0590, found: 158.0591.

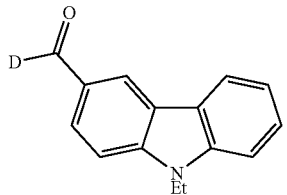

N-Ethyl-3-carbazolecarboxaldehyde-α-$d_1$ (7bc)

N-Ethyl-3-carbazolecarboxaldehyde (0.5 mmol), 5o (30 mol %) and $K_2CO_3$ (1 mmol, 2 equiv) was dissolved in a mixture of $D_2O$ (1 mL) and toluene (0.25 mL) in a reaction vessel (5 mL). Then the reaction mixture was vigorously stirred at 40° C. for 12 hours. 7bc was obtained as a white solid in 88% yield with 97% D-incorporation. $^1$H NMR (400 MHz, CDCl$_3$) δ 10.07 (s, 0.03H), 8.57 (s, 1H), 8.13 (d, J=7.8 Hz, 1H), 7.99 (dd, J=8.5, 1.4 Hz, 1H), 7.56-7.51 (m, 1H), 7.51-7.42 (m, 2H), 7.35-7.30 (m, 1H), 4.36 (q, J=7.2 Hz, 2H), 1.44 (t, J=7.3 Hz, 3H); $^{13}$C NMR (100 MHz, CDCl$_3$) δ 191.6 (t, J=26.1 Hz), 143.6 (s), 140.7 (s), 128.4 (s), 127.2 (s), 126.8 (s), 124.0 (s), 123.1 (s), 123.1 (s), 120.8 (s), 120.3 (s), 109.2 (s), 108.7 (s), 37.9 (s), 13.9 (s); HRMS (EI): m/z calcd for $C_{15}H_{12}DNO$ [(M)$^+$]: 224.1060, found: 224.1062.

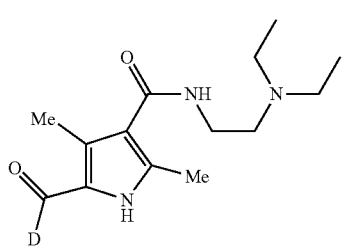 [SMILES: [2H]C(=O)c1[nH]c(C)c(C(=O)NCCN(CC)CC)c1C]

N-(2-(Diethylamino)ethyl)-5-formyl-2,4-dimethyl-1H-pyrrole-3-carboxamide-α-$d_1$ (7bd)

N-(2-(Diethylamino)ethyl)-5-formyl-2,4-dimethyl-1H-pyrrole-3-carboxamide (0.5 mmol), 5m (30 mol %) and $K_2CO_3$ (1.5 mmol, 3 equiv) was dissolved in a mixture of $D_2O$ (2 mL) and DCM (0.5 mL) in a reaction vessel (5 mL). Then the reaction mixture was vigorously stirred at 80° C. for 12 hours. 7be was obtained as a yellow solid in 88% yield with 98% D-incorporation. $^1$H NMR (400 MHz, CDCl$_3$) δ 10.47 (s, 1H), 9.49 (s, 0.02H), 6.94 (s, 1H), 3.54-3.58 (m, 2H), 2.84 (s, 2H), 2.77 (q, J=7.0 Hz, 4H), 2.52 (s, 3H), 2.49 (s, 3H), 1.11 (t, J=7.0 Hz, 6H); $^{13}$C NMR (100 MHz, DMSO-$d_6$) δ 177.5-176.8 (m), 164.7 (s), 138.2 (s), 130.8 (t, J=13.7 Hz), 127.7 (s), 118.8 (s), 50.6 (s), 46.7 (s), 35.1 (s), 12.6 (s), 9.7 (s). HRMS (EI): m/z calcd for $C_{14}H_{22}DN_3O_2$[(M)$^+$]: 266.1853, found: 266.1854.

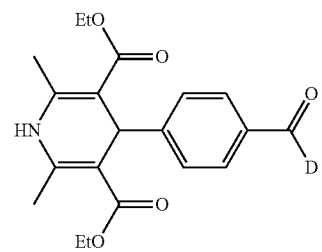 [SMILES: [2H]C(=O)c1ccc(C2C(C(=O)OCC)=C(C)NC(C)=C2C(=O)OCC)cc1]

4-(4-Formylphenyl)-1,4-dihydro-2,6-dimethyl-,3,5-diethyl ester-α-$d_1$ (7be)

4-(4-Formylphenyl)-1,4-dihydro-2,6-dimethyl-,3,5-diethyl ester 6be (0.25 mmol), 5o (20 mol %) and $K_2CO_3$ (0.5 mmol, 2 equiv) was dissolved in a mixture of $D_2O$ (1 mL) and DCM (0.25 mL) in a reaction vessel (5 ml). Then the reaction mixture was vigorously stirred at 60° C. for 12 hours. 7be was obtained as a yellow solid in 73% yield with 96% D-incorporation. $^1$H NMR (400 MHz, CDCl$_3$) δ 9.92 (s, 0.04H), 7.73 (d, J=8.2 Hz, 2H), 7.46 (d, J=8.2 Hz, 2H), 6.35-6.32 (m, 1H), 5.06 (s, 1H), 4.11-4.02 (m, 4H), 2.32 (s, 6H), 1.20 (t, J=7.1 Hz, 6H); $^{13}$C NMR (100 MHz, CDCl$_3$) δ 192.2 (t, J=29.4 Hz), 167.4 (s), 155.1 (s), 144.9 (s), 134.4 (s), 129.7 (s), 128.8 (s), 103.1 (s), 59.9 (s), 40.3 (s), 19.4 (s), 14.3 (s); HRMS (ESI): m/z calcd for $C_{22}H_{23}DNO_5$ [(M+H)$^+$]: 359.1717, found: 359.1717.

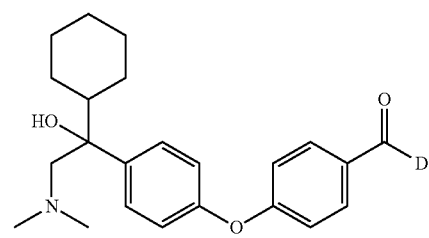 [SMILES: [2H]C(=O)c1ccc(Oc2ccc(C(O)(CN(C)C)C3CCCCC3)cc2)cc1]

4-(4-(2-(Dimethylamino)-1-(1-hydroxycyclohexyl)ethyl)phenoxy)benzaldehyde-α-$d_1$ (7bf)

4-(4-(2-(Dimethylamino)-1-(1-hydroxycyclohexyl)ethyl)phenoxy)benzaldehyde 6bf (0.1 mmol), 5m (15 mol %) and $K_2CO_3$ (0.1 mmol, 1 equiv) was dissolved in a mixture of D₂O (1 mL) and DCM (0.25 mL) in a reaction vessel (5 mL). Then the reaction mixture was vigorously stirred at 60° C. for 12 hours. 7bf was obtained as a yellow oil in 55% yield with 98% D-incorporation. ¹H NMR (400 MHz, CDCl₃) δ 9.89 (s, 0.02H), 7.83 (d, J=8.6 Hz, 2H), 7.22 (d, J=8.5 Hz, 2H), 7.05 (d, J=8.6 Hz, 2H), 7.00 (d, J=8.5 Hz, 2H), 3.81 (dd, J=12.4, 6.6 Hz, 1H), 3.28 (t, J=5.8 Hz, 1H), 2.95 (d, J=8.3 Hz, 1H), 2.62 (s, 6H), 1.73-0.81 (m, 10H); ¹³C NMR (100 MHz, CDCl₃) δ 190.5 (t, J=26.4 Hz), 162.7 (s), 154.4 (s), 136.2 (s), 132.0 (s), 131.4 (s), 130.9 (s), 120.1 (s), 117.9 (s), 73.7 (s), 60.5 (s), 52.4 (s), 44.5 (s), 37.2 (s), 31.5 (s), 25.5 (s), 21.5 (s), 21.3 (s); HRMS (ESI): m/z calcd for C₂₃H₂₉DNO₃ [(M+H)⁺]: 369.2288, found: 369.2289.

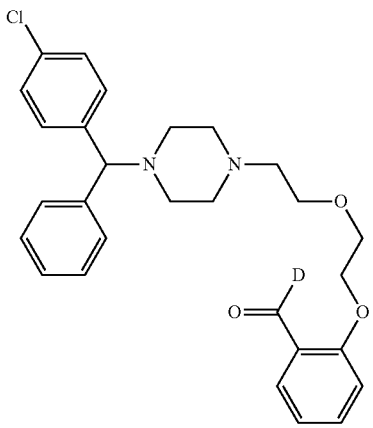 [SMILES: [2H]C(=O)c1ccccc1OCCOCCN1CCN(C(c2ccccc2)c2ccc(Cl)cc2)CC1]

2-(2-(2-(4-((4-Chlorophenyl)(phenyl)methyl)piperazin-1-yl)ethoxy)ethoxy)benzaldehyde-α-d₁ (7bg)

2-(2-(2-(4-((4-Chlorophenyl)(phenyl)methyl)piperazin-1-yl)ethoxy)ethoxy)benzaldehyde 6bg (0.1 mmol), 5ag (15 mol %) and AcOK (0.1 mmol, 1 equiv) was dissolved in a mixture of D₂O (1 mL) and DCM (0.25 mL) in a reaction vessel (5 mL). Then the reaction mixture was vigorously stirred at 60° C. for 12 hours. 7bg was obtained as a yellow oil in 52% yield with 96% D-incorporation. ¹H NMR (400 MHz, CDCl₃) δ 10.51 (s, 0.04H), 7.84 (dd, J=7.7, 1.7 Hz, 1H), 7.58-7.52 (m, 1H), 7.37 (dd, J=7.8, 3.7 Hz, 4H), 7.31-7.18 (m, 5H), 7.04 (t, J=7.5 Hz, 1H), 6.99 (d, J=8.4 Hz, 1H), 4.25 (d, J=5.5 Hz, 1H), 4.24 (t, J=2.0 Hz, 2H), 3.88 (t, J=4.8 Hz, 2H), 3.79 (s, 2H), 2.76-2.43 (m, 10H); ¹³C NMR (100 MHz, CDCl₃) δ 189.4 (t, J=29.5 Hz), 161.1 (s), 141.7 (s), 140.9 (s), 135.9 (s), 132.8 (s), 129.1 (s), 128.8 (s), 128.8 (s), 128.5 (s), 127.7 (s), 127.4 (s), 125.0 (s), 121.1 (s), 112.8 (s), 75.1 (s), 69.4 (s), 68.1 (s), 68.0 (s), 57.4 (s), 53.7 (s), 50.5 (s); HRMS (ESI): m/z calcd for C₂₈H₃₁DClN₂O₃[(M+H)⁺]: 480.2164, found: 480.2162.

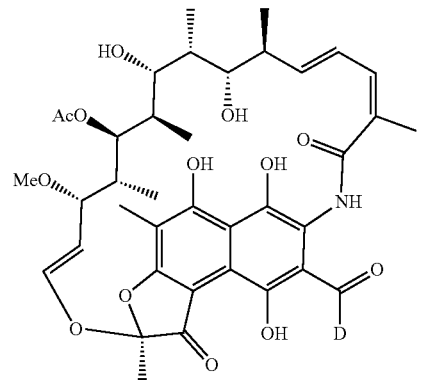 [SMILES: [2H]C(=O)c1c2c(O)c3c(O)c(C)c4c(c3c1O)C(=O)[C@@](C)(O/C=C/[C@H](OC)[C@@H](C)[C@@H](OC(C)=O)[C@H](C)[C@H](O)[C@H](C)[C@@H](O)[C@@H](C)/C=C/C=C(/C)C(=O)N2)O4]

3-Formyl rifamycin-α-d₁ (7bh)

3-Formyl rifamycin (0.05 mmol), 5l (20 mol %) and KOAc (0.1 mmol, 2 equiv) was dissolved in a mixture of D₂O (1 mL) and DCM (0.25 mL) in a reaction vessel (5 mL). Then the reaction mixture was vigorously stirred at 60° C. for 12 hours. 7bh was obtained as a red solid in 60% yield with 97% D-incorporation. ¹H NMR (400 MHz, CDCl₃) δ 13.75 (s, 1H), 13.19 (s, 1H), 12.66 (s, 1H), 12.33 (s, 1H), 10.67 (s, 0.03H), 6.62-6.49 (m, 2H), 6.24 (d, J=12.7 Hz, 1H), 6.07 (dd, J=15.0, 5.0 Hz, 1H), 5.16-5.09 (m, 1H), 4.94 (d, J=10.6 Hz, 1H), 3.78 (d, J=9.6 Hz, 1H), 3.62 (d, J=4.8 Hz, 1H), 3.52-3.48 (m, 2H), 3.05 (s, 4H), 2.45-2.39 (m, 1H), 2.27 (s, 3H), 2.08 (s, 3H), 2.06 (s, 3H), 1.82 (s, 3H), 1.76-1.79 (m, 1H), 1.55 (dd, J=9.8, 7.2 Hz, 1H), 1.36-1.41 (m, 1H), 1.03 (d, J=7.0 Hz, 3H), 0.91 (d, J=7.0 Hz, 3H), 0.67 (d, J=6.9 Hz, 3H), −0.29 (d, J=6.9 Hz, 3H); ¹³C NMR (100 MHz, CDCl₃) δ 195.6 (s), 192.9-192.5 (m), 173.3 (s), 171.1 (s), 169.4 (s), 167.5 (s), 155.5 (s), 142.7 (s), 141.8 (s), 136.7 (s), 135.9 (s), 126.8 (s), 121.5 (s), 119.6 (s), 118.4 (s), 117.9 (s), 116.3 (s), 109.8 (s), 108.5 (s), 108.2 (s), 104.5 (s), 75.9 (s), 75.5 (s), 73.2 (s), 69.6 (s), 56.1 (s), 38.6 (s), 37.6 (s), 36.6 (s), 32.2 (s), 20.5 (s), 19.7 (s), 19.6 (s), 15.9 (s), 9.8 (s), 8.1 (s), 7.6 (s), 6.8 (s); HRMS (ESI): m/z calcd for C₃₈H₄₆DNNaO₁₃ [(M+Na)⁺]: 749.3008, found: 749.3009.

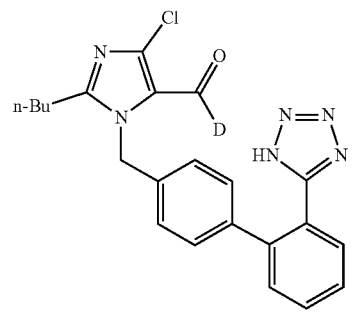

2'-(2H-Tetrazol-5-yl)biphenyl-4-yl)methyl)-2-butyl-4-chloro-1H-imidazole-5-carbaldehyde-α-d₁ (7bi)

2'-(2H-Tetrazol-5-yl)biphenyl-4-yl)methyl)-2-butyl-4-chloro-1H-imidazole-5-carbaldehyde (0.1 mmol), 5l (20 mol %) and KOAc (0.2 mmol, 2 equiv) was dissolved in a mixture of D₂O (1 mL) and DCM (0.25 mL) in a reaction vessel (5 mL). Then the reaction mixture was vigorously stirred at 60° C. for 12 hours. 7bi was obtained as a white solid in 53% yield with 99% D-incorporation. $^1$H NMR (400 MHz, CDCl$_3$) δ 9.62 (s, 0.01H), 7.82 (d, J=7.6 Hz, 1H), 7.56 (t, J=7.2 Hz, 1H), 7.47 (t, J=7.2 Hz, 1H), 7.38 (d, J=7.6 Hz, 1H), 7.03 (d, J=8.0 Hz, 2H), 6.92 (d, J=8.0 Hz, 2H), 5.47 (s, 2H), 2.56 (t, J=7.6 Hz, 2H), 1.63-1.55 (m, 2H), 1.34-1.24 (m, 2H), 0.83 (t, J=7.3 Hz, 3H); $^{13}$C NMR (100 MHz, CDCl$_3$) δ 178.2-177.4 (m), 155.3 (s), 154.9 (s), 143.2 (s), 140.7 (s), 139.2 (s), 135.3 (s), 131.3 (s), 130.8 (s), 129.6 (s), 128.2 (s), 126.7 (s), 124.1 (s), 122.9 (s), 48.0 (s), 29.2 (s), 26.4 (s), 22.3 (s), 13.7 (s); HRMS (ESI): m/z calcd for C$_{22}$H$_{21}$DClN$_6$O [(M+H)$^+$]: 422.1606, found: 422.1605.

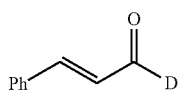

(E)-Cinnamaldehyde-α-d$_1$ (10a)

(E)-Cinnamaldehyde (0.25 mmol), 5p (10 mol %) and KOAc (0.25 mmol, 1 equiv) was dissolved in a mixture of D$_2$O (1 mL) and DCM (0.25 mL) in a reaction vessel (5 mL). Then the reaction mixture was vigorously stirred at 60° C. for 12 hours. 10a was obtained as a yellow oil in 63% yield with 97% D-incorporation. $^1$H NMR (400 MHz, CDCl$_3$) δ 9.71 (d, J=7.7 Hz, 0.03H), 7.59-7.56 (m, 2H), 7.48 (d, J=16.0 Hz, 1H), 7.46-7.40 (m, 3H), 6.72 (d, J=16.0 Hz, 1H); $^{13}$C NMR (100 MHz, CDCl$_3$) δ 193.5 (t, J=26.3), 152.8 (s), 134.0 (s), 131.3 (s), 129.1 (s), 128.5 (s), 127.2 (s); HRMS (EI): m/z calcd for C$_9$H$_7$DO [(M)$^+$]: 133.0638, found: 133.0639.

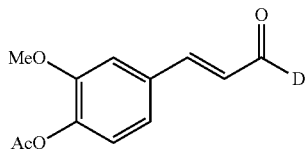 [SMILES: [2H]C(=O)/C=C/c1ccc(OC(C)=O)c(OC)c1]

(E)-4-Acetoxy-3-methoxycinnamaldehyde-α-d$_1$ (10b)

(E)-4-Acetoxy-3-methoxycinnamaldehyde (0.25 mmol), 5p (10 mol %) and KOAc (0.25 mmol, 1 equiv) was dissolved in a mixture of D$_2$O (1 mL) and DCM (0.25 mL) in a reaction vessel (5 mL). Then the reaction mixture was vigorously stirred at 60° C. for 12 hours. 10b was obtained as a brown solid in 40% yield with 95% D-incorporation. $^1$H NMR (400 MHz, CDCl$_3$) δ 9.69 (d, J=7.7 Hz, 0.05H), 7.44 (d, J=15.9 Hz, 1H), 7.18-7.12 (m, 2H), 7.09 (d, J=8.1 Hz, 1H), 6.66 (d, J=15.9 Hz, 1H), 3.87 (s, 3H), 2.33 (s, 3H); $^{13}$C NMR (100 MHz, CDCl$_3$) δ 193.2 (t, J=26.2 Hz), 168.7 (s), 151.9 (s), 151.6 (s), 142.2 (s), 133.0 (s), 128.7 (t, J=3.6 Hz), 123.5 (s), 121.9 (s), 111.4 (s), 56.0 (d, J=2.9 Hz), 20.7 (d, J=2.1 Hz); HRMS (EI): m/z calcd for C12H$_{11}$DO$_4$ [(M)$^+$]: 221.0798, found: 221.0780.

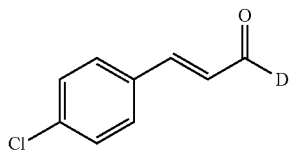 [SMILES: [2H]C(=O)/C=C/c1ccc(Cl)cc1]

(E)-4-Chlorocinnamaldehyde-α-d$_1$ (10c)

(E)-4-Chlorocinnamaldehyde (0.25 mmol), 5p (10 mol %) and KOAc (0.25 mmol, 1 equiv) was dissolved in a mixture of D$_2$O (1 mL) and toluene (0.25 mL) in a reaction vessel (5 mL). Then the reaction mixture was vigorously stirred at 80° C. for 12 hours. 10c was obtained as a yellow solid in 40% yield with 97% D-incorporation. $^1$H NMR (400 MHz, CDCl$_3$) δ 9.70 (d, J=7.6 Hz, 0.03H), 7.50 (d, J=8.5 Hz, 2H), 7.43 (d, J=12.3 Hz, 1H), 7.40 (d, J=8.5 Hz, 2H), 6.68 (d, J=16.0 Hz, 1H); $^{13}$C NMR (100 MHz, CDCl$_3$) δ 193.2 (t, J=26.4 Hz), 151.1 (s), 137.3 (s), 132.5 (s), 129.6 (s), 129.5 (s), 128.9 (t, J=3.8 Hz); HRMS (EI): m/z calcd for C$_9$H$_6$DClO [(M)$^+$]: 167.0248, found: 167.0246.

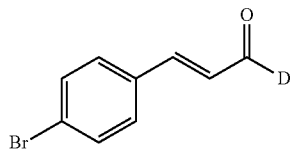

(E)-4-Bromocinnamaldehyde-α-d$_1$ (10d)

(E)-4-Bromocinnamaldehyde (0.25 mmol), 5p (10 mol %) and KOAc (0.25 mmol, 1 equiv) was dissolved in a mixture of D$_2$O (1 mL) and DCM (0.25 mL) in a reaction vessel (5 mL). Then the reaction mixture was vigorously stirred at 60° C. for 12 hours. 10d was obtained as a brown solid in 33% yield with 97% D-incorporation. $^1$H NMR (400 MHz, CDCl$_3$) δ 9.70 (d, J=7.1 Hz, 0.03H), 7.58 (d, J=8.2 Hz, 2H), 7.45-7.37 (m, 3H), 6.70 (d, J=16.0 Hz, 1H); $^{13}$C NMR (100 MHz, CDCl$_3$) δ 193.1 (t, J=27.2 Hz), 151.1 (s), 132.9 (s), 132.4 (s), 129.8 (s), 129.0 (s), 125.7 (s); HRMS (EI): m/z calcd for C$_9$H$_6$DBrO [(M)$^+$]: 210.9743, found: 210.9744.

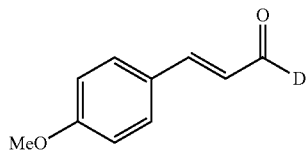

(E)-4-Methoxycinnamaldehyde-α-d$_1$ (10e)

(E)-4-Methoxycinnamaldehyde (0.25 mmol), 5p (10 mol %) and KOAc (0.25 mmol, 1 equiv) was dissolved in a mixture of D$_2$O (1 mL) and DCM (0.25 mL) in a reaction vessel (5 mL). Then the reaction mixture was vigorously stirred at 60° C. for 12 hours. 10e was obtained yellow oil in 41% yield with 99% D-incorporation. $^1$H NMR (400 MHz, CDCl$_3$) δ 9.65 (d, J=7.8 Hz, 0.01H), 7.52 (d, J=8.8 Hz, 2H), 7.42 (d, J=15.9 Hz, 1H), 6.94 (d, J=8.8 Hz, 2H), 6.61 (d, J=15.9 Hz, 1H), 3.86 (s, 3H); $^{13}$C NMR (100 MHz, CDCl$_3$) δ 193.5 (t, J=26.1 Hz), 162.2 (s), 152.7 (s), 130.4 (s), 126.8 (s), 126.5 (t, J=3.7 Hz), 114.6 (s), 55.5 (d, J=4.2 Hz); HRMS (EI): m/z calcd for C$_{10}$H$_9$DO$_2$ [(M)$^+$]: 163.0744, found: 163.0743.

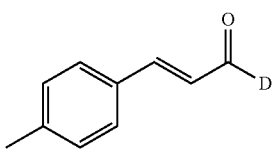

(E)-4-Methylcinnamaldehyde-α-d₁ (10f)

(E)-4-Methylcinnamaldehyde (0.25 mmol), 5p (10 mol %) and KOAc (0.25 mmol, 1 equiv) was dissolved in a mixture of $D_2O$ (1 mL) and DCM (0.25 mL) in a reaction vessel (5 mL). Then the reaction mixture was vigorously stirred at 60° C. for 12 hours. 10f was obtained as a yellow oil in 57% yield with 98% D-incorporation. $^1$H NMR (400 MHz, CDCl₃) δ 9.68 (d, J=7.8 Hz, 0.02H), 7.48-7.43 (m, 3H), 7.24 (d, J=8.0 Hz, 2H), 6.68 (d, J=15.9 Hz, 1H), 2.39 (s, 3H); $^{13}$C NMR (100 MHz, CDCl₃) δ 193.6 (t, J=26.2 Hz), 153.0 (s), 142.0 (s), 131.3 (s), 129.9 (s), 128.6 (s), 127.7 (t, J=3.8 Hz), 21.6 (d, J=1.7 Hz); HRMS (EI): m/z calcd for $C_{10}H_9DO$ [(M)$^+$]: 147.0794, found: 147.0795.

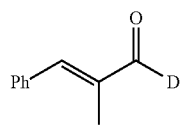

alpha-Methylcinnamaldehyde-α-d₁ (10g)

alpha-Methylcinnamaldehyde (0.25 mmol), 5l (10 mol %) and KOAc (0.25 mmol, 1 equiv) was dissolved in a mixture of $D_2O$ (1 mL) and DCM (0.25 mL) in a reaction vessel (5 mL). Then the reaction mixture was vigorously stirred at 40° C. for 12 hours. 10g was obtained as a colorless oil in 95% yield with 98% D-incorporation. $^1$H NMR (400 MHz, CDCl₃) δ 9.48 (s, 0.02H), 7.43 (d, J=7.4 Hz, 2H), 7.38-7.27 (m, 3H), 7.16 (s, 1H), 1.98 (d, J=1.3 Hz, 3H); $^{13}$C NMR (100 MHz, CDCl₃) δ 195.2 (t, J=26.5 Hz), 149.8 (s), 138.3 (t, J=3.5 Hz), 135.2 (s), 130.1 (s), 129.6 (s), 128.7 (s), 10.9 (s); HRMS (EI): m/z calcd for $C_{10}H_9DO$ [(M)$^+$]: 147.0794, found: 147.0795.

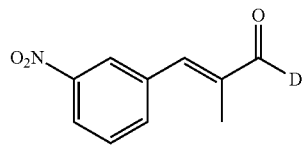

(E)-2-Methyl-3-(3-nitrophenyl)acrylaldehyde-α-d₁ (10h)

(E)-2-Methyl-3-(3-nitrophenyl)acrylaldehyde (0.25 mmol), 5l (10 mol %) and KOAc (0.25 mmol, 1 equiv) was dissolved in a mixture of $D_2O$ (1 mL) and DCM (0.25 mL) in a reaction vessel (5 mL). Then the reaction mixture was vigorously stirred at 60° C. for 12 hours. 10h was obtained as a white solid in 41% yield with 99% D-incorporation. $^1$H NMR (400 MHz, CDCl₃) δ 9.64 (s, 0.01H), 8.37 (t, J=1.7 Hz, 1H), 8.27-8.23 (m, 1H), 7.83 (d, J=7.8 Hz, 1H), 7.65 (t, J=8.0 Hz, 1H), 7.32 (s, 1H), 2.10 (d, J=1.4 Hz, 3H); $^{13}$C NMR (100 MHz, CDCl₃) δ 194.4 (t, J=26.7 Hz), 148.5 (s), 146.0 (s), 140.6 (t, J=3.6 Hz), 136.7 (s), 135.3 (s), 129.8 (s), 124.3 (s), 123.9 (s), 10.9 (s); HRMS (EI): m/z calcd for $C_{10}H_8DNO_3$ [(M)$^+$]: 192.0645, found: 192.0646.

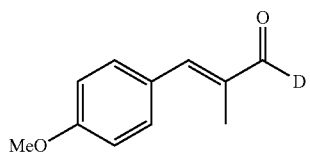

(E)-4-Methoxy-2-methylcinamaldehyde-α-d₁ (10i)

(E)-4-Methoxy-2-methylcinamaldehyde (0.25 mmol), 5l (10 mol %) and KOAc (0.25 mmol, 1 equiv) was dissolved in a mixture of $D_2O$ (1 mL) and DCM (0.25 mL) in a reaction vessel (5 mL). Then the reaction mixture was vigorously stirred at 60° C. for 12 hours. 10i was obtained as a yellow oil in 73% yield with 98% D-incorporation. $^1$H NMR (400 MHz, CDCl₃) δ 9.53 (s, 0.02H), 7.52 (d, J=8.8 Hz, 2H), 7.19 (s, 1H), 6.97 (d, J=8.8 Hz, 2H), 3.85 (s, 3H), 2.07 (d, J=1.2 Hz, 3H); $^{13}$C NMR (100 MHz, CDCl₃) δ 195.2 (t, J=26.4 Hz), 160.8 (s), 149.9 (s), 136.1 (t, J=3.5 Hz), 132.1 (s), 128.0 (s), 114.2 (s), 55.4 (d, J=2.7 Hz), 10.9 (s); HRMS (EI): m/z calcd for $C_{11}H_{11}DO_2$ [(M)$^+$]: 177.0900, found: 177.0901.

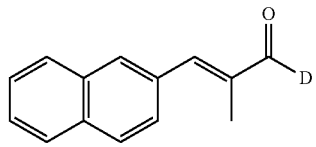 [SMILES: [2H]C(=O)/C(C)=C/c1ccc2ccccc2c1]

(E)-2-Methyl-3-(naphthalen-2-yl)acrylaldehyde-α-d₁ (10j)

(E)-2-Methyl-3-(naphthalen-2-yl)acrylaldehyde (0.25 mmol), 5l (10 mol %) and KOAc (0.25 mmol, 1 equiv) was dissolved in a mixture of $D_2O$ (1 mL) and DCM (0.25 mL) in a reaction vessel (5 mL). Then the reaction mixture was vigorously stirred at 60° C. for 12 hours. 10j was obtained as a white solid in 85% yield with 99% D-incorporation. $^1$H NMR (400 MHz, CDCl₃) δ 9.64 (s, 0.01H), 7.99 (s, 1H), 7.90-7.84 (m, 3H), 7.62 (dd, J=8.6, 1.6 Hz, 1H), 7.58-7.51 (m, 2H), 7.39 (s, 1H), 2.18 (d, J=1.3 Hz, 3H); $^{13}$C NMR (100 MHz, CDCl₃) δ 195.2 (t, J=26.5 Hz), 149.8 (s), 138.4 (t, J=3.5 Hz), 133.5 (s), 133.1 (s), 132.7 (s), 130.4 (s), 128.7 (s), 128.4 (s), 127.8 (s), 127.4 (s), 126.8 (s), 126.8 (s), 11.1 (s); HRMS (EI): m/z calcd for $C_{14}H_{11}DO$ [(M)$^+$]: 197.0951, found: 197.0952.

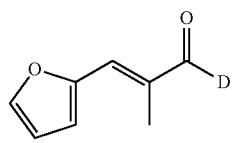

2-Methyl-3-(2-furyl)propenal-α-d₁ (10k)

2-Methyl-3-(2-furyl)propenal (0.25 mmol), 5l (10 mol %) and KOAc (0.25 mmol, 1 equiv) was dissolved in a mixture of D₂O (1 mL) and DCM (0.25 mL) in a reaction vessel (5 mL). Then the reaction mixture was vigorously stirred at 40° C. for 12 hours. 10k was obtained as a yellow oil in 75% yield with 97% D-incorporation. ¹H NMR (400 MHz, CDCl₃) δ 9.46 (s, 0.03H), 7.59 (d, J=1.6 Hz, 1H), 7.00 (s, 1H), 6.75 (d, J=3.5 Hz, 1H), 6.54 (dd, J=3.5, 1.8 Hz, 1H), 2.07 (d, J=1.1 Hz, 3H); ¹³C NMR (100 MHz, CDCl₃) δ 193.9 (t, J=26.5 Hz), 151.6 (s), 145.3 (s), 135.4 (s), 134.9 (t, J=3.6 Hz), 116.5 (s), 112.7 (s), 10.5 (s); HRMS (EI): m/z calcd for $C_8H_7DO_2$ [(M)⁺]: 137.0587, found: 137.0589.

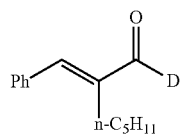

α-Amylcinnamaldehyde-α-d₁ (10l)

α-Amylcinnamaldehyde (0.25 mmol), 5l (20 mol %) and KOAc (0.25 mmol, 1 equiv) was dissolved in a mixture of D₂O (1 mL) and DCM (0.25 mL) in a reaction vessel (5 mL). Then the reaction mixture was vigorously stirred at 50° C. for 12 hours. 10l was obtained as a colorless oil in 96% yield with 97% D-incorporation. ¹H NMR (400 MHz, CDCl₃) δ 9.54 (s, 0.03H), 7.51-7.36 (m, 5H), 7.19 (s, 1H), 2.54-2.50 (m, 2H), 1.54-1.45 (m, 2H), 1.39-1.30 (m, 4H), 0.89 (t, J=7.1 Hz, 3H); ¹³C NMR (100 MHz, CDCl₃) δ 195.3 (t, J=26.4 Hz), 149.7 (s), 143.3 (t, J=3.2 Hz), 135.0 (s), 129.7 (s), 129.5 (s), 128.8 (s), 32.1 (s), 28.0 (s), 24.7 (s), 22.4 (s), 14.0 (s); HRMS (EI): m/z calcd for $C_{14}H_{17}DO$ [(M)⁺]: 203.1420, found: 203.1421.

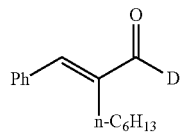

α-Hexylcinnamaldehyde-α-d₁ (10m)

α-Hexylcinnamaldehyde (0.25 mmol), 5l (20 mol %) and KOAc (0.25 mmol, 1 equiv) was dissolved in a mixture of D₂O (1 mL) and DCM (0.25 mL) in a reaction vessel (5 mL). Then the reaction mixture was vigorously stirred at 50° C. for 12 hours. 10m was obtained as a colorless oil in 92% yield with 97% D-incorporation. ¹H NMR (400 MHz, CDCl₃) δ 9.54 (s, 0.03H), 7.51-7.36 (m, 5H), 7.20 (s, 1H), 2.55-2.51 (m, 2H), 1.53-1.44 (m, 2H), 1.42-1.25 (m, 6H), 0.88 (t, J=6.8 Hz, 3H); ¹³C NMR (100 MHz, CDCl₃) δ 195.3 (t, J=26.4), 149.7 (s), 143.3 (t, J=2.9 Hz), 135.0 (s), 129.7 (s), 129.5 (s), 128.8 (s), 31.5 (s), 29.6 (s), 28.3 (s), 24.8 (s), 22.6 (s), 14.1 (s); HRMS (EI): m/z calcd for $C_{15}H_{19}DO$ [(M)⁺]: 217.1577, found: 217.1578.

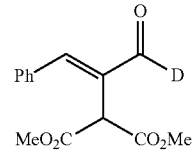

(E)-Dimethyl 2-(3-oxo-1-phenylprop-1-en-2-yl)malonate-α-d₁ (10n)

(E)-Dimethyl 2-(3-oxo-1-phenylprop-1-en-2-yl)malonate (0.25 mmol), 5l (20 mol %), and KOAc (0.25 mmol, 1 equiv) was dissolved in a mixture of D₂O (1 mL) and DCM (0.25 mL) in a reaction vessel (5 mL). Then the reaction mixture was vigorously stirred at 60° C. for 12 hours. 10n was obtained as a yellow oil in 61% yield with 95% D-incorporation. ¹H NMR (400 MHz, CDCl₃) δ 9.61 (s, 0.05H), 7.65 (s, 1H), 7.47-7.41 (m, 5H), 4.75 (s, 1H), 3.70 (s, 6H); ¹³C NMR (100 MHz, CDCl₃) δ 192.3 (t, J=27.0 Hz), 167.6 (s), 152.7 (s), 135.0 (t, J=3.0 Hz), 133.4 (s), 130.4 (s), 129.2 (s), 129.0 (s), 52.9 (d, J=1.7 Hz), 49.1 (s); HRMS (EI): m/z calcd for $C_{14}H_{13}DO_5$ [(M)⁺]: 263.0904, found: 263.0903.

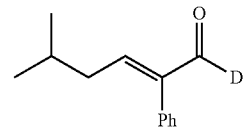

5-Methyl-2-phenyl-2-hexenal-α-d₁ (10o)

5-Methyl-2-phenyl-2-hexenal (0.25 mmol), 5l (10 mol %) and KOAc (0.25 mmol, 1 equiv) was dissolved in a mixture of D₂O (1 mL) and DCM (0.25 mL) in a reaction vessel (5 mL). Then the reaction mixture was vigorously stirred at 40° C. for 12 hours. 10o was obtained as a colorless oil in 80% yield with 98% D-incorporation. ¹H NMR (400 MHz, CDCl₃) δ 9.64 (s, 0.02H), 7.46-7.38 (m, 2H), 7.37-7.31 (m, 1H), 7.18-7.14 (m, 2H), 6.77 (t, J=7.5 Hz, 1H), 2.30-2.24 (m, 2H), 1.90-1.78 (m, 1H), 0.93 (d, J=6.7 Hz, 6H); ¹³C NMR (100 MHz, CDCl₃) δ 193.4 (t, J=26.6 Hz), 155.6 (s), 144.6 (t, J=3.4 Hz), 132.8 (s), 129.5 (s), 128.2 (s), 127.9 (s), 38.6 (s), 28.5 (s), 22.5 (s); HRMS (EI): m/z calcd for $C_{13}H_{15}DO$ [(M)⁺]: 189.1264, found: 189.1265.

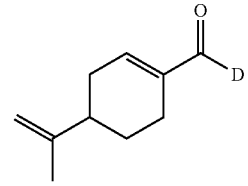

(−)-Perillaldehyde-α-d₁ (10p)

(−)-Perialdehyde (0.25 mmol), 5l (20 mol %) and KOAc (0.25 mmol, 1 equiv) was dissolved in a mixture of D₂O (1 mL) and DCM (0.25 mL) in a reaction vessel (5 mL). Then the reaction mixture was vigorously stirred at 50° C. for 12 hours. 10p was obtained as a colorless oil in 75% yield with 98% D-incorporation. $^1$H NMR (400 MHz, CDCl$_3$) δ 9.41 (s, 0.02H), 6.82-6.78 (m, 1H), 4.75 (s, 1H), 4.70 (s, 1H), 2.49-2.37 (m, 2H), 2.27-2.16 (m, 2H), 2.15-2.05 (m, 1H), 1.91-1.86 (m, 1H), 1.73 (s, 3H), 1.48-1.38 (m, 1H); $^{13}$C NMR (100 MHz, CDCl$_3$) δ 193.6 (t, J=26.2 Hz), 150.6 (s), 148.3 (s), 141.2 (t, J=3.5 Hz), 109.5 (s), 40.7 (s), 31.7 (s), 26.3 (s), 21.5 (s), 20.7 (s); HRMS (EI): m/z calcd for C$_{10}$H$_{13}$DO [(M)$^+$]: 151.1107, found: 151.1109.

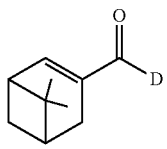

(1R)-Myrtenal-α-d$_1$ (10q)

(1R)-Myrtenal (0.25 mmol), 5l (20 mol %) and KOAc (0.25 mmol, 1 equiv) was dissolved in a mixture of D$_2$O (1 mL) and DCM (0.25 mL) in a reaction vessel (5 mL). Then the reaction mixture was vigorously stirred at 60° C. for 12 hours. 10q was obtained as a colorless oil in 67% yield with 97% D-incorporation. $^1$H NMR (400 MHz, CDCl$_3$) δ 9.41 (s, 0.03H), 6.72-6.67 (m, 1H), 2.84 (t, J=5.6 Hz, 1H), 2.65-2.43 (m, 3H), 2.19-2.14 (m, 1H), 1.31 (s, 3H), 1.03 (d, J=9.2 Hz, 1H), 0.72 (s, 3H); $^{13}$C NMR (100 MHz, CDCl$_3$) δ 190.9 (t, J=26.3 Hz), 151.5 (t, J=3.6 Hz), 147.7 (s), 40.7 (s), 38.0 (s), 37.6 (s), 33.0 (s), 31.1 (s), 25.7 (s), 20.9 (s); HRMS (EI): m/z calcd for C$_{10}$H$_{13}$DO [(M)$^+$]: 151.1107, found: 151.1109.

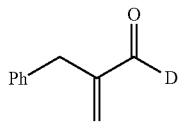

2-Benzylacrylaldehyde-α-d$_1$ (10r)

2-Benzylacrylaldehyde (0.25 mmol), 5l (10 mol %) and KOAc (0.25 mmol, 1 equiv) was dissolved in a mixture of D$_2$O (1 mL) and DCM (0.25 mL) in a reaction vessel (5 mL). Then the reaction mixture was vigorously stirred at 40° C. for 12 hours. 10r was obtained as a yellow oil in 50% yield with 96% D-incorporation. $^1$H NMR (400 MHz, CDCl$_3$) δ 9.61 (s, 0.04H), 7.33-7.17 (m, 5H), 6.11 (s, 1H), 6.07 (s, 1H), 3.57 (s, 2H); $^{13}$C NMR (100 MHz, CDCl$_3$) δ 193.7 (t, J=26.7 Hz), 149.7 (t, J=3.7 Hz), 138.2 (s), 135.2 (s), 129.2 (s), 128.6 (s), 126.5 (s), 34.1 (s); HRMS (EI): m/z calcd for C$_{10}$H$_9$DO [(M)$^+$]: 147.0794, found: 147.0796.

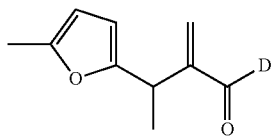

2-Methylene-3-(5-methylfuran-2-yl)butanal-α-d$_1$ (10s)

2-Methylene-3-(5-methylfuran-2-yl)butanal (0.25 mmol), 5l (10 mol %) and KOAc (0.25 mmol, 1 equiv) was dissolved in a mixture of D$_2$O (1 mL) and DCM (0.25 mL) in a reaction vessel (5 mL). Then the reaction mixture was vigorously stirred at 60° C. for 12 hours. 10s was obtained as a yellow oil in 50% yield with 98% D-incorporation. $^1$H NMR (400 MHz, CDCl$_3$) δ 9.57 (s, 0.02H), 6.18 (d, J=0.6 Hz, 1H), 6.05 (s, 1H), 5.94 (d, J=2.9 Hz, 1H), 5.86 (dd, J=2.9, 0.9 Hz, 1H), 4.04 (q, J=7.1 Hz, 1H), 2.23 (s, 3H), 1.37 (d, J=7.2 Hz, 3H); $^{13}$C NMR (100 MHz, CDCl$_3$) δ 193.2 (t, J=26.7 Hz), 154.8 (s), 152.5 (t, J=3.7 Hz), 151.0 (s), 134.3 (s), 106.2 (s), 105.8 (s), 31.2 (s), 18.3 (s), 13.5 (s); HRMS (EI): m/z calcd for C$_{10}$H$_{11}$DO$_2$ [(M)$^+$]: 165.0900, found: 165.0902.

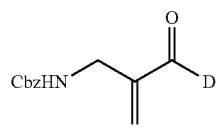 [SMILES: [2H]C(=O)C(=C)CNC(=O)OCc1ccccc1]

Benzyl (2-formylallyl)carbamate-α-d$_1$ (10t)

Benzyl (2-formylallyl)carbamate (0.25 mmol), 5l (20 mol %) and KOAc (0.25 mmol, 1 equiv) was dissolved in a mixture of D$_2$O (1 mL) and DCM (0.25 mL) in a reaction vessel (5 mL). Then the reaction mixture was vigorously stirred at 60° C. for 12 hours. 10t was obtained as a yellow solid in 42% yield with 98% D-incorporation. $^1$H NMR (400 MHz, CDCl$_3$) δ 9.57 (s, 0.02H), 7.38-7.30 (m, 5H), 6.43 (s, 1H), 6.11 (s, 1H), 5.23 (s, 1H), 5.09 (s, 2H), 4.00 (d, J=6.3 Hz, 2H); $^{13}$C NMR (100 MHz, CDCl$_3$) δ 193.8 (s), 156.3 (s), 146.0 (s), 136.3 (s), 135.0 (s), 128.6 (s), 128.2 (s), 128.1 (s), 66.9 (s), 39.3 (s); HRMS (EI): m/z calcd for C$_{12}$H$_{12}$DNO$_3$ [(M)$^+$]: 220.0958, found: 220.0959.

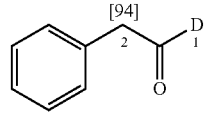

Phenylacetaldehyde-1,2-d$_1$,d$_2$ (12a)

Phenylacetaldehyde (0.5 mmol), 5q (20 mol %) and KOAc (1.0 mmol, 2 equiv) was dissolved in a mixture of D$_2$O (1 mL) and DCM (0.25 mL) in a reaction vessel (5 mL). Then the reaction mixture was vigorously stirred at 40° C. for 12 hours. 12a was obtained as a colorless oil in 48% yield with 98% D-incorporation at position 1 and 94% D-incorporation at position 2. $^1$H NMR (400 MHz, CDCl$_3$) δ 9.75 (s, 0.02H), 7.38 (t, J=7.2 Hz, 2H), 7.34-7.29 (m, 1H), 7.25-7.21 (m, 2H), 3.68-3.66 (m, 0.12H); $^{13}$C NMR (100 MHz, CDCl$_3$) δ 199.3 (t, J=26.9 Hz), 131.8 (s), 129.6 (s), 129.0 (s), 127.4 (s), 49.9 (d, J=12.6 Hz) HRMS (EI): m/z calcd for C$_8$H$_5$D$_3$O [(M)$^+$]: 123.0763, found: 123.0764.

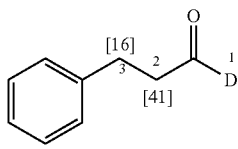 [SMILES: [2H]C(=O)CCc1ccccc1]

3-Phenylpropionaldehyde-1,2,3-d$_1$,d$_2$,d$_2$ (12b)

3-Phenylpropionaldehyde (0.5 mmol), 5q (10 mol %) and NaHCO$_3$ (0.5 mmol, 1 equiv) was dissolved in a mixture of D$_2$O (1 mL) and DCM (0.25 mL) in a reaction vessel (5 mL). Then the reaction mixture was vigorously stirred at 30° C. for 12 hours. 12b was obtained as a colorless oil in 51% yield with 98% D-incorporation at position 1, 41% D-incorporation at position 2 and 16% D-incorporation at position 3. $^1$H NMR (400 MHz, CDCl$_3$) δ 9.83 (d, J=1.2 Hz, 0.02H), 7.34 (t, J=7.3 Hz, 2H), 7.29-7.21 (m, 3H), 2.99 (t, J=7.4 Hz, 1.67H), 2.83-2.75 (m, 1.18H); $^{13}$C NMR (100 MHz, CDCl$_3$) δ 201.3 (t, J=26.2 Hz), 140.5 (s), 128.7 (s), 128.4 (s), 126.3 (s), 45.1 (t, J=3.7 Hz), 28.1 (d, J=5.7 Hz); HRMS (EI): m/z calcd for C$_9$H$_9$DO [(M)$^+$]: 135.0794, Found: 135.0799; C$_9$H$_8$D$_2$O [(M)$^+$]: 136.0857, found: 136.0858; C$_9$H$_5$D$_5$O [(M)$^+$]: 139.1045, found: 139.1049.

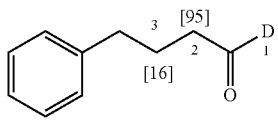 [SMILES: [2H]C(=O)CCCc1ccccc1]

Benzenebutanal-1,2,3-d$_1$,d$_2$,d$_2$ (12c)

Benzenebutanal (0.5 mmol), 5q (10 mol %) and NaHCO$_3$ (0.5 mmol, 1 equiv) was dissolved in a mixture of D$_2$O (1 mL) and DCM (0.25 mL) in a reaction vessel (5 mL). Then the reaction mixture was vigorously stirred at 40° C. for 12 hours. 12c was obtained as a colorless oil in 67% yield with 99% D-incorporation at position 1, 95% D-incorporation at position 2 and 16% D-incorporation at position 3. $^1$H NMR (400 MHz, CDCl$_3$) δ 9.76 (s, 0.01H), 7.30 (t, J=7.3 Hz, 2H), 7.24-7.16 (m, 3H), 2.67 (t, J=7.5 Hz, 2H), 2.45-2.42 (m, 0.09H), 1.96 (t, J=7.5 Hz, 1.68H); $^{13}$C NMR (100 MHz, CDCl$_3$) δ 202.2 (t, J=25.8 Hz), 141.3 (s), 128.5 (s), 126.1 (s), 42.2 (s), 34.9 (d, J=9.1 Hz), 23.5 (s); HRMS (EI): m/z calcd for C$_{10}$H$_9$D$_3$O [(M)$^+$]: 151.1076, Found: 151.1090; C$_{10}$H$_8$D$_4$O [(M)$^+$]: 152.1139, Found: 152.1140; C$_{10}$H$_7$D$_5$O [(M)$^+$]: 153.1202, found: 153.1190.

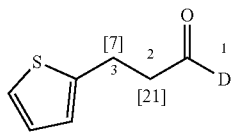

3-Thienylpropionaldehyde-1,2-d$_1$,d$_2$ (12d)

3-Thienylpropionaldehyde (0.5 mmol), 5q (10 mol %) and NaHCO$_3$ (0.5 mmol, 1 equiv) was dissolved in a mixture of D$_2$O (1 mL) and DCM (0.25 mL) in a reaction vessel (5 mL). Then the reaction mixture was vigorously stirred at 30° C. for 12 hours. 12d was obtained as a colorless oil in 69% yield with 98% D-incorporation at position 1, 21% D-incorporation at position 2 and 7% D-incorporation at position 3. $^1$H NMR (400 MHz, CDCl$_3$) δ 9.82 (s, 0.02H), 7.13 (dd, J=5.1, 1.1 Hz, 1H), 6.92 (dd, J=5.1, 3.5 Hz, 1H), 6.82 (d, J=3.3 Hz, 1H), 3.18 (t, J=7.2 Hz, 1.86H), 2.84 (t, J=7.3 Hz, 1.50H); $^{13}$C NMR (100 MHz, CDCl$_3$) δ 200.7 (t, J=26.4), 143.0 (s), 127.0 (s), 124.8 (s), 123.6 (s), 45.2 (t, J=3.7), 22.3 (d, J=6.0 Hz); HRMS (EI): m/z calcd for C$_7$H$_7$DOS [(M)$^+$]: 141.0359, found: 141.0360.

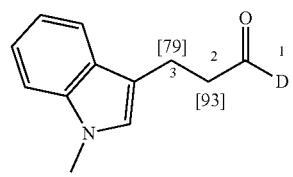

3-(1-Methyl-1H-3-indolyl)propanal-1,2,3-d$_1$,d$_2$,d$_2$ (12e)

3-(1-Methyl-1H-3-indolyl)propanal (0.5 mmol), 5q (10 mol %) and NaHCO$_3$ (0.5 mmol, 1 equiv) was dissolved in a mixture of D$_2$O (1 mL) and DCM (0.25 mL) in a reaction vessel (5 mL). Then the reaction mixture was vigorously stirred at 40° C. for 12 hours. 12e was obtained as a yellow solid in 48% yield with 95% D-incorporation at position 1, 93% D-incorporation at position 2 and 79% D-incorporation at position 3. $^1$H NMR (400 MHz, CDCl$_3$) δ 9.80 (s, 0.05H), 7.55 (d, J=7.9 Hz, 1H), 7.27 (d, J=8.2 Hz, 1H), 7.22 (dd, J=7.8, 7.2 Hz, 1H), 7.13-7.07 (m, 1H), 6.81 (s, 1H), 3.70 (s, 3H), 3.06 (t, J=6.5 Hz, 0.43H), 2.80-2.75 (m, 0.14H); $^{13}$C NMR (100 MHz, CDCl$_3$) δ 202.6 (t, J=26.2 Hz), 137.1 (s), 127.5 (s), 126.4 (s), 121.8 (s), 118.9 (s), 118.7 (s), 113.0 (s), 109.3 (s), 43.4 (s), 32.6 (s), 17.7 (s); HRMS (EI): m/z calcd for C$_{12}$H$_8$D$_5$NO [(M)$^+$]: 192.1311, found: 192.1310.

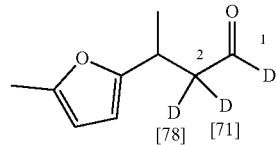

3-(5-Methyl-2-furanyl)butanal-1,2-d$_1$,d$_2$ (12f)

3-(5-Methyl-2-furanyl)butanal (0.5 mmol), 5q (10 mol %) and NaHCO$_3$ (0.5 mmol, 1 equiv) was dissolved in a mixture of D$_2$O (1 mL) and DCM (0.25 mL) in a reaction vessel (5 mL). Then the reaction mixture was vigorously stirred at 40° C. for 12 hours. 12f was obtained as a colorless oil in 73% yield with 97% D-incorporation at position 1, 71% D-incorporation at position 2 and 78% D-incorporation at position 2. $^1$H NMR (400 MHz, CDCl$_3$) δ 9.75 (s, 0.03H), 5.86 (d, J=2.9 Hz, 1H), 5.84 (s, 1H), 3.39-3.32 (m, 1H), 2.78-2.72 (m, 0.32H), 2.57-2.51 (m, 0.24H), 2.23 (s, 3H), 1.28 (d, J=7.0 Hz, 3H); $^{13}$C NMR (100 MHz, CDCl$_3$) δ 201.9-201.1 (m), 156.4 (s), 150.8 (s), 105.8 (s), 104.8 (s), 49.2-45.8 (m), 27.8 (d, J=5.1 Hz), 19.0 (s), 13.5 (d, J=1.3 Hz); HRMS (EI): m/z calcd for C$_9$H$_9$D$_3$O$_2$: 155.1026, found: 155.1028.

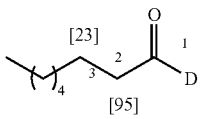

Octanal-1,2,3-d$_1$,d$_2$,d$_2$ (12g)

Octanal (0.5 mmol), 5q (10 mol %) and NaHCO$_3$ (0.5 mmol, 1 equiv) was dissolved in a mixture of D$_2$O (1 mL) and DCM (0.25 mL) in a reaction vessel (5 mL). Then the reaction mixture was vigorously stirred at 40° C. for 12 hours. 12g was obtained as a colorless oil in 71% yield with 96% D-incorporation at position 1, 95% D-incorporation at position 2 and 23% D-incorporation at position 3. $^1$H NMR (400 MHz, CDCl$_3$) δ 9.74 (s, 0.04H), 2.41-2.20 (m, 0.1H), 1.58 (d, J=6.5 Hz, 1.54H), 1.35-1.22 (m, 8H), 0.86 (dd, J=8.8, 4.9 Hz, 3H). $^{13}$C NMR (100 MHz, CDCl$_3$) δ 202.9 (t, J=26.6 Hz), 43.1 (m), 31.6 (s), 29.1 (s), 29.0 (s), 22.6 (s), 21.9 (s), 14.0 (s); HRMS (EI): m/z calcd for C$_8$H$_{13}$D$_3$O [(M)$^+$]: 131.1389, found: 131.1385.

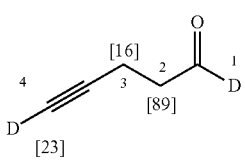

6-Heptynal-1,2-d$_1$,d$_2$ (12h)

6-Heptynal (0.5 mmol), 5t (10 mol %), NaHCO$_3$ (0.5 mmol, 1 equiv) was dissolved in a mixture of D$_2$O (1 mL) and DCM (0.25 mL) in a reaction vessel (5 mL). Then the reaction mixture was vigorously stirred at 40° C. for 12 hours. 12h was obtained as a colorless oil in 64% yield with 98% D-incorporation at position 1, 89% D-incorporation at position 2, 16% D-incorporation at position 3 and 23% D-incorporation at position 4. $^1$H NMR (400 MHz, CDCl$_3$) δ 9.77 (s, 0.02H), 2.48-2.41 (m, 0.21H), 2.26-2.18 (m, 2H), 1.95 (t, J=2.6 Hz, 0.64H), 1.78-1.70 (m, 1.74H), 1.61-1.52 (m, 2H); $^{13}$C NMR (100 MHz, CDCl$_3$) δ 202.1 (t, J=23.5 Hz), 83.8 (s), 68.8 (s), 27.7 (s), 22.7 (s), 20.9 (s), 18.2 (s); HRMS (EI): m/z calcd for C$_7$H$_9$DO [(M)$^+$]: 111.0794, Found: 111.0793; C$_7$H$_7$D$_3$O [(M)$^+$]: 113.0920, found: 113.0922.

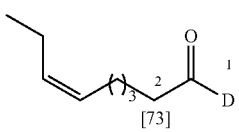

Cis-6-Nonenal-1,2-d$_1$,d$_2$ (12i)

Cis-6-Nonenal (0.5 mmol), 5q (10 mol %) and NaHCO$_3$ (0.5 mmol, 1 equiv) was dissolved in a mixture of D$_2$O (1 mL) and DCM (0.25 mL) in a reaction vessel (5 mL). Then the reaction mixture was vigorously stirred at 50° C. for 12 hours. 12i was obtained as a colorless oil in 72% yield with 96% D-incorporation at position 1 and 73% D-incorporation at position 2. $^1$H NMR (400 MHz, CDCl$_3$) δ 9.75 (s, 0.04H), 5.41-5.34 (m, 1H), 5.33-5.26 (m, 1H), 2.42 (t, J=7.4 Hz, 0.5H), 2.09-1.96 (m, 4H), 1.67-1.58 (m, 2H), 1.42-1.33 (m, 2H), 0.94 (t, J=7.5 Hz, 3H); $^{13}$C NMR (100 MHz, CDCl$_3$) δ 202.6 (d, J=52.2 Hz), 132.2 (s), 128.4 (s), 43.6 (s), 29.1 (t, J=7.6 Hz), 26.8 (s), 21.6-21.4 (m), 20.5 (s), 14.3 (s); HRMS (EI): m/z calcd for C$_9$H$_{14}$D$_2$O [(M)$^+$]: 142.1327, Found: 142.1322; C$_9$H$_{13}$D$_3$O [(M)$^+$]: 143.1389, found: 143.1393.

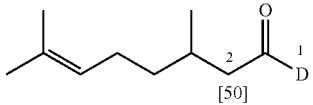

Citronellal-1,2-d$_1$,d$_2$ (12j)

Citronellal (0.5 mmol), 5q (10 mol %) and NaHCO$_3$ (0.5 mmol, 1 equiv) was dissolved in a mixture of D$_2$O (1 mL) and DCM (0.25 mL) in a reaction vessel (5 mL). Then the reaction mixture was vigorously stirred at 50° C. for 12 hours. 12j was obtained as a colorless oil in 78% yield with 96% D-incorporation at position 1, 50% D-incorporation at position 2 and 50% D-incorporation at position 2. $^1$H NMR (400 MHz, CDCl$_3$) δ 9.74 (s, 0.04H), 5.10-5.04 (m, 1H), 2.38 (dd, J=15.9, 5.5 Hz, 0.50H), 2.21 (dd, J=16.1, 8.0 Hz, 0.50H), 2.07-1.92 (m, 3H), 1.67 (s, 3H), 1.59 (s, 3H), 1.40-1.21 (m, 2H), 0.96 (d, J=6.7 Hz, 3H). $^{13}$C NMR (100 MHz, CDCl$_3$) δ 202.8 (t, J=25.8 Hz), 131.8 (s), 124.0 (s), 50.8 (t, J=3.5 Hz), 36.9 (d, J=4.3 Hz), 27.7 (d, J=9.8 Hz), 25.7 (s), 25.4 (s), 19.8 (d, J=6.5 Hz), 17.7 (s); HRMS (EI): m/z calcd for C$_{10}$H$_{17}$DO [(M)$^+$]: 155.1420, Found: 155.1424; C$_{10}$H$_{16}$D$_2$O [(M)$^+$]: 156.1483, Found: 156.1474; C$_{10}$H$_{15}$D$_3$O [(M)$^+$]: 157.1546, found: 157.1547.

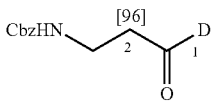 [SMILES: [2H]C(=O)CCNC(=O)OCc1ccccc1]

Benzyl-4-oxobutanoate-1,2-d$_1$,d$_2$ (12k)

Benzyl-4-oxobutanoate (0.5 mmol), 5q (10 mol %) and NaHCO$_3$ (0.5 mmol, 1 equiv), was dissolved in a mixture of D$_2$O (1 mL) and DCM (0.25 mL) in a reaction vessel (5 mL). Then the reaction mixture was vigorously stirred at 50° C. for 12 hours. 12k was obtained yellow solid in 55% yield with 99% D-incorporation at position 1 and 96% D-incorporation at position 2. $^1$H NMR (400 MHz, CDCl$_3$) δ 9.79 (s, 0.01H), 7.38-7.31 (m, 5H), 5.22 (s, 1H), 5.07 (s, 2H), 3.47 (d, J=6.1 Hz, 2H), 2.69 (s, 0.07H). $^{13}$C NMR (100 MHz, CDCl$_3$) δ 201.4-200.7 (m), 156.4 (s), 136.4 (s), 128.6 (s), 128.2 (s), 128.1 (s), 66.8 (s), 43.4 (s), 34.4 (s), 29.7 (s); HRMS (EI): m/z calcd for C$_{11}$H$_{10}$D$_3$NO$_3$ [(M)$^+$]: 210.1084, found: 210.1085.

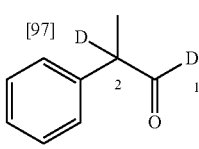

2-Phenylpropionaldehyde-1,2-d₁,d₁ (12l)

2-Phenylpropionaldehyde (0.5 mmol), 5q (10 mol %) and NaHCO₃ (0.5 mmol, 1 equiv) was dissolved in a mixture of D₂O (1 mL) and DCM (0.25 mL) in a reaction vessel (5 mL). Then the reaction mixture was vigorously stirred at 30° C. for 12 hours. 12l was obtained as a colorless oil in 73% yield with 99% D-incorporation at position 1 and 97% D-incorporation at position 2. ¹H NMR (400 MHz, CDCl₃) δ 9.69 (s, 0.01H), 7.41-7.30 (m, 3H), 7.23-7.20 (m, 2H), 3.63 (q, J=7.0 Hz, 0.03H), 1.45 (s, 3H); ¹³C NMR (100 MHz, CDCl₃) δ 200.9 (t, J=26.6 Hz), 137.7 (s), 129.1 (s), 128.3 (s), 127.6 (s), 52.7-52.1 (m), 14.5 (s); HRMS (EI): m/z calcd for C₉H₈D₂O [(M)⁺]: 136.0857, found: 136.0856.

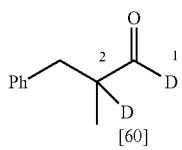

2-Methyl-3-phenylpropionaldehyde-1,2-d₁,d₁ (12m)

2-Methyl-3-phenylpropionaldehyde (0.5 mmol), 5q (10 mol %) and NaHCO₃ (0.5 mmol, 1 equiv) was dissolved in a mixture of D₂O (1 mL) and DCM (0.25 mL) in a reaction vessel (5 mL). Then the reaction mixture was vigorously stirred at 30° C. for 12 hours. 12m was obtained as a colorless oil in 82% yield with 98% D-incorporation at position 1 and 60% D-incorporation at position 2. ¹H NMR (400 MHz, CDCl₃) δ 9.73 (d, J=1.3 Hz, 0.02H), 7.34-7.28 (m, 2H), 7.25-7.16 (m, 3H), 3.12-3.06 (m, 1H), 2.72-2.65 (m, 0.4H), 2.65-2.58 (m, 1H), 1.10 (d, J=6.8 Hz, 3H); ¹³C NMR (100 MHz, CDCl₃) δ 204.1 (td, J=25.8, 9.1 Hz), 138.9 (d, J=1.2 Hz), 129.1 (s), 128.6 (s), 126.4 (s), 47.9 (t, J=3.5 Hz), 36.6 (d, J=6.8 Hz), 13.2 (d, J=7.5 Hz); HRMS (EI): m/z calcd for C₁₀H₁₀D₂O [(M)⁺]: 150.1014, found: 150.1018.

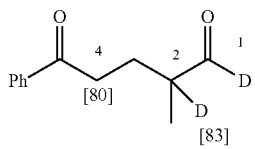 [SMILES: [2H]C(=O)C([2H])(C)CCC(=O)c1ccccc1]

2-Methyl-5-oxo-5-phenylpentanal-1,2,4-d₁,d₁,d₂ (12n)

2-Methyl-5-oxo-5-phenylpentanal (0.5 mmol), 5q (10 mol %) and NaHCO₃ (0.5 mmol, 1 equiv) was dissolved in a mixture of D₂O (1 mL) and DCM (0.25 mL) in a reaction vessel (5 mL). Then the reaction mixture was vigorously stirred at 50° C. for 12 hours. 12n was obtained as a colorless oil in 72% yield with 98% D-incorporation at position 1, 83% D-incorporation at position 2 and 80% D-incorporation at position 4. ¹H NMR (400 MHz, CDCl₃) δ 9.64 (s, 0.02H), 7.93 (d, J=7.1 Hz, 2H), 7.57-7.52 (m, 1H), 7.44 (t, J=7.6 Hz, 2H), 3.04-2.96 (m, 0.40H), 2.50-2.43 (m, 0.17H), 2.11 (dd, J=14.2, 7.0 Hz, 1H), 1.85-1.78 (m, 1H), 1.15 (d, J=7.2 Hz, 3H); ¹³C NMR (100 MHz, CDCl₃) δ 204.5-203.9 (m), 199.4 (t, J=6.2 Hz), 136.7 (s), 133.2 (s), 128.6 (s), 128.0 (s), 45.5 (t, J=3.3 Hz), 35.5 (s), 24.6 (s), 13.5 (d, J=7.9 Hz); HRMS (EI): m/z calcd for C₁₂H₁₀D₄O₂ [(M)⁺]: 194.1245, found: 194.1275.

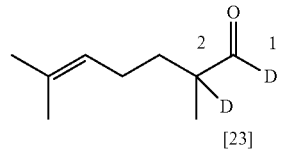

2,6-Dimethyl-5-heptenal-1,2-d₁,d₁ (12o)

2,6-Dimethyl-5-heptenal (0.5 mmol), 5q (10 mol %) and NaHCO₃ (0.5 mmol, 1 equiv) was dissolved in a mixture of D₂O (1 mL) and DCM (0.25 mL) in a reaction vessel (5 mL). Then the reaction mixture was vigorously stirred at 50° C. for 12 hours. 12o was obtained as a colorless oil in 64% yield with 98% D-incorporation at position 1 and 23% D-incorporation at position 2. ¹H NMR (400 MHz, CDCl₃) δ 9.59 (d, J=1.8 Hz, 0.02H), 5.08-5.04 (m, 1H), 2.43 (t, J=7.4 Hz, 0.24H), 2.36-2.29 (m, 0.57H), 2.23 (dd, J=14.6, 7.3 Hz, 0.25H), 2.01 (dd, J=14.7, 7.4 Hz, 2H), 1.78-1.69 (m, 1H), 1.66 (s, 3H), 1.57 (s, 3H), 1.42-1.33 (m, 1H) 1.07 (d, J=7.0 Hz, 3H); ¹³C NMR (100 MHz, CDCl₃) δ 204.9 (t, J=25.8 Hz), 132.7 (s), 123.4 (s), 45.6 (t, J=3.3 Hz), 30.6 (s), 25.7 (s), 25.3 (s), 17.7 (s), 13.2 (s); HRMS (EI): m/z calcd for C₉H₁₅DO [(M)⁺]: 141.1264, found: 141.1243.

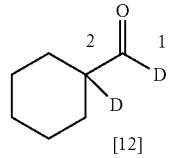

Cyclohexanaldehyde-1,2-d₁,d₁ (12p)

Cyclohexanaldehyde (0.5 mmol), 5q (10 mol %) and NaHCO₃ (0.5 mmol, 1 equiv) was dissolved in a mixture of D₂O (1 mL) and DCM (0.25 mL) in a reaction vessel (5 mL). Then the reaction mixture was vigorously stirred at 30° C. for 12 hours. 12p was obtained as a colorless oil in 70% yield with 98% D-incorporation at position 1 and 12% D-incorporation at position 2. ¹H NMR (400 MHz, CDCl₃) δ 9.59 (s, 0.02H), 2.24-2.18 (m, 0.80H), 1.90-1.84 (m, 2H), 1.74-1.70 (m, 2H), 1.65-1.59 (m, 1H), 1.36-1.20 (m, 5H); ¹³C NMR (100 MHz, CDCl₃) δ 204.8 ((t, J=25.8 Hz), 49.8 (t, J=3.3 Hz), 28.8 (s), 25.9 (d, J=2.5 Hz), 25.0 (d, J=2.7 Hz); HRMS (EI): m/z calcd for C₇H₁₁DO [(M)⁺]: 113.0951, found C₇H₁₁DO: 113.0952.

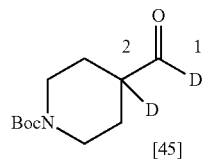 [SMILES: [2H]C(=O)C1([2H])CCN(C(=O)OC(C)(C)C)CC1]

1-(tert-Butoxycarbonyl)-4-formylpiperidine-1,2-$d_1$, $d_1$ (12q)

1-(tert-butoxycarbonyl)-4-formylpiperidine (0.5 mmol), 5q (10 mol %) and NaHCO$_3$ (0.5 mmol, 1 equiv) was dissolved in a mixture of D$_2$O (1 mL) and DCM (0.25 mL) in a reaction vessel (5 mL). Then the reaction mixture was vigorously stirred at 30° C. for 12 hours. 12q was obtained as a white solid in 76% yield with 99% D-incorporation at position 1, and 45% D-incorporation at position 2. $^1$H NMR (400 MHz, CDCl$_3$) δ 9.63 (s, 0.01H), 3.95 (d, J=8.2 Hz, 2H), 2.90 (t, J=11.5 Hz, 2H), 2.42-2.35 (m, 0.55H), 1.85 (d, J=10.7 Hz, 2H), 1.57-1.48 (m, 2H), 1.43 (s, 9H); $^{13}$C NMR (100 MHz, CDCl$_3$) δ 202.7 (t, J=26.0 Hz), 154.7 (s), 79.7 (s), 47.8 (t, J=3.5 Hz), 42.8 (m), 28.40 (s), 25.1 (d, J=10.1 Hz); HRMS (EI): m/z calcd for C$_{11}$H$_{17}$D$_2$NO$_3$ [(M)$^+$]: 215.1490, found: 215.1489.

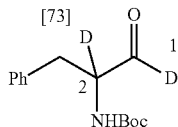

tert-Butyl N-(1-benzyl-2-oxoethyl)carbamate-1,2-$d_1$, $d_1$ (12r)

tert-Butyl N-(1-benzyl-2-oxoethyl)carbamate (0.5 mmol), 5q (10 mol %) and NaHCO$_3$ (0.5 mmol, 1 equiv) was dissolved in a mixture of D$_2$O (1 mL) and DCM (0.25 mL) in a reaction vessel (5 mL). Then the reaction mixture was vigorously stirred at 40° C. for 12 hours. Compound 12r was obtained as a colorless oil in 86% yield with 99% D-incorporation at position 1 and 73% D-incorporation at position 2. $^1$H NMR (400 MHz, CDCl$_3$) δ 9.67 (s, 0.01H), 7.23 (t, J=7.2 Hz, 2H), 7.19-7.16 (m, 1H), 7.10 (d, J=6.9 Hz, 2H), 5.01 (s, 1H), 4.35 (d, J=6.7 Hz, 0.23H), 3.04 (d, J=6.6 Hz, 2H), 1.36 (s, 9H). $^{13}$C NMR (100 MHz, CDCl$_3$) δ 199.5-198.8 (m), 155.4 (s), 135.8 (s), 129.3 (s), 128.8 (s), 127.1 (s), 80.2 (s), 60.7 (s), 35.4 (s), 28.3 (s); HRMS (EI): m/z calcd for C$_{13}$H$_{17}$DNO$_2$ [(M−CDO)$^+$]: 221.1400, found: 221.1401.

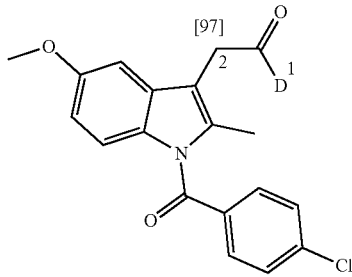 [SMILES: [2H]C(=O)Cc1c(C)n(C(=O)c2ccc(Cl)cc2)c2ccc(OC)cc12]

2-(1-(4-Chlorobenzoyl)-5-methoxy-2-Methyl-1H-indol-3-yl)acetaldehyde-1,2-$d_1$,$d_2$ (12s)

2-(1-(4-Chlorobenzoyl)-5-methoxy-2-Methyl-1H-indol-3-yl)acetaldehyde 1is (0.1 mmol), 5q (20 mol %) and AcOK (0.1 mmol, 1 equiv) was dissolved in a mixture of D$_2$O (1 mL) and DCM (0.25 ml) in a reaction vessel (5 mL). Then the reaction mixture was vigorously stirred at 60° C. for 12 hours. 12s was obtained as a tan solid in 60% yield with 99% D-incorporation at position 1 and 97% D-incorporation at position 2. $^1$H NMR (400 MHz, CDCl$_3$) δ 9.71 (s, 0.01H), 7.67 (d, J=8.5 Hz, 2H), 7.48 (d, J=8.4 Hz, 2H), 6.86 (d, J=8.9 Hz, 2H), 6.69 (dd, J=8.9, 2.5 Hz, 1H), 3.83 (s, 3H), 3.70 (s, 0.06H), 2.38 (s, 3H); $^{13}$C NMR (100 MHz, CDCl$_3$) δ 198.2-197.5 (m), 168.2 (s), 156.2 (s), 139.5 (s), 136.5 (s), 133.7 (s), 131.2 (s), 130.9 (s), 130.6 (s), 129.2 (s), 115.1 (s), 111.9 (s), 109.9 (s), 100.8 (s), 55.7 (d, J=2.3 Hz), 38.6 (m), 13.4 (s); HRMS (ESI): m/z calcd for C$_{19}$H$_{14}$D$_3$ClNO$_3$ [(M+H)$^+$]: 345.1085, found: 345.1089.

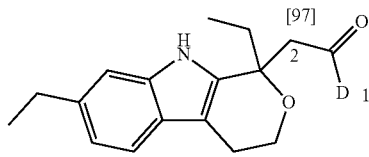 [SMILES: [2H]C(=O)CC1(CC)OCCc2c1[nH]c1cc(CC)ccc21]

2-(1,7-Diethyl-1,3,4,9-tetrahydropyrano[3,4-b]indol-1-yl)acetaldehyde-1,2-$d_1$,$d_2$ (12t)

2-(1,8-Diethyl-1,3,4,9-tetrahydropyrano[3,4-b]indol-1-yl)acetaldehyde 11t (0.1 mmol), 5q (20 mol %) and AcOK (0.2 mmol, 2 equiv) was dissolved in a mixture of D$_2$O (1 mL) and DCM (0.25 mL) in a reaction vessel (5 mL). Then the reaction mixture was vigorously stirred at 60° C. for 12 hours. 12t was obtained liquid in 52% yield with 99% D-incorporation at position 1 and 97% D-incorporation at position 2. $^1$H NMR (400 MHz, CDCl$_3$) δ 9.77 (s, 0.01H), 8.52 (s, 1H), 7.41 (d, J=7.7 Hz, 1H), 7.13 (t, J=7.5 Hz, 1H), 7.07 d, J=6.8 Hz, 1H), 4.11-4.02 (m, 2H), 3.03 (s, 0.06H) 2.91-2.83 (m, 4H), 2.16-2.08 (m, 1H), 2.01-1.94 (m, 1H), 1.40 (t, J=7.6 Hz, 3H), 0.91 (t, J=7.4 Hz, 3H); $^{13}$C NMR (100 MHz, CDCl$_3$) δ 202.5 (t, J=26.5 Hz), 135.3 (s), 134.7 (s), 126.8 (s), 126.3 (s), 120.7 (s), 119.9 (s), 116.1 (s), 108.9 (s), 74.9 (s), 60.7 (s), 51.0 (d, J=14.7 Hz), 31.2 (s), 24.1 (s), 22.4 (s), 13.9 (s), 7.8 (s); HRMS (ESI): m/z calcd for C$_{17}$H$_{18}$D$_3$NO$_2$ [(M+H)$^+$]: 275.1839, found: 275.1841.

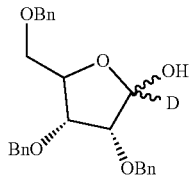

2,3,5-Tri-O-benzyl-α,β-D-ribofuranose-1-$d_1$ (12u)

2,3,5-tri-O-benzyl-α,β-D-ribofuranose 11u (0.1 mmol), 5af (20 mol %), AcOK (0.1 mmol, 2 equiv) and CD$_3$COOD (0.4 mmol, 4 equiv) was dissolved in a mixture of D$_2$O (1 mL) and toluene (0.25 mL) in a reaction vessel (5 mL). Then the reaction mixture was vigorously stirred at 80° C. for 12 hours. 12u (iso1:iso2=1.7:1) was obtained as a yellow oil in 55% yield with 95% D-incorporation. $^1$H NMR (400 MHz, CDCl$_3$) δ 7.36-7.21 (m, 15H), 5.34 (t, J=9.7 Hz, 0.05H), 4.73-4.39 (m, 6H), 4.38-4.34 (m, 1H), 4.33-4.28 (m, 1H), 4.22 (dd, J=6.7, 4.7 Hz, 1H), 4.18 (s, 1H), 4.00-3.95 (m, 2H), 3.85 (d, J=4.6 Hz, 1H), 3.66 (dd, J=10.3, 2.7 Hz, 1H), 3.51-3.43 (m, 2H), 3.36 (s, 1H). $^{13}$C NMR (150 MHz, CDCl$_3$): iso1: δ 137.9 (s), 137.5 (s), 137.5 (s), 128.5 (s), 128.5 (s), 128.5 (s), 128.4 (s), 128.0 (s), 128.0 (s), 128.0 (s), 127.9 (s), 127.9 (s), 127.9 (s), 127.8 (s), 127.7 (s), 127.6 (s), 96.0 (t, J=26.4 Hz), 81.0 (s), 77.7 (s), 77.7 (s), 73.5 (s), 72.8 (s), 72.5 (s), 70.0 (s); iso2: δ 137.8 (s), 137.7 (s), 137.3 (s), 128.5 (s), 128.5 (s), 128.5 (s), 128.4 (s), 128.0 (s), 128.0 (s), 128.0 (s), 127.9 (s), 127.9 (s), 127.9 (s), 127.8 (s), 127.7 (s), 127.6 (s), 100.0 (t, J=25.8 Hz), 80.9 (s), 80.7 (s), 77.2 (s), 72.5 (s), 72.3 (s), 69.4 (s); HRMS (ESI): m/z calcd for $C_{26}H_{27}DNaO_5$ [(M+Na)$^+$]: 444.1897, found: 444.1898.

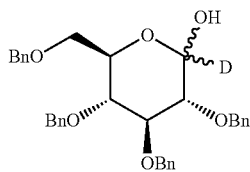

2,3,4,6-tetra-O-Benzyl-α,β-D-glucopyranose-1-$d_1$ (12v)

2,3,4,6-tetra-O-benzyl-α,β-D-glucopyranose 11v (0.1 mmol), 5af (40 mol %), AcOK (0.2 mmol, 2 equiv) and CD$_3$COOD (0.8 mmol, 8 equiv) was dissolved in a mixture of D$_2$O (1 mL) and toluene (0.25 mL) in a reaction vessel (5 mL). Then the reaction mixture was vigorously stirred at 120° C. for 12 hours. 12v was obtained as a white solid in 83% yield with 91% D-incorporation.

2,3,4,6-tetra-O-benzyl-α,β-D-glucopyranose-1-$d_1$ (91% D, 0.083 mmol), 5af (40 mol %) AcOK (0.17 mmol, 2 equiv) and CD$_3$COOD (0.67 mmol, 8 equiv) was dissolved in a mixture of D$_2$O (1 mL) and toluene (0.25 ml) in a reaction vessel (5 ml). Then the reaction mixture was vigorously stirred at 120° C. for 12 hours. 12v was obtained as a white solid in 77% yield (for two steps) with 99% D-incorporation. $^1$H NMR (400 MHz, CDCl$_3$) δ 7.35-7.11 (m, 20H), 5.22 (s, 0.01H), 4.97-4.40 (m, 9H), 4.07-3.96 (m, 2H), 3.71-3.50 (m, 4H), 3.43-3.21 (m, 2H); $^{13}$C NMR (150 MHz, CDCl$_3$) iso1: δ 138.5 (s), 138.4 (s), 138.0 (s), 137.70 (s), 128.5 (s), 128.4 (s), 128.4 (s), 128.4 (s), 128.1 (s), 128.0 (s), 128.0 (s), 127.9 (s), 127.9 (s), 127.9 (s), 127.7 (s), 127.7 (s), 127.7 (s), 127.6 (s), 97.1 (t, J=24.5 Hz), 84.6 (s), 83.0 (s), 77.8 (s), 75.7 (s), 75.0 (s), 74.70 (s), 74.60 (s), 73.5 (s), 73.2 (s), 68.9 (s); iso2: δ 138.8 (s), 138.2 (s), 137.9 (s), 137.8 (s), 128.5 (s), 128.4 (s), 128.4 (s), 128.4 (S), 128.1 (s), 128.0 (s), 128.0 (s), 127.9 (s), 127.9 (s), 127.8 (s), 127.7 (s), 127.7 (s), 127.7 (s), 127.6 (s), 91.9 (t, J=25.3 Hz), 81.7 (s), 79.9 (s), 77.7 (s), 75.7 (s), 75.0 (s), 73.5 (s), 73.2 (s), 70.2 (s), 68.6 (s); HRMS (ESI): m/z calcd for $C_{34}H_{35}DNaO_6$ [(M+Na)$^+$]: 564.2472, found: 564.2471.

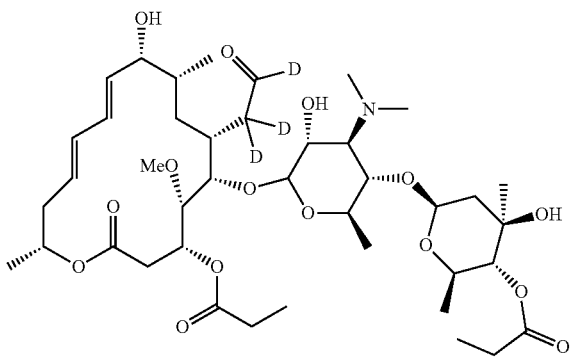 [SMILES: [2H]C(=O)C([2H])([2H])[C@H]1C[C@@H](C)[C@@H](O)/C=C/C=C/C[C@@H](C)OC(=O)C[C@@H](OC(=O)CC)[C@H](OC)[C@H]1OC1O[C@H](C)[C@@H](O[C@H]2C[C@@](C)(O)[C@H](OC(=O)CC)[C@@H](C)O2)[C@H](N(C)C)[C@H]1O]

Midecamycin-1,2-$d_1$,$d_2$ (12w)

Midecamycin (0.1 mmol), 5l (20 mol %) and AcOK (0.2 mmol, 2 equiv) was dissolved in a mixture of D$_2$O (1 mL) and DCM (0.25 mL) in a reaction vessel (5 mL). Then the reaction mixture was vigorously stirred at 60° C. for 12 hours. 12w was obtained as a white solid in 80% yield with 90% D-incorporation.

Midecamycin (90% D, 0.08 mmol), 5l (20 mol %) and AcOK (0.16 mmol, 2 equiv) was dissolved in a mixture of D$_2$O (1 mL) and DCM (0.25 mL) in a reaction vessel (5 mL). Then the reaction mixture was vigorously stirred at 60° C. for 12 hours. 12w was obtained as a white solid in 62% yield (for two steps) with 99% D-incorporation at position 1 and uncertain D-incorporation at position 2. $^1$H NMR (400 MHz, CDCl$_3$) δ 9.61 (s, 0.01H), 6.61 (dd, J=15.0, 10.7 Hz, 1H), 6.04 (dd, J=14.9, 10.6 Hz, 1H), 6.08-6.00 (m, 1H), 5.75 (t, J=13.0 Hz, 1H), 5.59 (dd, J=15.1, 9.4 Hz, 1H), 5.13-5.00 (m, 3H), 4.60 (d, J=10.0 Hz, 1H), 4.43 (d, J=7.1 Hz, 1H), 4.31 (s, 1H), 4.06 (dd, J=9.4, 3.8 Hz, 1H), 3.84 (d, J=9.2 Hz, 1H), 3.55-3.50 (m, 4H), 3.28-3.21 (m, 3H), 2.78-2.38 (m, 14-16H), 2.24 (d, J=13.0 Hz, 1H), 2.12 (dd, J=24.6, 11.5 Hz, 2H), 2.00 (d, J=14.3 Hz, 1H), 1.84 (dd, J=15.9, 12.0 Hz, 2H), 1.49-1.34 (m, 2H), 1.28-1.06 (m, 17H), 1.02-0.84 (m, 4H); $^{13}$C NMR (150 MHz, CDCl$_3$) δ 202.5-200.1 (m), 174.4 (s), 173.9 (s), 169.9 (s), 135.8 (s), 132.9 (s), 131.9 (s), 127.5 (s), 103.6 (s), 96.9 (s), 84.8 (s), 77.6 (s), 75.9 (s), 73.2 (s), 72.9 (s), 71.6 (s), 69.4 (s), 69.0 (s), 68.7 (s), 63.5 (s), 62.5 (s), 42.2 (s), 41.9 (s), 41.6 (s), 41.0 (s), 37.1 (s), 33.5 (s), 30.4 (s), 28.7 (s), 27.6 (s), 27.6 (s), 25.4 (s), 20.4 (s), 18.8 (s), 17.7 (s), 14.7 (s), 9.3 (s), 8.9 (s); HRMS (ESI): m/z calcd for $C_{41}H_{65}D_3NO_{15}$ [(M+H)$^+$]: 817.4777, found: 817.4795.

Example 4 Preparation of Catalysts 5ah and 5p

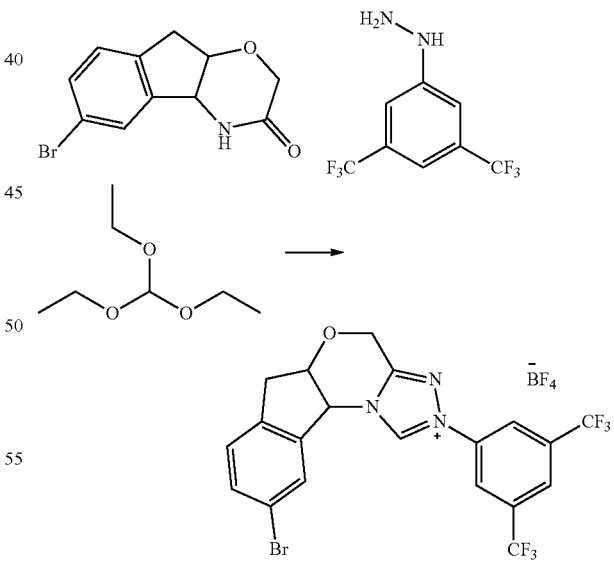

Following the modified procedure of reported literature, a flame-dried round bottom flask was charged with 6-bromo-4,4a,9,9a-tetrahydroindeno[2,1-b][1,4]oxazin-3(2H)-one (1.0 g, 3.73 mmol) and CH$_2$Cl$_2$ (18 mL). Trimethyloxonium tetrafluoroborate (549 mg, 3.73 mmol) was added, and the reaction mixture stirred for 12 hours at 23° C. 3,5-Bis(trifluoromethyl)phenylhydrazine (904 mg, 3.73 mmol) was then added and allowed to stir for 12 hours at ambient temperature. The solvent was evaporated and chlorobenzene (34 mL) was added, followed by triethyl orthoformate (1.55 ml, 9.26 mmol). The flask was equipped with a reflux condenser and heated to 110° C. and stirred at this temperature for 12 hours. At this time, additional triethylorthoformate (1.55 mL, 9.26 mmol) was added and stirring at 110° C. was continued for additional 12 hours. Upon cooling, concentrated in vacuo. The product was purified by flash column chromatography to get the title compound 5ah as a tan solid (55% yield). $^1$H NMR (400 MHz, CDCl$_3$) δ 13.30 (s, 1H), 8.85 (s, 2H), 8.21 (s, 1H), 7.92 (s, 1H), 7.35-7.29 (m, 1H), 7.08 (d, J=8.1 Hz, 1H), 6.56 (d, J=3.9 Hz, 1H), 5.10 (s, 2H), 5.02 (t, J=4.4 Hz, 1H), 3.27 (dd, J=17.3, 4.7 Hz, 1H), 3.11 (d, J=17.3 Hz, 1H); $^{13}$C NMR (100 MHz, CDCl$_3$) δ 150.1 (s), 144.6-142.7 (m), 139.1 (s), 137.2 (s), 136.3 (s), 133.7 (q, J=34.8 Hz), 130.2 (d, J=493.9 Hz), 126.8 (s), 124.0 (dd, J=7.9, 4.2 Hz), 123.6 (s), 121.4 (d, J=3.2 Hz), 121.2 (s), 120.9 (s), 77.7 (s), 62.2 (s), 60.4 (s), 37.2 (s); HRMS (EI): m/z calcd for C$_{20}$H$_{12}$BrF$_6$N$_3$O [(M−H)$^+$]: 503.0068, found: 503.0063.

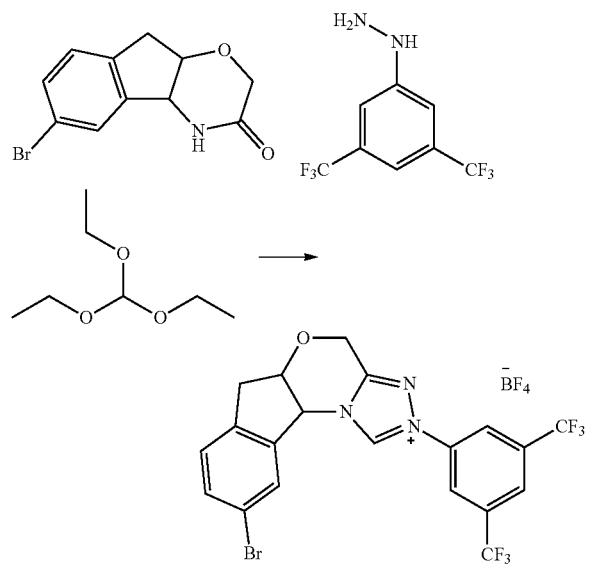

Following the modified procedure of reported literature, a flame-dried round bottom flask was charged with 6-nitro-4,4a,9,9a-tetrahydroindeno[2,1-b][1,4]oxazin-3(2H)-one (1.0 g, 4.27 mmol) and CH$_2$Cl$_2$ (21 mL). Trimethyloxonium tetrafluoroborate (769 mg, 4.27 mmol) was added, and the reaction mixture stirred for 12 hours at 23° C. 3,5-bis (trifluoromethyl)phenylhydrazine (1,042 mg, 4.27 mmol) was then added and allowed to stir for 12 hours at ambient temperature. The solvent was evaporated and chlorobenzene (41 mL) was added, followed by triethyl orthoformate (1.78 mL, 10.69 mmol). The flask was equipped with a reflux condenser and heated to 110° C. and stirred at this temperature for 12 hours. At this time, additional triethylorthoformate (1.78 mL, 10.69 mmol) was added and stirring at 110° C. was continued for 12 more hours. Upon cooling, concentrated in vacuo. The product was purified by flash column chromatography to get the title compound 5p as a tan solid (31% yield). $^1$H NMR (400 MHz, DMSO-d$_6$) δ 11.85 (s, 1H), 8.70 (s, 2H), 8.59 (d, J=9.9 Hz, 2H), 8.32 (dd, J=8.3, 1.8 Hz, 1H), 7.74 (d, J=8.4 Hz, 1H), 6.25 (d, J=3.9 Hz, 1H), 5.39 (d, J=16.5 Hz, 1H), 5.17 (d, J=16.5 Hz, 1H), 5.05 (t, J=4.3 Hz, 1H), 3.60 (dd, J=17.8, 4.6 Hz, 1H), 3.32 (d, J=17.9 Hz, 1H); $^{13}$C NMR (100 MHz, DMSO-d$_6$) δ 149.7 (s), 149.0 (s), 147.2 (s), 143.7 (s), 137.4 (s), 136.4 (s), 132.0 (d, J=34.2 Hz), 125.9 (d, J=171.6 Hz), 124.5 (m), 123.9 (s), 122.2 (m), 121.2 (s), 120.3 (s), 77.2 (s), 60.8 (s), 59.7 (s), 37.1 (s); HRMS (EI): m/z calcd for C$_{20}$H$_{12}$F$_6$N$_4$O$_3$ [(M−H)$^+$]: 470.0814, found: 470.0815.

Example 5 Preparation of Substrates

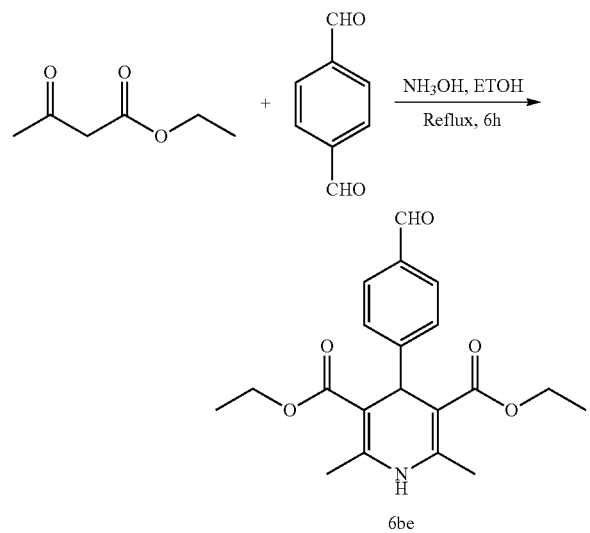

Following the modified procedure of reported literature, 1,4-phthalaldehyde (470 mg, 3.5 mmol), ethylacetoacetate (910 mg, 7 mmol), and ammonium hydroxide solution (364 μL, 2.6 mmol) in ethanol (2 mL) was stirred at reflux for 6 h. After completion of the reaction, as indicated by TLC, the reaction mixture was concentrated in vacuo. The crude product was purified by flash column chromatography (EtOAc/petroleum ether=1/4). The title compound 6be was obtained as a yellow solid (378 mg, 41%). $^1$H NMR (400 MHz, CDCl$_3$) δ 9.92 (s, 1H), 7.73 (d, J=8.2 Hz, 2H), 7.45 (d, J=8.2 Hz, 2H), 6.07 (s, 1H), 5.05 (s, 1H), 4.11-4.03 (m, 4H), 2.33 (s, 6H), 1.20 (t, J=7.1 Hz, 6H).

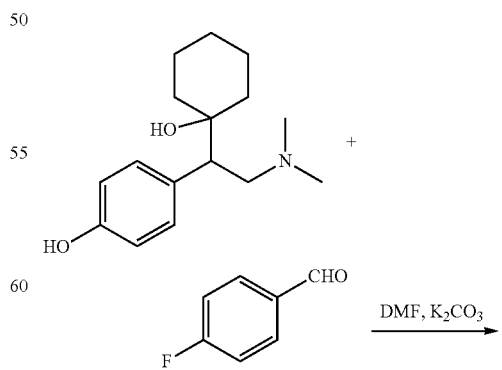

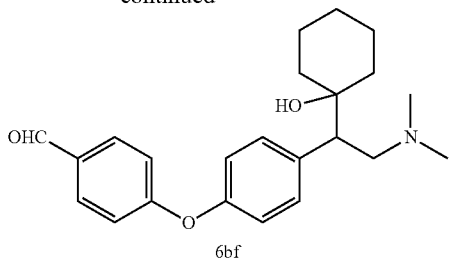

6bf

Following the modified procedure reported in literature, in a flask were introduced O-desmethylvenlafaxine (670 mg, 2.55 mmol), DMF (3 mL), potassium carbonate (690 mg, 5 mmol) and 4-fluorobenzaldehyde (310 mg, 2.5 mmol). The resulting mixture was stirred at 120° C. overnight. The reaction mixture was diluted with water (30 mL) and the product was extracted with EtOAc (3×30 mL). The combined organic layers were washed sequentially with 0.5 M aqueous NaOH solution (30 mL) and saturated aqueous NaHCO$_3$ solution (2×30 mL), and dried over anhydrous MgSO$_4$. The organic layer was filtered and concentrated under reduced pressure. The crude residue was purified by silica gel chromatography using MeOH/DCM (1/50-1/10) as eluent to give the product 6bf as a yellow oil (693 mg, 73%). $^1$H NMR (400 MHz, CDCl$_3$) δ 9.83 (s, 1H), 7.76 (d, J=8.2 Hz, 2H), 7.11 (d, J=8.5 Hz, 2H), 6.98 (d, J=8.5 Hz, 2H), 6.92 (d, J=8.3 Hz, 2H), 3.24 (t, J=12.5 Hz, 1H), 2.96 (dd, J=12.3, 3.1 Hz, 1H), 2.33-2.23 (m, 7H), 1.73-1.64 (m, 3H), 1.48 (t, J=15.9 Hz, 3H), 1.33-1.21 (m, 2H), 0.95-0.80 (m, 2H); $^{13}$C NMR (100 MHz, CDCl$_3$) δ 190.6 (s), 163.1 (s), 153.7 (s), 137.4 (s), 131.9 (s), 131.2 (s), 130.8 (s), 119.7 (s), 117.5 (s), 74.1 (s), 61.0 (s), 51.9 (s), 45.5 (s), 38.1 (s), 31.2 (s), 26.0 (s), 21.6 (s), 21.3 (s).

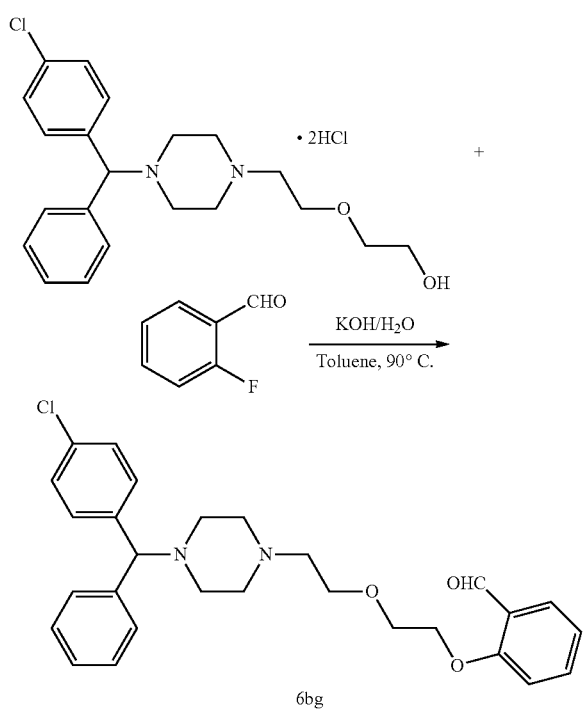

6bg

Following the modified procedure reported in literature, hydroxyzine hydrochloride (1.12 g, 2.5 mmol) was diluted with toluene (10 mL), then 2-fluorobenzaldehyde (340 mg, 2.75 mmol), tetrabutylammonium bromide (TBAB) (200 mg, 0.66 mmol) and a solution of potassium hydroxide (560 mg, 10 mmol) in water (570 μL) were added. The reaction mixture was vigorously stirred at 90° C. under nitrogen overnight. When the reaction was completed, the solution was concentrated in vacuo. The crude residue was purified by silica gel chromatography to give product 6bg (677 mg, 57% yield). $^1$H NMR (400 MHz, CDCl$_3$) δ 10.49 (d, J=0.5 Hz, 1H), 7.81 (dd, J=7.7, 1.8 Hz, 1H), 7.54-7.50 (m, 1H), 7.37-7.32 (m, 4H), 7.30-7.15 (m, 5H), 7.02 (t, J=7.5 Hz, 1H), 6.97 (d, J=8.4 Hz, 1H), 4.22 (dd, J=7.9, 2.8 Hz, 3H), 3.88-3.84 (m, 2H), 3.73 (t, J=5.5 Hz, 2H), 2.70-2.42 (m, 10H); $^{13}$C NMR (100 MHz, CDCl$_3$) δ 189.8 (s), 161.2 (s), 142.0 (s), 141.2 (s), 135.9 (s), 132.6 (s), 129.2 (s), 128.7 (s), 128.6 (s), 128.4 (s), 127.8 (s), 127.2 (s), 125.1 (s), 121.0 (s), 112.8 (s), 75.3 (s), 69.3 (s), 68.9 (s), 68.1 (s), 57.6 (s), 53.8 (s), 51.3 (s).

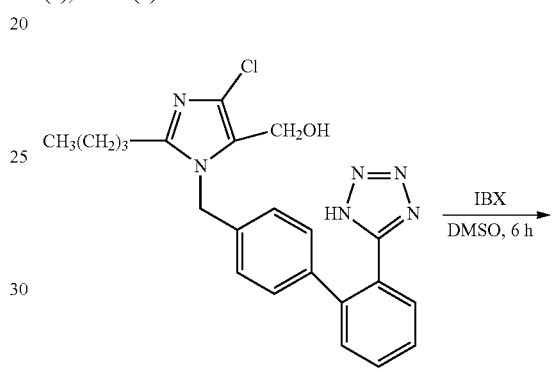

(2'-(2H-Tetrazol-5-yl)biphenyl-4-yl)methyl)-2-butyl-4-chloro-1H-imidazole-5-carbaldehyde (6bi): Losartan (1.7 g, 4 mmol) and IBX (2-iodoxybenzoic acid, 1.345 g, 4.8 mmol) were added in DMSO (20 mL) and stirred at room temperature for 6 h. CH$_2$Cl$_2$ (120 mL) was added and the solution was washed with water (3×120 mL), saturated NaHCO$_3$ solution (3×120 mL), and brine (1×120 mL). The solvent was removed after drying (Na$_2$SO$_4$) in vacuo to yield the product 6bi (888 mg, 53%). $^1$H NMR (400 MHz, CDCl$_3$) δ 9.63 (s, 1H), 7.90 (dd, J=7.7, 1.1 Hz, 1H), 7.62-7.54 (m, 1H), 7.54-7.46 (m, 1H), 7.39 (d, J=7.6 Hz, 1H), 7.08 (d, J=7.9 Hz, 2H), 6.95 (d, J=7.8 Hz, 2H), 5.49 (s, 2H), 2.79-2.48 (m, 2H), 1.67-1.65 (m, 2H), 1.41-1.21 (m, 2H), 0.85 (t, J=7.3 Hz, 3H).

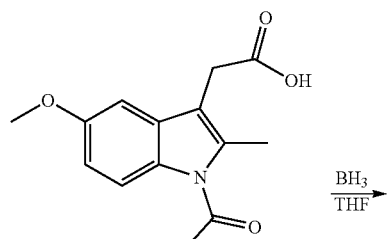

Indometacin

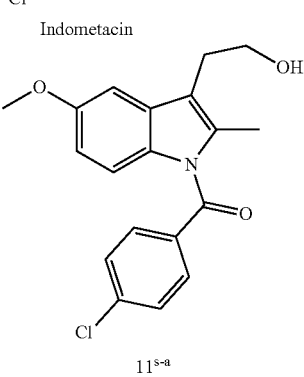

11s-a

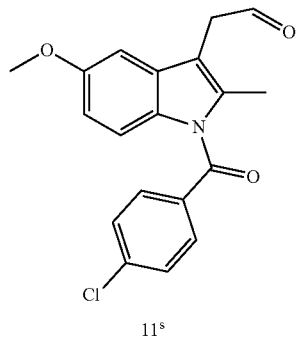

11s

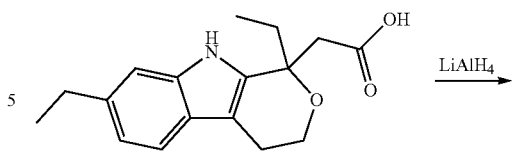

Etodolac

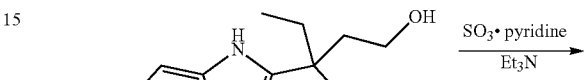

11t-a

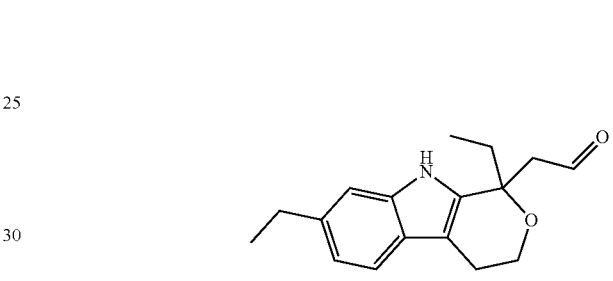

11t

Step 1: Following the modified procedure reported in literature, to a stirred solution of indometacin (1.0 g, 2.86 mmol) in THF (15 mL) was added a 1M solution of borane tetrahydrofuran complex (3 mL, 3.0 mmol) at 0° C. The mixture was allowed to warm up to room temperature and stirred for 18 h. The solvent was removed under reduced pressure and the residue was purified by silica gel column chromatography (DCM/MeOH=50/1) to give its-a (734 mg, 74%) as a yellow solid.

Step 2: Following the modified procedure reported in literature, to a stirred solution of its-a (734 mg, 2.15 mmol) in EtOAc (7.34 mL) was added IBX (1.5 g, 5.3 mmol) at room temperature and the resulting mixture was heated at 80° C. for 2 h. The mixture was filtered and filtrate was concentrated under reduced pressure to give 11s (490 mg, 66%) as a powder. $^1$H NMR (400 MHz, CDCl$_3$) δ 9.71 (t, J=2.1 Hz, 1H), 7.67 (d, J=8.4 Hz, 2H), 7.48 (d, J=8.4 Hz, 2H), 6.87-6.84 (m, 2H), 6.69 (dd, J=9.0, 2.4 Hz, 1H), 3.82 (s, 3H), 3.72 (d, J=2.0 Hz, 2H), 2.38 (s, 3H).

Step 1: Following the modified procedure reported in literature, to a stirred solution of Etodolac (2.0 g, 6.97 mmol) in dry THF (15.5 mL) under nitrogen was added a solution of LiAlH$_4$ (800 mg, 21 mmol) in dry THF (10.5 mL) dropwise and the resulting mixture was warmed to room temperature and stirred overnight. The reaction was slowly quenched with EtOAc (30 mL) and poured into water. The resulting emulsion was filtered and the filtrate was extracted with EtOAc. The combined organic layers were washed with brine and dried over anhydrous MgSO$_4$. The organic layer was filtered and concentrated under reduced pressure. The crude residue was purified by silica gel chromatography to give 11t-a (1.14 g, 59%) as a yellow oil.

Step 2: Following the modified procedure reported in literature, to a stirred solution of 11t-a (1.14 g, 4.17 mmol) in CH$_3$CN (5.38 mL), DMSO (5.38 mL) and Et$_3$N (5.38 mL) was added pyridine sulfur trioxide (3.96 g, 24.8 mmol) and the resulting mixture was stirred at room temperature for 40 min. The mixture was poured into water and extracted with EtOAc. The combined organic layers were washed sequentially with 3% aquenes HCl solution, saturated aqueous NaHCO$_3$ solution and brine, and dried over anhydrous MgSO$_4$. The organic layer was filtered and concentrated under reduced pressure. The crude residue was purified by silica gel chromatography to give product 11t (720 mg, 63%). $^1$H NMR (400 MHz, CDCl$_3$) δ 9.76 (t, J=1.6 Hz, 1H), 8.41 (s, 1H), 7.37 (d, J=7.7 Hz, 1H), 7.09 (t, J=7.5 Hz, 1H), 7.03 (dd, J=6.7, 0.5 Hz, 1H), 4.08-3.97 (m, 2H), 3.06 (d, J=1.6 Hz, 2H), 2.91-2.78 (m, 4H), 2.16-2.08 (m, 1H), 1.96 (dd, J=14.5, 7.3 Hz, 1H), 1.37 (t, J=7.6 Hz, 3H), 0.87 (t, J=7.4 Hz, 3H).

Example 6. Recovery of Hydrogen from Deuterium at α-Position of Aldehyde (FIG. 4C)

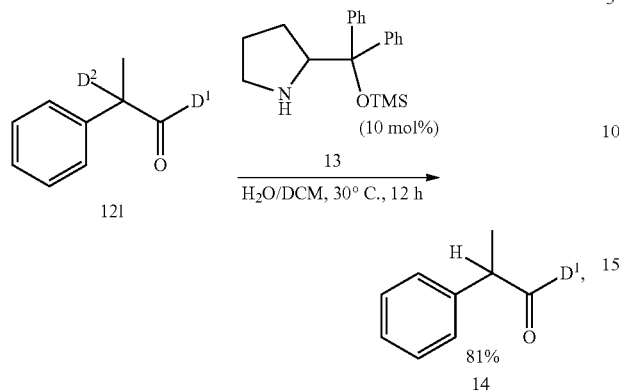

Compound 12l (0.5 mmol, 68 mg, $D^1$=98%; $D^2$=97%) and organocatalyst 13 (16.3 mg, 10 mol %) was dissolved in a mixture $H_2O$ (1 mL) and DCM (0.25 ml). Then the reaction was vigorously stirred at 30° C. for 12 hours. After purification, compound 14 was obtained as a colorless oil in 81% yield with 98% D-incorporation. $^1H$ NMR (400 MHz, $CDCl_3$) δ 9.69 (d, J=1.4 Hz, 0.02H), 7.41-7.37 (m, 2H), 7.35-7.28 (m, 1H), 7.24-7.21 (m, 2H), 3.64 (q, J=7.1 Hz, 1H), 1.45 (d, J=7.1 Hz, 3H); $^{13}C$ NMR (150 MHz, $CDCl_3$) δ 200.8 (t, J=26.6 Hz), 137.7 (s), 129.1 (s), 128.3 (s), 127.5 (s), 52.8 (t, J=4.1 Hz), 14.6 (s).

Figure 3B:
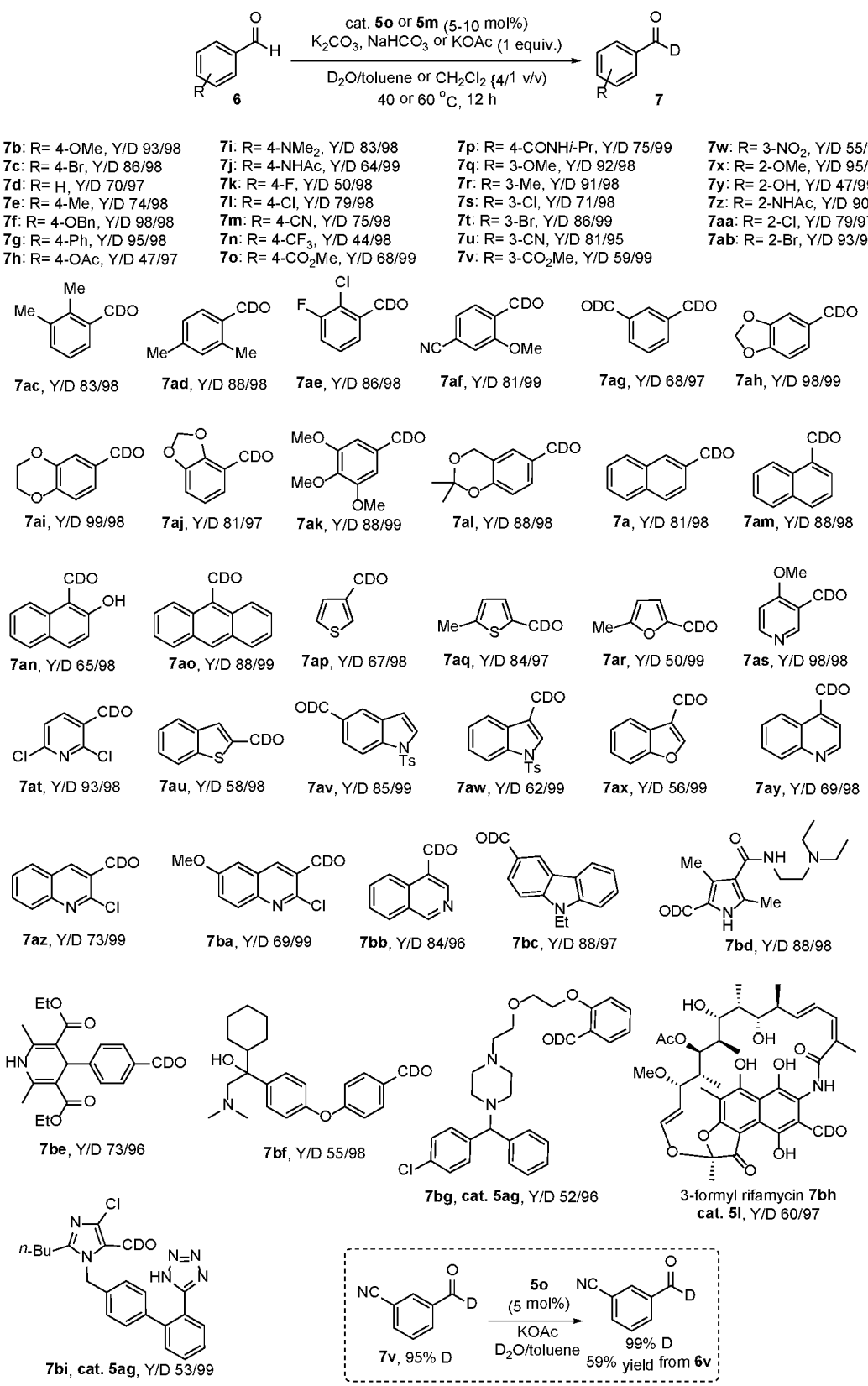
Figure 5A:
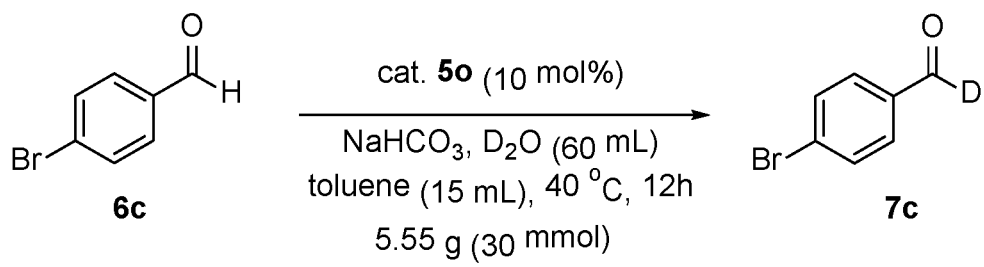
FIG. 5A representative results of gram scale synthesis carried out using the same conditions employed for small scale, similar yields and levels of deuteration incorporation level are obtained. Moreover, $D_2O$ can be recycled and reused for subsequent HDE reactions without loss of the efficiency.

Example 7. Gram Scale Synthesis, Recycling and Reuse of $D_2O$ and Synthetic Applications A gram-scale HDE reaction was conducted using aldehyde 6c and the same reaction conditions employed in the small-scale process (FIG. 3B). In contrast to the small-scale process, the gram-scale counterpart formed 7c in a similar yield and with a comparable level of D-incorporation (FIG. 5A). Furthermore, the recovered $D_2O$ containing solvent can be used in a second and third reaction without causing a decrease in yield and D-incorporation level.

Figure 5B:
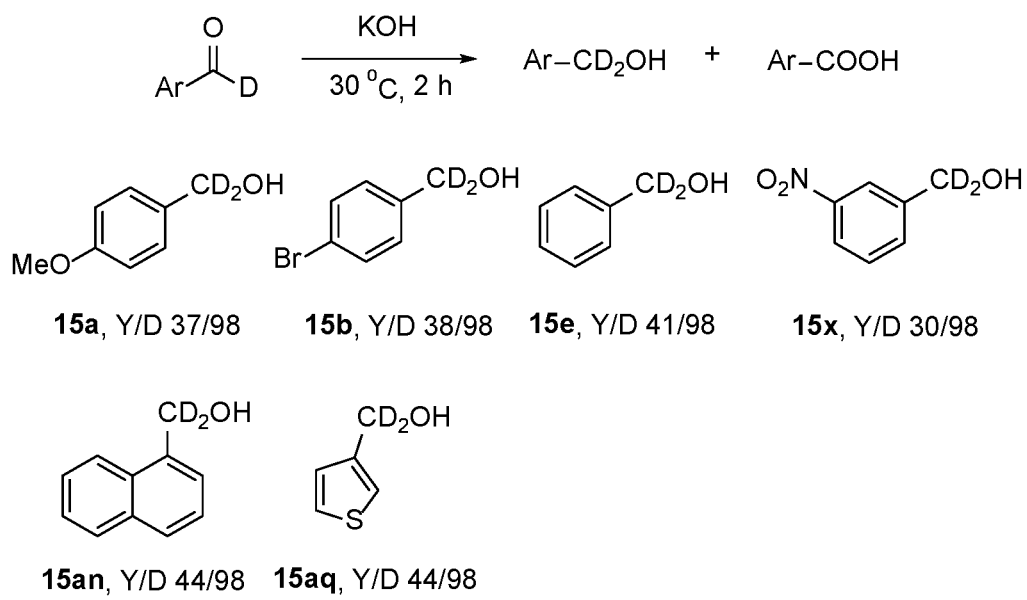
FIG. 5B shows representative results of Cannizzaro reaction for the synthesis of α, α-dideuterated benzylic alcohols.
Figure 5C:
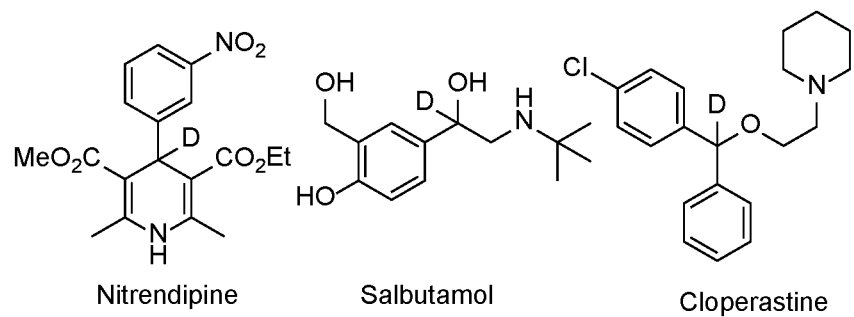
FIG. 5C shows representative deuterated therapeutics prepared from the corresponding deuterated aromatic aldehydes. The benzylic positions in the therapeutics are easily metabolized sites.
Figure 5C:
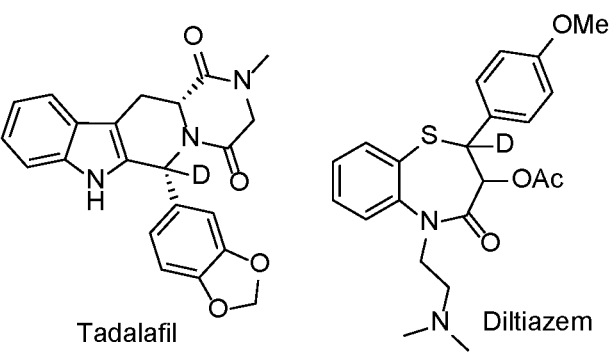

As stated above, aldehydes are versatile starting materials and intermediates in organic synthesis. Further experiments demonstrated that 1-D-aldehydes formed in the present HDE process may be utilized in transformations that produce the deuterated analogs of important substances including aryl methanols and pharmaceuticals (FIG. 5B). For example, Cannizzaro reactions of 1-D-aldehydes conducted in concentrated KOH were found to produce the corresponding dideuterated benzyl alcohols in high yields. Furthermore, several deuterated analogs of clinically important drugs were synthesized using appropriate deuterated aldehydes as starting materials (FIG. 5C).

A. Gram-Scale Synthesis of Deuterated Aldehyde and Recycling and Subsequent Use of Recoved D2O (FIG. 5A)

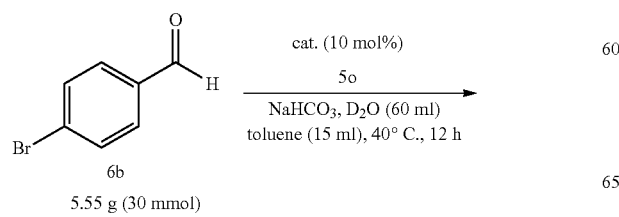

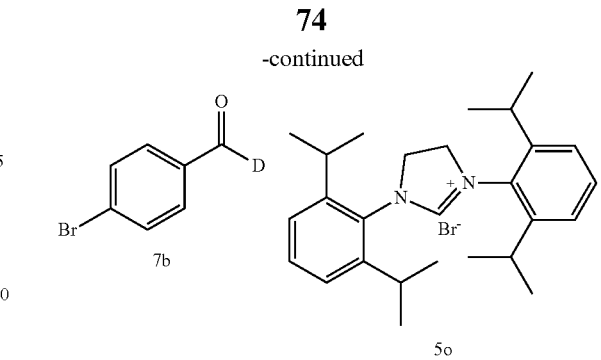

Cycle 1: A mixture of 4-Bromobenzaldehyde 6b (30 mmol, 5.55 g), 5o (10 mol %, 1.41 g) and $NaHCO_3$ (30 mmol, 2.52 g) in $D_2O$ (60 mL) and toluene (15 mL) was vigorously stirred at 40° C. for 12 hours. After cooling to room temperature, the reaction mixture was extracted with DCM for three time. The organic layers were combined and dried over anhydrous sodium sulfate, concentrated in vacuo, and purified by column chromatography. Deuterated aldehyde 7b was obtained as a yellow solid in 86% yield with 98% D-incorporation.

Cycle 2: 4-Bromobenzaldehyde 6b (30 mmol, 5.55 g) and 5o (10 mol %, 1.41 g) were added to $D_2O$ (separated from Cycle 1) and toluene (15 mL). The reaction was vigorously stirred at 40° C. for 12 hours. After cooling to room temperature, the reaction was extracted with DCM for three time. The organic layers were combined and dried over anhydrous sodium sulfate, concentrated in vacuo, and purified by column chromatography. Deuterated aldehyde 7b was obtained as a yellow solid in 90% yield with 98% D-incorporation.

Cycle 3: The same operation was carried out as Cycle 2. Deuterated aldehyde 7b was obtained as a yellow solid in 91% yield with 95% D-incorporation.

B. Preparation of Deuterated Benzyl Alcohols Through Cannizzaro Reaction (FIG. 5B)

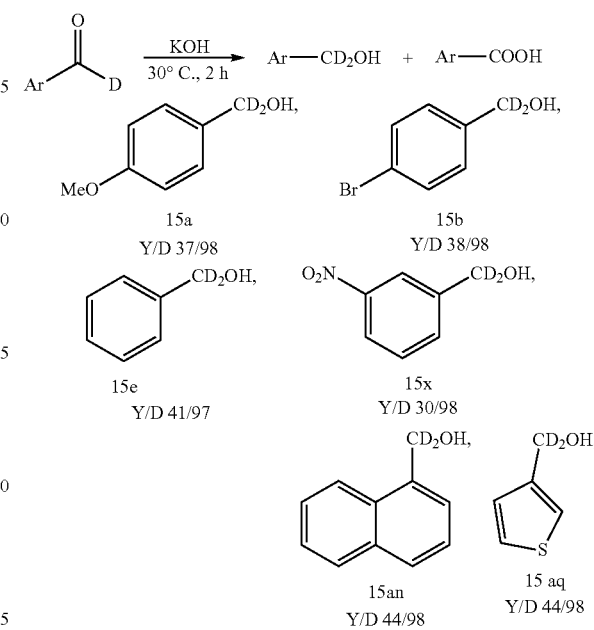

General procedure: According to the literature method, the aromatic aldehyde (1.0 mmol) was added to a saturated solution of potassium hydroxide (4.0 mmol), and the mixture was stirred at room temperature for 1-2 hours. The thick slurry was diluted with water (10 mL), and the resulting mixture was extracted with $CH_2Cl_2$ (20 mL). The extracts were washed with water and dried over $MgSO_4$, and the solvent was removed under reduced pressure to obtain the crude benzyl alcohol product. The crude products were purified by chromatography to obtain the pure product.

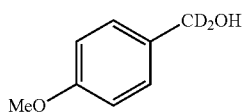

4-Methoxybenzenemethan-$d_2$-ol (15a): $^1H$ NMR (400 MHz, $CDCl_3$) δ 7.25 (dt, J=8.8, 2.8 Hz, 2H), 6.87 (dt, J=8.8, 2.8 Hz, 2H), 4.54 (s, 0.03H), 3.78 (s, 3H), 2.19 (s, 1H); $^{13}C$ NMR (100 MHz, $CDCl_3$) δ 159.2 (s), 133.1 (s), 128.7 (s), 113.9 (s), 64.2 (quint, J=21.7 Hz), 55.3 (s).

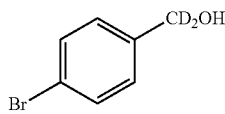

4-Bromobenzenemethan-$d_2$-ol (15b): $^1H$ NMR (400 MHz, $CDCl_3$) δ 7.45 (d, J=8.3 Hz, 2H), 7.19 (d, J=8.4 Hz, 2H), 4.56 (s, 0.04H), 2.44 (s, 1H); $^{13}C$ NMR (100 MHz, $CDCl_3$) δ 139.6 (s), 131.6 (s), 128.7 (s), 121.5 (s), 63.8 (quint, J=21.8 Hz).

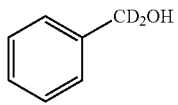

Benzenemethan-$d_2$-ol (15e): $^1H$ NMR (400 MHz, $CDCl_3$) δ 7.41-7.27 (m, 5H), 4.64-4.62 (m, 0.03H), 2.27 (s, 1H); $^{13}C$ NMR (100 MHz, $CDCl_3$) δ 140.8 (s), 128.6 (s), 127.7 (s), 127.1 (s), 64.6 (quint, J=21.8 Hz).

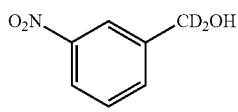

3-Nitrobenzenemethan-$d_2$-ol (15X): $^1H$ NMR (400 MHz, $CDCl_3$) δ 8.20 (s, 1H), 8.10 (d, J=8.2 Hz, 1H), 7.67 (d, J=7.6 Hz, 1H), 7.50 (t, J=7.9 Hz, 1H), 4.77 (s, 0.03H), 2.56 (s, 1H); $^{13}C$ NMR (100 MHz, $CDCl_3$) δ 148.3 (s), 142.8 (s), 132.8 (s), 129.5 (s), 122.5 (s), 121.5 (s), 63.7-62.7 (m).

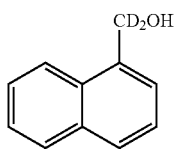

1-Naphthalenemethan-α,α-$d_2$-ol (15an): $^1H$ NMR (400 MHz, $CDCl_3$) δ 8.10-8.06 (m, 1H), 7.89 (dd, J=5.9, 3.6 Hz, 1H), 7.82 (d, J=7.8 Hz, 1H), 7.57-7.50 (m, 2H), 7.49-7.41 (m, 2H), 5.03 (s, 0.04H), 2.41 (s, 1H); $^{13}C$ NMR (100 MHz, $CDCl_3$) δ 136.2 (s), 133.8 (s), 131.8 (s), 128.7 (s), 128.6 (s), 126.4 (s), 125.9 (s), 125.5 (s), 125.4 (s), 123.7 (s), 62.8 (quint, J=21.9 Hz).

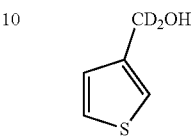

1-Thiophenemethan-$d_2$-ol (15aq): $^1H$ NMR (400 MHz, $CDCl_3$) δ 7.31 (dd, J=5.0, 3.0 Hz, 1H), 7.22 (dd, J=2.9, 1.2 Hz, 1H), 7.09 (dd, J=5.0, 1.2 Hz, 1H), 4.65 (s, 0.03H), 2.03 (s, 1H); $^{13}C$ NMR (100 MHz, $CDCl_3$) δ 142.1 (s), 126.8 (s), 126.3 (s), 122.1 (s), 60.5-59.5 (m).

C. Preparation of Deuterated Pharmaceutical Compounds (FIG. 5C)

Procedure for the Synthesis of Nitrendipine

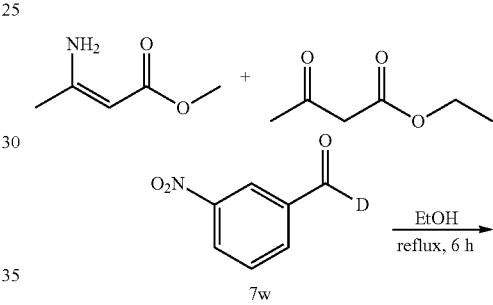

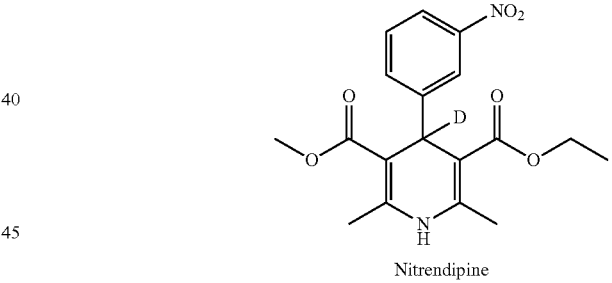

Nitrendipine

According to literature method, a solution of the deuterated 3-nitrobenzaldehyde 7w (76 mg, 0.5 mmol, 99% D), 3-amino-2-butanoate (0.5 mmol) and ethyl acetoacetate (0.5 mmol) in EtOH (1 mL) was stirred at reflux for 6 hours. After completion of the reaction, as indicated by TLC, the reaction mixture was cooled to room temperature and concentrated in vacuo. The crude product was purified by flash column chromatography (EtOAc/petroleum ether=1:4). The title compound was obtained as a yellow solid (144 mg, 78%), D-incorporation: 99%. $^1H$ NMR (400 MHz, $CDCl_3$) δ 8.10 (t, J=1.9 Hz, 1H), 8.01-7.97 (m, 1H), 7.65-7.60 (m, 1H), 7.36 (t, J=7.9 Hz, 1H), 6.10 (s, 1H), 5.08 (s, 0.01H), 4.12-4.04 (m, 2H), 3.63 (s, 3H), 2.35 (d, J=2.3 Hz, 6H), 1.22 (t, J=7.1 Hz, 3H); $^{13}C$ NMR (100 MHz, $CDCl_3$) δ 167.7 (s), 167.2 (s), 149.8 (s), 148.2 (s), 145.2 (s), 145.0 (s), 134.4 (s), 128.7 (s), 122.9 (s), 121.4 (s), 103.2 (s), 102.9 (s), 60.1 (s), 51.2 (s), 39.5 (t, J 19.2 Hz), 19.6 (s), 19.5 (s), 14.3 (s); HRMS (ESI): m/z calcd for $C_{18}H_{20}DN_2O_6[(M+H)^+]$: 362.1462, found: 362.1461.

Procedure for the Synthesis of Salbutamol

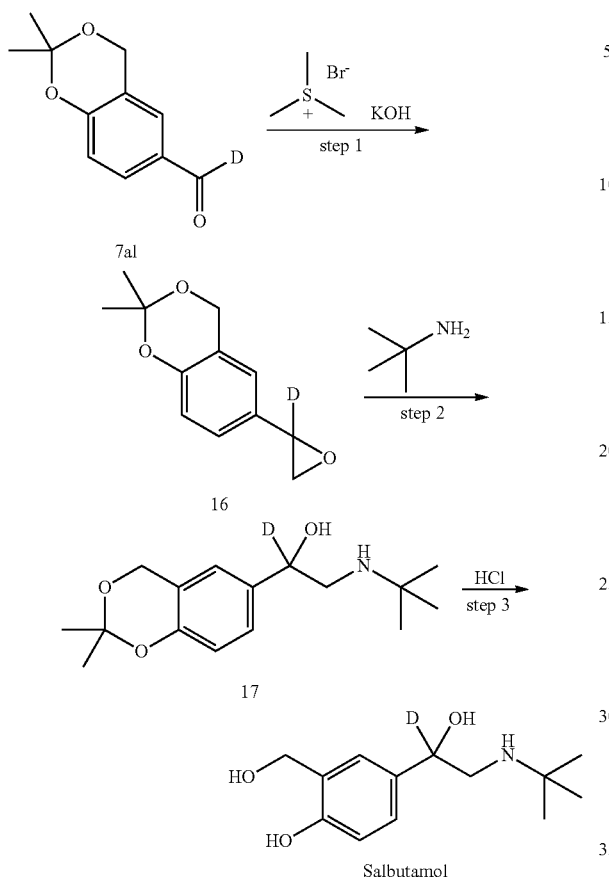

Procedure for the Synthesis of Cloperastine

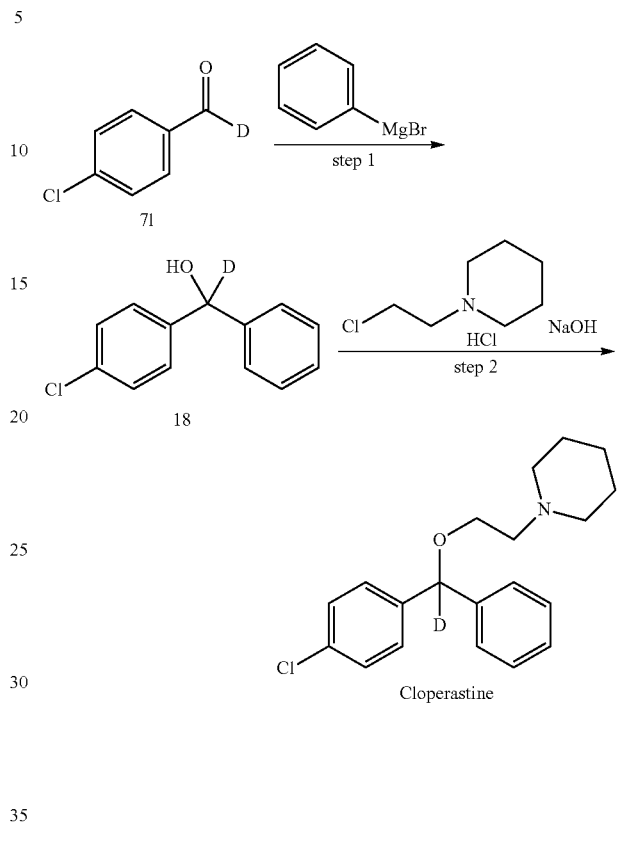

Step 1: According to the literature method, a solution of trimethylsulfonium bromide (518 mg, 1.1 equiv) and KOH powder (219 mg, 1.3 equiv) in CH$_3$CN (3 mL) was stirred at 50° C. for 10 min. Then aldehyde 7al (579 mg, 3 mmol, 98% D) were added and stirred at 60° C. for another three hours. The reaction mixture then was cooled to room temperature, filtered and concentrated in vacuo. The crude product 16 was used without purification in the next step.

Step 2: According to the literature method, compound 16 (400 mg) was dissolved in tert-butylamine (2 mL) and stirred at 110° C. for 15 hours. The reaction mixture was cooled to room temperature, concentrated in vacuo and added solvent (EtOAc/petroleum ether=1/2). Then the reaction was refluxed until became clear, cooled to 30° C. for 1 h, then cooled to 4° C. overnight, filtered and dried, 17 was obtained in 75% yield for two steps.

Step 3: According to the literature method, compound 17 (60 mg) in 50% EtOH (0.8 mL) was added concentrated hydrochloric acid until the pH was adjusted to 5. The reaction mixture was stirred at 25° C. for 50 hours. NaOH (10%) was added until pH value was about 9-10. The reaction mixture was concentrated in vacuo, and the product was separated by preparative TLC. Salbutamol was obtained in 95% yield with 98% D-incorporation.) $^1$H NMR (400 MHz, DMSO-d$_6$) δ 7.32 (d, J=2.2 Hz, 1H), 7.06 (dd, J=8.2, 2.2 Hz, 1H), 6.79 (d, J=8.2 Hz, 1H), 4.46 (s, 2H), 4.28 (s, 0.02H), 2.84 (dd, J=26.4, 12.2 Hz, 2H), 1.27 (s, 9H); $^{13}$C NMR (100 MHz, DMSO-d$_6$) δ 153.7 (s), 131.9 (s), 128.3 (s), 125.0 (s), 124.9 (s), 114.2 (s), 68.5 (m), 58.1 (s), 55.5 (s), 48.6 (s), 25.3 (s); HRMS (ESI): m/z calcd for C$_{13}$H$_{20}$DNO$_3$ [(M+H)$^+$]: 241.1662, found: 241.1663.

Procedure for the Synthesis of Cloperastine

Step 1: According to the literature method, a solution of deuterated 4-chlorobenzaldehyde 7l (140 mg, 1 mmol, 98% D) in dry THF (4 mL) was added dropwise phenyl magnesium bromide solution (1 M, 1.3 mL, 1.3 equiv) at 0° C. After the addition was complete, the mixture was allowed to stir at room temperature for 4 hours. The reaction was quenched with 1 M HCl and extracted with EtOAc. The organic layer was washed with water followed by brine. The organic layer was dried with MgSO$_4$ and concentrated. The product was purified by flash chromatography with EtOAc/petroleum ether=1:4, and 18 was obtained in 95% yield.

Step 2: According to the literature method, to a solution of 18 (0.4 mmol) in CH$_2$Cl$_2$ (4 mL) was added 1-(2-chloroethyl) piperidine hydrochloride (120 mg, 0.6 mmol). The resulting solution was cooled at 0° C. followed by the addition of NaOH (48 mg, 1.2 mmol). After the mixture had been stirred for 20 min at 0° C. and then overnight at room temperature, it was quenched with H$_2$O and extracted with CH$_2$Cl$_2$. The organic layer was washed with brine, dried over anhydrous Na$_2$SO$_4$, and concentrated under reduced pressure. The residue was purified by silica gel chromatography to get cloperastine (98 mg, 75% yield, 98% D-incorporation). $^1$H NMR (400 MHz, CDCl$_3$) δ 7.27-7.16 (m, 9H), 5.29 (s, 0.02H), 3.60 (t, J=5.9 Hz, 2H), 2.69 (t, J=5.9 Hz, 2H), 2.53 (s, 4H), 1.63-1.57 (m, 4H), 1.39 (d, J=4.8 Hz, 2H); $^{13}$C NMR (100 MHz, CDCl$_3$) δ 141.4 (s), 140.6 (s), 132.7 (s), 128.1 (s), 128.1 (s), 128.0 (s), 127.3 (s), 126.6 (s), 82.9-82.7 (m), 66.7 (s), 58.2 (s), 54.7 (s), 25.6 (s), 23.9 (s); HRMS (ESI): m/z calcd for C$_{20}$H$_{24}$DClNO [(M+H)$^+$]: 331.1687, Found: 331.1690.

Procedure for the Synthesis of Tadalafil

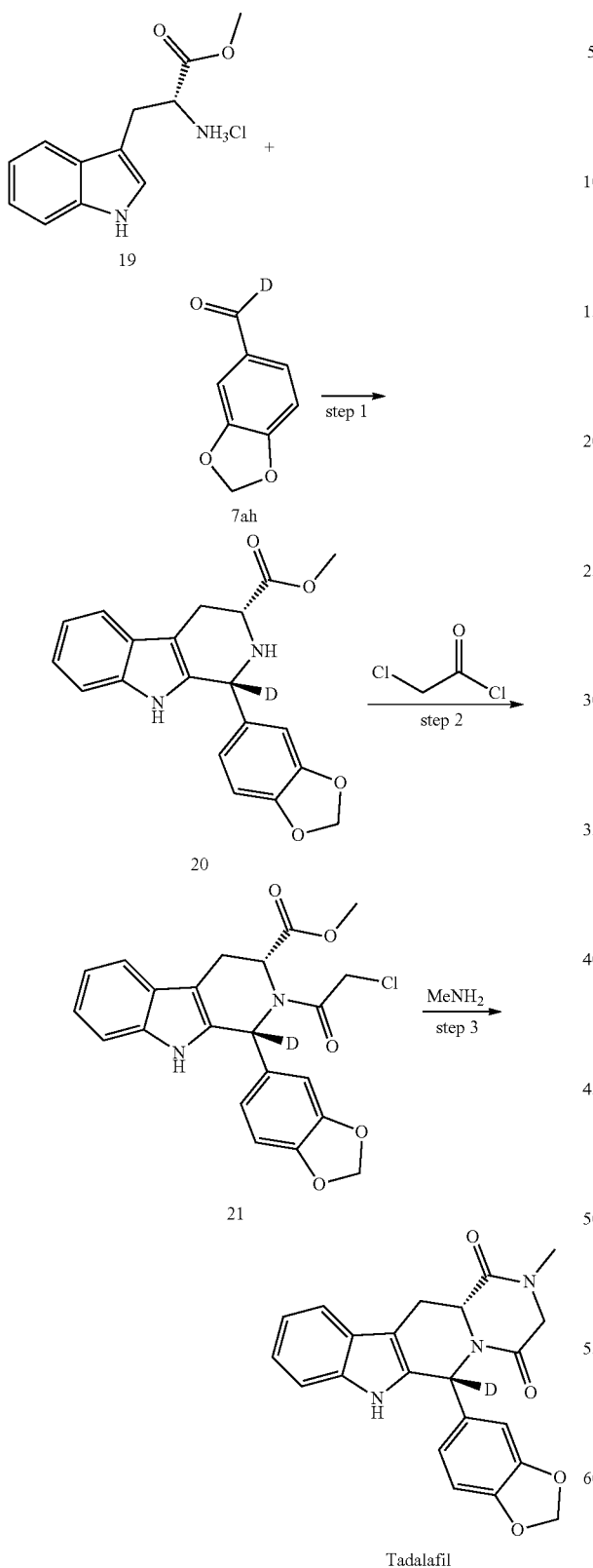

Tadalafil

Step 1: According to the literature method, D-tryptophan methyl ester hydrochloride 19 (400 mg, 1.57 mmol) was suspended in CH$_3$CN (4 mL) and added deuterated piperonal 7ah (284 mg, 1.87 mmol, 98% D) at room temperature. The mixture was stirred at 80° C. for 15 hours. The reaction mixture then was cooled to ambient temperature, filtered, and the solid washed with cold CH$_3$CN. The product was dried under vacuum at less than 60° C. to obtain compound 20 (308 mg, 80% yield).

Step 2: According to the literature method, compound 20 (270 mg, 0.7 mmol) were suspended in DCM (2.5 mL). The mixture was cooled to 0-5° C., and triethylamine (194 mg, 1.82 mmol) were added. Subsequently, chloroacetyl chloride (108 mg, 0.95 mmol) in DCM (0.42 mL) were added dropwise, keeping the temperature under 10° C. Then the reaction was stirred at 0-10° C. for 10 min. After completion of the reaction as monitored by TLC, water (0.4 mL) were added to quench the reaction. The mixture was stirred for 2 min and organic layer was separated, concentrated in vacuo. The resulting solid was washed with methanol to give the title compound 21 as a pale yellow solid (341 mg, 80% yield).

Step 3: According to the literature method, a solution of 21 (214 mg, 0.5 mmol) and 25-30% CH$_3$NH$_2$ (a solution in water, 155.3 mg, 1.25 mmol, 2.5 equiv) in EtOH (1.5 mL) was heated to reflux for 45 min. The reaction mixture was cooled to room temperature, filtered, and the resulting solid was washed with water and methanol and dried to give deuterated tadalafil as a pale white solid (284 mg, 73% yield, 98% D-incorporation). $^1$H NMR (400 MHz, DMSO-d$_6$) δ 11.05 (s, 1H), 7.55 (d, J=7.7 Hz, 1H), 7.31 (d, J=8.0 Hz, 1H), 7.06 (t, J=7.0 Hz, 1H), 7.00 (t, J=7.1 Hz, 1H), 6.88 (s, 1H), 6.79 (s, 2H), 6.14 (s, 0.02H), 5.93 (s, 2H), 4.40 (dd, J=11.5, 4.1 Hz, 1H), 4.22-4.10 (m, 1H), 3.95 (d, J=17.2 Hz, 1H), 3.53 (dd, J=15.8, 4.5 Hz, 1H), 3.08-2.82 (m, 4H); $^{13}$C NMR (100 MHz, DMSO-d$_6$) δ 166.9 (s), 166.6 (s), 147.0 (s), 146.1 (s), 136.9 (s), 136.2 (s), 133.9 (s), 125.7 (s), 121.2 (s), 119.3 (s), 118.8 (s), 118.1 (s), 111.3 (s), 108.1 (s), 106.9 (s), 104.7 (s), 100.9 (s), 55.5 (s), 54.96 (m), 51.4 (s), 32.8 (s), 23.1 (s). HRMS (ESI): m/z caled for C$_{22}$H$_{19}$DN$_3$O$_4$ [(M+H)$^+$]: 391.1517, found: 391.1521.

Procedure for the Synthesis of Diltiazem Hydrochloride

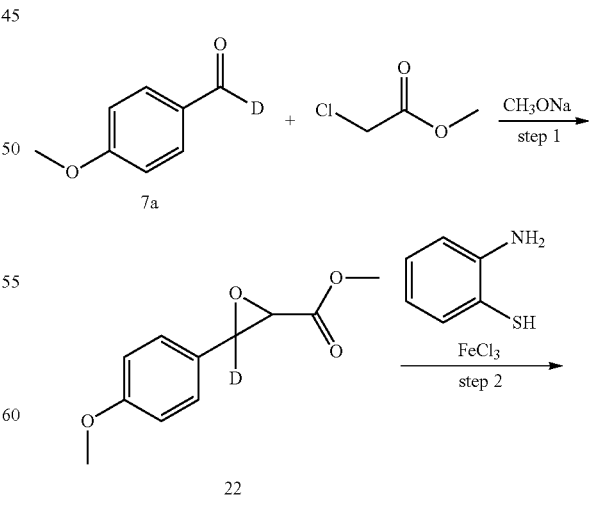

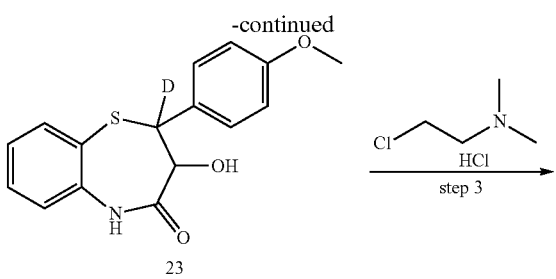

23

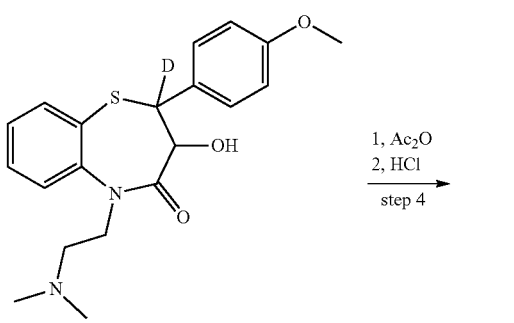

24

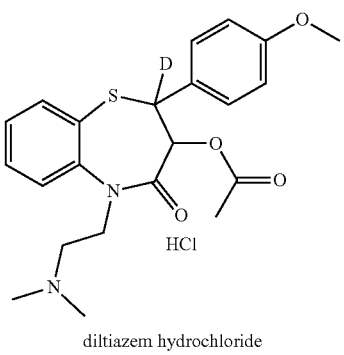

diltiazem hydrochloride

Step 1: According to the literature method, sodium (126 mg, 5.48 mmol) was dissolved in methanol (1.32 mL), then p-anisaldehyde 7a (450 mg, 3.31 mol, 98% D) and methyl chloroacetate (534 mg, 4.92 mmol) was added over 4.5 hours at 0° C. and stirring was continued for further 4 hours. The reaction mixture was poured into a solution of AcOH (60 mg) in water (7.5 mL) over 20 min at 0° C. The reaction was stirred for 1 h, then the crystals were collected by filtration and washed with cold water and cold MeOH to give a crude product, which was recrystallized from hot MeOH to give 22 (922 mg, 67% yield).

Step 2: According to the literature method, a solution of 22 (520 mg, 2.5 mmol) and 28% aqueous $FeCl_3 \cdot 6H_2O$ (1 drop) in chlorobenzene (2.64 mL) was heated to 80-85° C. 2-Aminothiophenol (328.6 mg, 2.62 mmol) was added over 30 min, and the resulting mixture was stirred at 115° C. for 45 min. $H_2O$ (1 drop) in MeOH (90 μL) were added and stirred at reflux for 30 min. Methanesulfonic acid (9.6 mg, 0.1 mmol) was then added and the reflux was maintained for an additional 18 hours. After cooling to room temperature, the solvent was concentrated under reduced pressure to give the crude benzothiazepinone 23 as a yellow powder. The residue was purified by column chromatography (cyclohexane:EtOAc=8:2, v/v) to afford 20 mg white powder (yield: 69%).

Step 3: According to the literature method, to a solution of benzothiazepinone 23 (414 mg, 1.41 mmol) in EtOAc (3.5 mL) was added 2-(dimethylamino) ethyl chloride hydrochloride (224 mg, 1.56 mmol). Under vigorous stirring were then added potassium carbonate (419 mg, 3.03 mmol) and $H_2O$ (64 mg). The resulting mixture was heated at reflux for 12 h. After cooling, the mixture was filtered to remove salts, and the filtrate was concentrated under reduced pressure to give the crude benzothiazepinone 24. The residue was purified by column chromatography ($CH_2Cl_2$:MeOH=98:2) to afford 366 mg of yellow oil (yield: 70%).

Step 4: According to the literature method, a solution of 24 (0.317 mmol), $Ac_2O$ (1 mmol), $Et_3N$ (2 mmol) and DMAP (0.03 mmol) in $CH_2Cl_2$ (5 mL) was heated at reflux under $N_2$ for 5 hours. The solution was poured into a mixture of ice and brine. The organic layer was separated and the aqueous layer was extracted with $CH_2Cl_2$ (10 mL). The combined organic layers were washed with 5% $NH_4OH$ (5 mL) solution, dried over $Na_2SO_4$ and evaporated. The residue was dissolved in MeOH (2 mL) and treated with a HCl solution in dioxane till pH was around 2. Ether (3 mL) was added to the resulting solution. The precipitate was collected by filtration and washed with 10% MeOH-ether to afford diltiazem hydrochloride (128 mg, 90% yield, 98% D). $^1H$ NMR (400 MHz, $CD_3OD$) δ 7.82-7.79 (m, 1H), 7.65 (dd, J=5.5, 1.9 Hz, 2H), 7.46-7.39 (m, 3H), 6.91 (d, J=8.8 Hz, 2H), 5.12 (s, 0.01H), 5.09 (s, 1H), 4.53-4.44 (m, 1H), 4.27-4.18 (m, 1H), 3.81 (s, 3H), 3.69-3.61 (m, 1H), 3.43-3.31 (m, 1H), 2.98 (d, J=24.6 Hz, 6H), 1.87 (s, 3H); $^{13}C$ NMR (100 MHz, $CD_3OD$) δ 170.1 (s), 169.1 (s), 160.1 (s), 144.4 (s), 135.5 (s), 131.5 (s), 130.6 (s), 129.2 (s), 128.4 (s), 128.2 (s), 126.3 (s), 113.3 (s), 71.1 (s), 54.5 (s), 54.4 (s), 44.6 (s), 42.6 (s), 18.8 (s); HRMS (ESI): m/z calcd for $C_{22}H_{26}DN_2O_4S$ [(M+H)$^+$]: 416.1754, found: 416.1759.

In summary, the studies above demonstrates an NHC promoted reversible hydrogen-deuterium exchange (HDE) reaction for the efficient synthesis of synthetically valued C-1 deuterated aldehydes. A new reactivity of NHC catalysis was successfully implemented to overcome the overwhelmingly kinetically favorable, irreversible benzoin condensation reaction and achieved the desired thermodynamic reversibility to drive the formation of desired deuterated products. The unrivaled capacities of the NHC catalysed reversible processes was demonstrated by directly converting aldehydes to C-1 deuterated counterparts using D2O as the deuterium source under mild reaction conditions without requiring additional functionality manipulation and thus with minimal byproduct formation. Furthermore, this operationally simple and cost-effective protocol serves as a general and truly practical approach to a wide variety of 1-D-aldehydes including aryl, alkyl and alkenyl aldehydes, which may be difficult to access by existing methods (a representative cost calculation is shown in Table 5). In addition, the process described herein enables chemoselective late-stage deuterium incorporation into complex, native therapeutic agents and natural products (total 104 examples) with uniformly high levels (>95%) of deuterium incorporation. Thus the process disclosed herein may enable facile access to a wide range of synthetically versatile compounds and accelerate the construction of new deuterated compounds for drug discovery.

TABLE 5

Cost Calculation for the Preparation of Deuterated Benzaldehyde

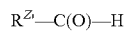

| Compound | Vendor | Cost/g | MW | Quantity for producing 1 g product 7d | Price for producing 1 g product 7d |
|---|---|---|---|---|---|
| (benzaldehyde, PhCHO) | Sigma-Aldrich | $29.80/100 g | 106 | 0.01335 mol × 106 = 1.42 g | $0.298/g × 1.42 g = $0.42 |
| (imidazolinium salt, Dipp-N-N-Dipp, Br⁻) 5o | Self preparation | $40/g | 427.1 | 0.01335 × 10 mol % × 427.1 = 0.57 g | $40/g × 0.57 g = $22.8 |
| D₂O | Sigma-Aldrich | $1,160/1 kg | 20 | 1000 × 1.1/(107 × 70%) = 14.7 g | $1.16/g × 14.7 = $17.05 |
| K₂CO₃ | Fisher | $24.66/500 g | 138 | 0.01335 × 138 = 1.84 g | $0.049/g × 1.84 = $0.09 |
| Toluene (anhydrous) | Sigma-Aldrich | $45/2 L | 92 | 3.3 mL | 0.0225/mL × 3.3 = $0.074 |
| (benzaldehyde-d, PhCOD) | Sigma-Aldrich | $570/g | 107 | | |
| (benzaldehyde-d, PhCOD) | Method herein | $40.43/gᵃ | 107 | | |

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

For reasons of completeness, various aspects of the invention are set out in the following numbered clauses:

Clause 1. A method for preparing a deuterated aldehyde of formula $$R^Z\text{—C(O)-D}$$

wherein
$R^Z$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^a$, and $R^Z$ is optionally deuterated;

$R^a$ at each occurrence is independently halogen, —CN, —OH, nitro, —O-benzyl, —NH(t-butoxycarbonyl), —NH(benzyloxycarbonyl), alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl, wherein the alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl is optionally substituted;

the method comprising:
contacting an aldehyde of formula $$R^{Z1}\text{—C(O)—H}$$

with an N-heterocyclic carbene catalyst in a solvent comprising D₂O, thereby producing the deuterated aldehyde,
  wherein $R^{Z1}$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^b$;

$R^b$ at each occurrence is independently halogen, —CN, —OH, nitro, —O-benzyl, —NH(t-butoxycarbonyl), —NH(benzyloxycarbonyl), alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl, wherein the alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl is optionally substituted.

Clause 2. The method of clause 1, wherein $R^Z$ is an optionally substituted aryl or an optionally substituted heteroaryl.

Clause 3. The method of clause 1, wherein $R^Z$ is an optionally substituted alkenyl or an optionally substituted cycloalkenyl.

Clause 4. The method of clause 1, wherein $R^Z$ is an optionally substituted alkyl or an optionally substituted cycloalkyl.

Clause 5. The method of any one of clauses 1-4, wherein $R^Z$ and $R^{Z1}$ are the same.

Clause 6. The method of any one of clauses 1-5, wherein the solvent further comprises an organic solvent.

Clause 7. The method of any one of clauses 1-6, wherein the N-heterocyclic carbene catalyst is a compound of formula (I)

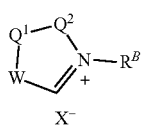

(I)

wherein
W is S or $NR^A$
$Q^1$ is $CR^C$ or N;
$Q^2$ is $CR^D$ or N; or
$Q^1$-$Q^2$ is $CR^{x1}R^{y1}$—$CR^{x2}R^{y2}$;
$R^A$ and $R^B$ are each independently an optionally substituted alkyl, an optionally substituted cycloalkyl, an optionally substituted aryl, an optionally substituted heteroaryl, or an optionally substituted heterocyclyl;
$R^C$, and $R^D$ are each independently hydrogen, an optionally substituted alkyl, an optionally substituted cycloalkyl, an optionally substituted aryl, an optionally substituted heteroaryl, or an optionally substituted heterocyclyl;
$R^A$ and $R^C$, $R^B$ and $R^D$, and/or $R^C$ and $R^D$ alternatively together with the N or C atoms to which they are attached form a ring;
$R^B$ alternatively is an alkylene forming a dimer;
$R^{x1}$, $R^{y1}$, $R^{x2}$, and $R^{y2}$ are each independently hydrogen or alkyl; and
$X^-$ is counter ion.

Clause 8. The method of clause 7, wherein W is $NR^A$.

Clause 9. The method of clause 8, wherein
$R^A$ and $R^B$ are each independently an optionally substituted alkyl, an optionally substituted cycloalkyl, an optionally substituted aryl, an optionally substituted heteroaryl, or an optionally substituted heterocyclyl; and $R^C$ and $R^D$ are each independently hydrogen, an optionally substituted alkyl, an optionally substituted cycloalkyl, an optionally substituted aryl, an optionally substituted heteroaryl, or an optionally substituted heterocyclyl.

Clause 10. The method of clause 8, wherein $R^A$ and $R^C$, $R^B$ and $R^D$, or $R^C$ and $R^D$ together with the N or C atoms to which they are attached form a ring.

Clause 11. The method of clause 7, wherein $Q^1$-$Q^2$ is $CR^{x1}R^{y1}$—$CR^{x2}R^{y2}$.

Clause 12. The method of clause 11, wherein $R^A$ and $R^B$ are each independently an optionally substituted aryl.

Clause 13. The method of clause 7, wherein the N-heterocyclic carbene catalyst is a compound of formula (I-a), (I-b), (I-c), or (I-d)

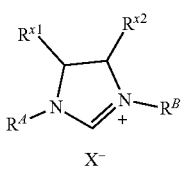

(I-a)

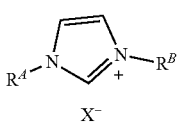

(I-b)

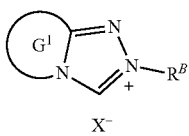

(I-c)

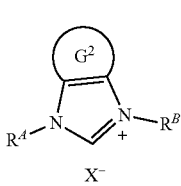

(I-d)

wherein
$G^1$ is an optionally substituted heterocycle; and
$G^2$ is an optionally substituted aryl.

Clause 14. The method of any one of clauses 7-13, wherein $X^-$ is $Cl^-$, $Br^-$, $I^-$, or $BF_4^-$.

Clause 15. The method of clause 1 or clause 7, wherein the N-heterocyclic carbene catalyst is selected from the group consisting of

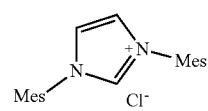

5a

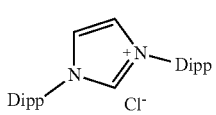

5b

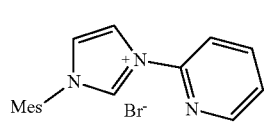

5c

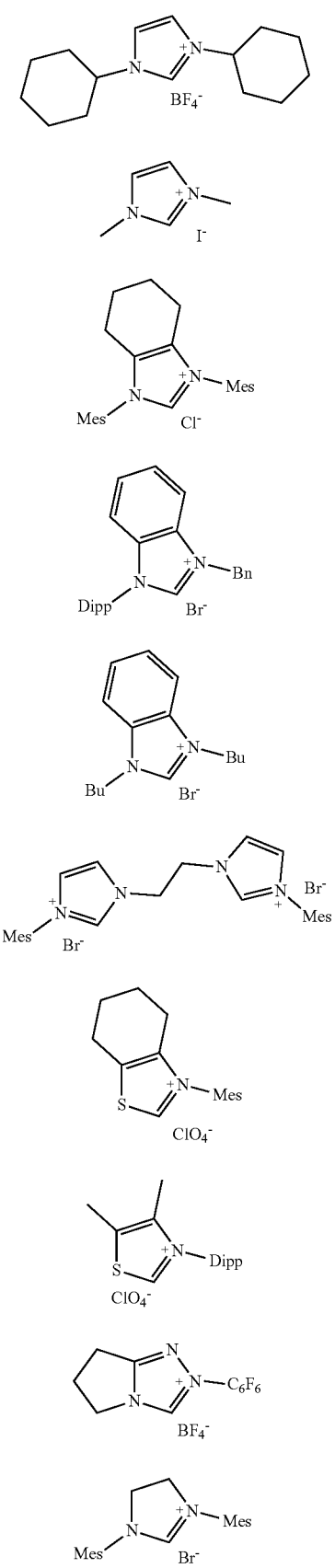
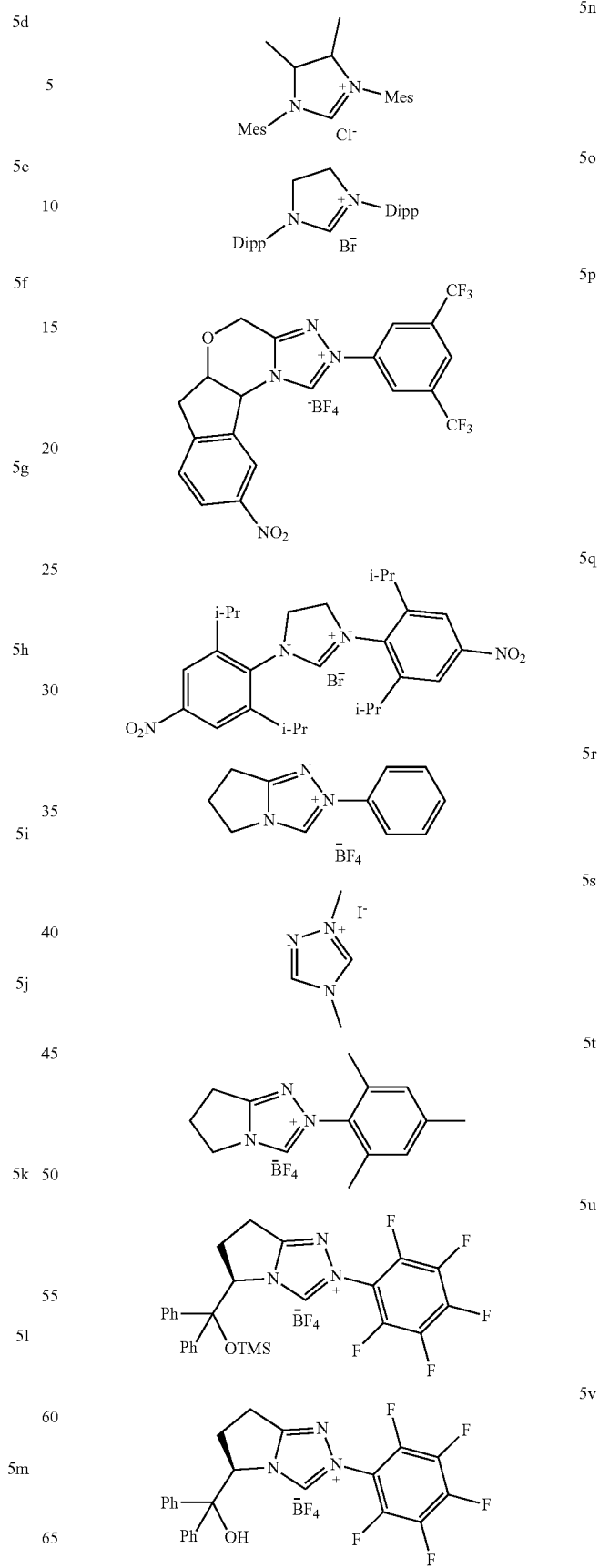

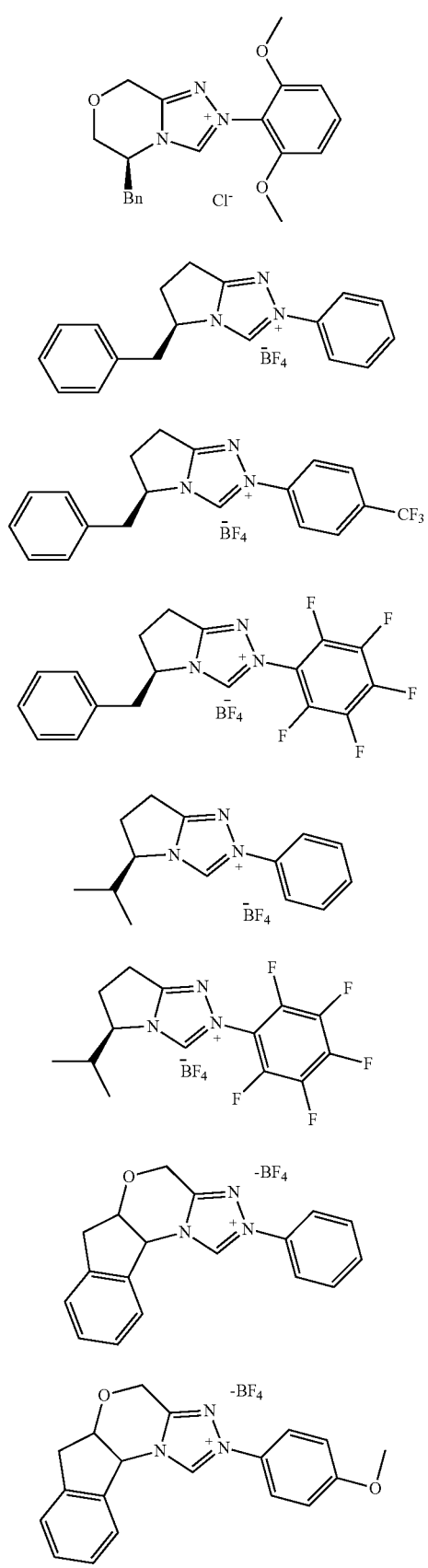
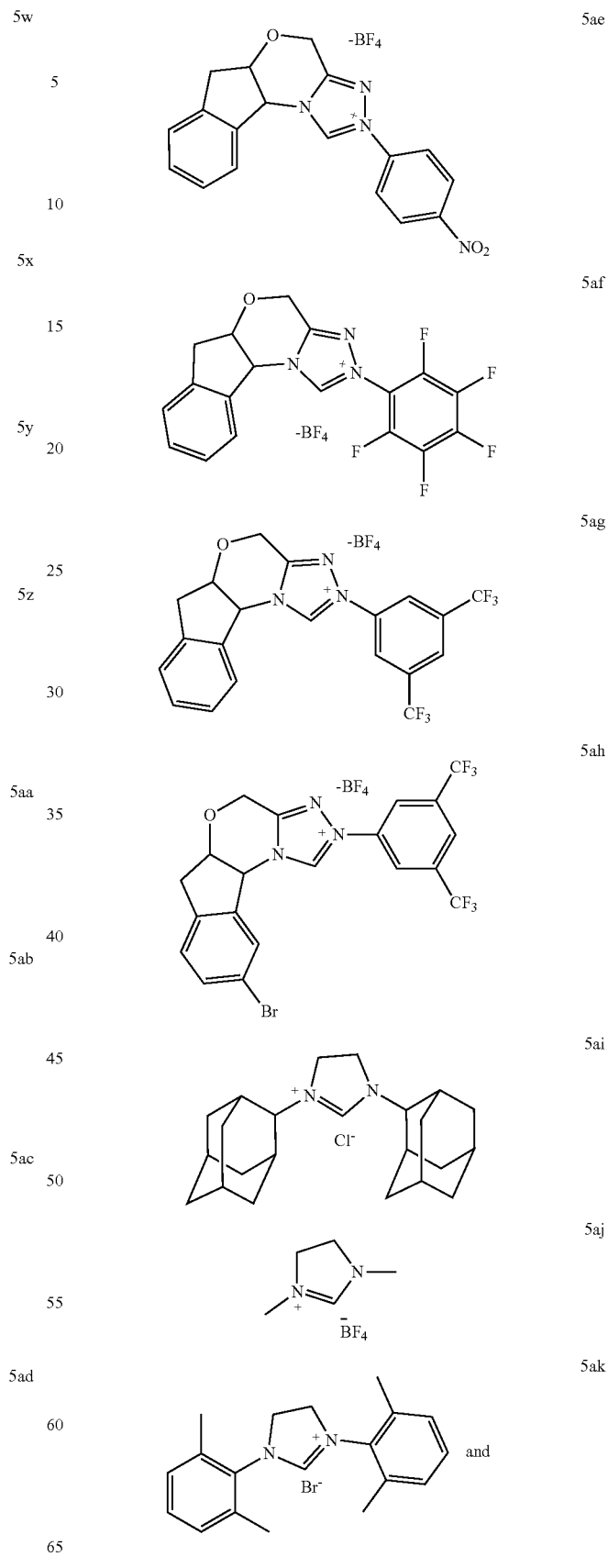

-continued

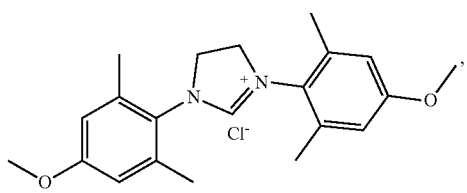
5al in which Mes is

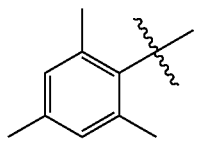 [SMILES: *c1c(C)cc(C)cc1C]

and Dipp is

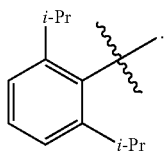

Clause 16. The method of clause 13, wherein the N-heterocyclic carbene catalyst is a compound of formula (I-a) or (I-c), and wherein $R^Z$ is an optionally substituted aryl or an optionally substituted heteroaryl.

Clause 17. The method of clause 16, wherein the N-heterocyclic carbene catalyst is

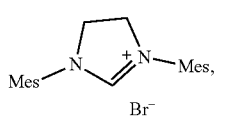
5m

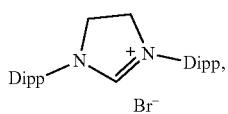
5o

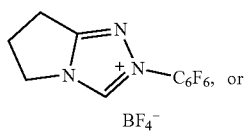
5l

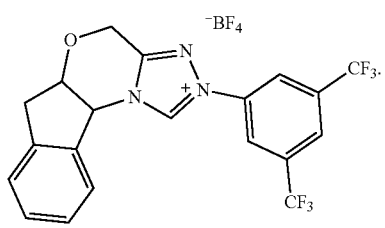
5ag

Clause 18. The method of any one of clauses 16-17, wherein $R^Z$ is

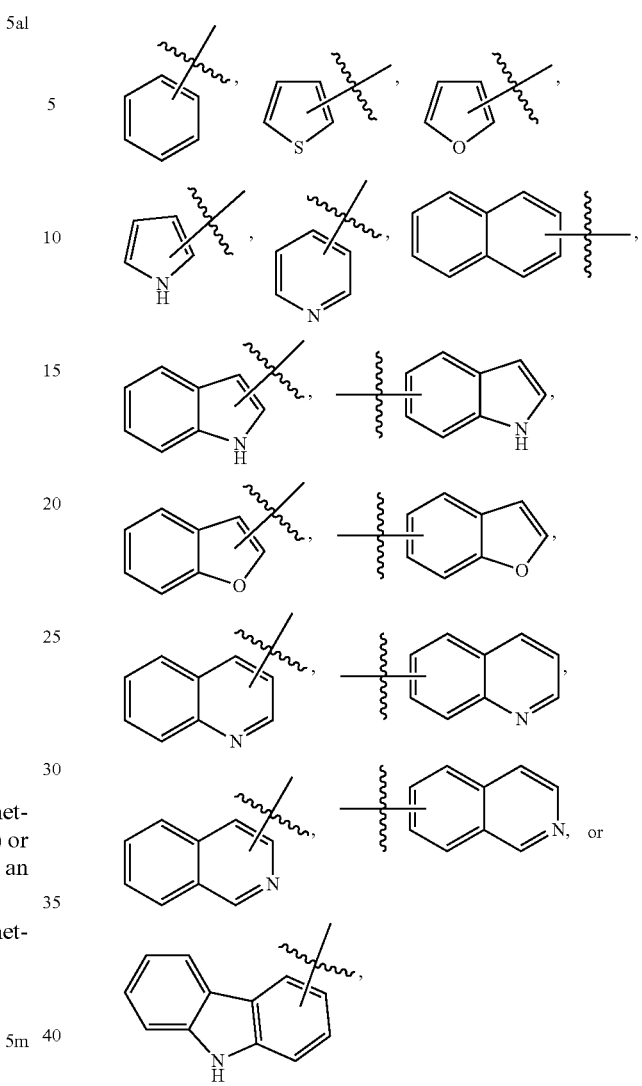

each of which is optionally substituted.

Clause 19. The method of clause 13, wherein the N-heterocyclic carbene catalyst is a compound of formula (I-c), and wherein $R^Z$ is an optionally substituted alkenyl or an optionally substituted cycloalkenyl.

Clause 20. The method of clause 19, wherein N-heterocyclic carbene catalyst is

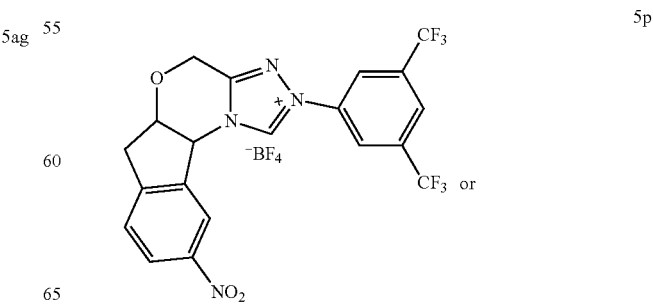
5p

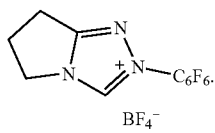

Clause 21. The method of any one of clauses 19-20, wherein $R^Z$ is

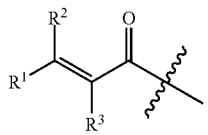

wherein
$R^1$ and $R^2$ are independently hydrogen, alkyl, aryl, or heteroaryl, wherein the alkyl, aryl, and heteroaryl are optionally substituted; and
$R^3$ is hydrogen, alkyl, or aryl, wherein the alkyl and aryl are optionally substituted, or
$R^1$ and $R^3$ together with the carbon atoms to which they are attached form a 6- to 8-membered ring, which is optionally substituted.

Clause 22. The method clause 13, wherein the N-heterocyclic carbene catalyst is a compound of formula (I-a) or (I-c), and wherein $R^Z$ is an optionally substituted alkyl or an optionally substituted cycloalkyl.

Clause 23. The method of clause 22, wherein N-heterocyclic carbene catalyst is

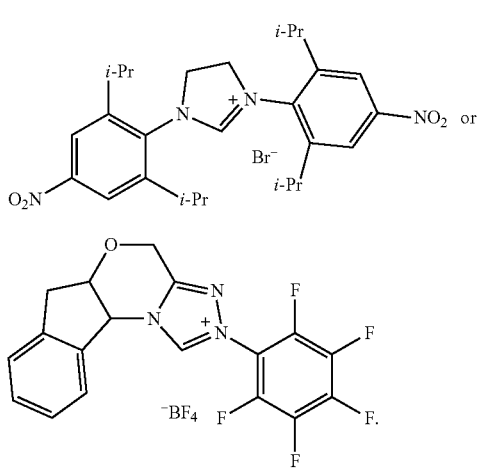

Clause 24. The method of any one of clauses 22-23, wherein $R^Z$ is $R^W$—$(CR^{aa}R^{bb})_p$—, wherein
$R^W$ is hydrogen, deuterium, —NH(benzyloxycarbonyl), alkenyl, alkynyl, aryl, —C(O)-aryl, heteroaryl, or heterocyclyl, wherein the alkenyl, alkynyl, aryl, —C(O)-aryl, heteroaryl, and heterocyclyl are optionally substituted;
$R^{aa}$ and $R^{bb}$ at each occurrence are independently hydrogen, deuterium, alkyl, —NH(t-butoxycarbonyl), or —O-benzyl; and
p is 1, 2, 3, 4, 5, 6, 7, or 8.

Clause 25. The method of any one of clauses 1-24, further comprising isolating the produced deuterated aldehyde.

Clause 26. The method of any one of clauses 1-25, wherein in the level of deuterium incorporation of the —C(O)-D moiety is at least 90%.

Clause 27. The method of clause 26, wherein in the level of deuterium incorporation of the —C(O)-D moiety is at least 95%.

Clause 28. A deuterated aldehyde produced by the method of any one of clauses 1-27.

Clause 29. An isolated deuterated aldehyde produced by the method of clause 25.

REFERENCES

1. Adcock, H. V., Chatzopoulou, E. & Davies, P. W. Divergent C—H insertion-cyclization cascades of N-allyl ynamides. Angew. Chem. Int. Ed. 54, 15525-15529 (2015).
2. Aidouni, A., Bendahou, S., Demonceau, A., Delaude, L. J. Comb. Chem. 10, 886-892 (2008).
3. Atzrodt, J., Derdau, V., Kerr, W. J. & Reid, M. C—H Functionalization for hydrogen isotope exchange. Angew. Chem. Int. Ed. 57, 3022-3047 (2018).
4. Atzrodt, J., Derdau, V., Kerr, W. J. & Reid, M. Deuterium- and tritium-labelled compounds: Applications in the life sciences. Angew. Chem. Int. Ed. 57, 1758-1784 (2018).
5. Baragwanath, L.; Christopher, A., Rose, C. A., Zeitler, K., Connon, S. J. J. Org. Chem. 74, 9214-9217 (2009).
6. Bergin, E. Deoxygenative deuteration. Nat. Catal. 1, 898-898 (2018)
7. Breslow, R. On the mechanism of thiamine action. IV. evidence from studies on model systems. J. Am. Chem. Soc. 80, 3719-3726 (1958).
8. Bugaut, X. & Glorius, F. Organocatalytic umpolung: N-heterocyclic carbenes and beyond. Chem. Soc. Rev. 2012, 41, 3511-3522.
9. Burstein, C. & Glorius, F. Organocatalyzed conjugate umpolung of α, β-unsaturated aldehydes for the synthesis of γ-butyrolactones. Angew. Chem. Int. Ed. 43, 6205-6208 (2004).
10. Cao, C. et al. Synth. Commun. 42, 380-387 (2012).
11. Chandrasekhar, S., Srimannarayana, M. Synth. Commun. 39, 4473-4478 (2009).
12. Chang, C.-C. et al. Bioorg. Med. Chem. 18, 3147-3158 (2010).
13. Cheng C.-H., Karthikeyan, J., Huang, P.-L. US Patent 20120142934, 2012.
14. Choudary, B. M., Chowdari, N. S., Madhi, S., Kantam, M. L. J. Org. Chem. 68, 1736-1746 (2003).
15. Craighead, M et al. WO patent 2012063085, 2012.
16. DiRocco, D. A., Oberg, K. M., Dalton, D. M., Rovis, T. J. Am. Chem. Soc. 131, 10872-10874 (2009).
17. Dubost, E.; Babin, V.; Benoist, F et al. Org. Lett. 20, 6302-6305 (2018).
18. Enders, D., Niemeier, O. & Henseler, A. Organocatalysis by N-heterocyclic carbenes. Chem. Rev. 107, 5606-5655 (2007).
19. Erkkila, A., Majander, I. & M. Pihko, P. M. Iminium catalysis. Chem. Rev. 107, 5416-5470 (2007).
20. Fang, W., Jiang, J., Xu, Y., Zhou, J., Tu, T. Tetrahedron, 69, 673-679 (2013).
21. Flanigan, D. M., Romanov-Michailidis, F., White, N. A. & Rovis, T. Organocatalytic reactions enabled by N-heterocyclic carbenes. Chem. Rev. 115, 9307-9387 (2015).
22. Fujiwara, Y., Iwata, H., Sawama, Y., Monguchi, Y. & Sajiki, H. Method for regio-, chemo- and stereoselective deuterium labeling of sugars based on ruthenium-catalysed C—H bond activation. Chem. Commun. 46, 4977-4979 (2010).
23. Ghosh, S., Saikh, F., Das, J., Pramanik, A. K Tetrahedron Lett. 54, 58-62 (2013).
24. Hagiya, K. WO patent 2012105667, 2012.
25. Hale, L. V. A. & Szymczak, N. K. Stereoretentive deuteration of α-chiral amines with D2O. J. Am. Chem. Soc. 138, 13489-13492 (2016).
26. Hirano, K., Urban, S., Wang, C., Glorius, F. Org. Lett. 11, 1019-1022 (2009).
27. Ibrahim, M. Y. S. & Denmark, S. E. Palladium/rhodium cooperative catalysis for the production of aryl aldehydes and their deuterated analogues using the water-gas shift reaction. Angew. Chem. Int. Ed. 57, 10362-10367 (2018).
28. Iglesias, M. et al. Organometallics 27, 3279-3289 (2008).
29. Isbrandt, E. S., Vandavasi, J. K., Zhang, W., Jamshidi, M. P. & Newman, S. G. Catalytic deuteration of aldehydes with D2O. Synlett 28, 2851-2854 (2017).
30. Kerr, M. S., Alaniz, J. R., Rovis, T. J. Org. Chem. 70, 5725-5728 (2005).
31. Kerr, W. J., Reid, M. & Tuttle, T. Iridium-catalyzed formyl-selective deuteration of aldehydes. Angew. Chem. Int. Ed. 56, 7808-7812 (2017).
32. Kerr, W. J., Reid, M., Tuttle, T. Angew. Chem. Int. Ed. 56, 7808-7812 (2017).
33. Koniarczyk, J., Hesk, D., Overgard, A., Davies, I. W. & McNally, A. A general strategy for site-selective incorporation of deuterium and tritium into pyridines, diazines and pharmaceuticals. J. Am. Chem. Soc. 140, 1990-1993 (2018).
34. Kyan, R., Sato, K., Mase, N., Watanabe, N. Narumi, T. Org. Lett. 19, 2750-2753 (2017).
35. Lane, T. K.; D'Souza, B. R., Louie, J. J. Org. Chem. 77, 7555-7563 (2012).
36. Laszio, C et al. WO patent 2007148141, 2007.
37. Lee, J., Oh, Y., Choi, Y. K., Choi, E., Kim, K., Park, J., Kim, M. J. ACS Cat. 5, 683-689 (2014).
38. Leuthauler, S., Schmidts, V., Thiele, C. M., Plenio, H. Chem. Eur. J. 14, 5465-481 (2008).
39. Li, X. et al. One-pot synthesis of deuterated aldehydes from arylmethyl halides. Org. Lett. 20, 1712-1715 (2018).
40. Liang, X. & Duttwyler, S. Efficient Brønsted-acid-catalyzed deuteration of arenes and their transformation to functionalized deuterated products. Asian J. Org. Chem. 6, 1064-1071 (2017).
41. Liu, F., Bugaut, X., Schedler, M., Fröhlich, R., Glorius, F. Angew. Chem. Int. Ed. 50, 12626-12630 (2011).
42. Liu, Q., Perreault, S., Rovis, T. J. Am. Chem. Soc. 130, 14066-14067 (2008).
43. Loh, Y. Y. et al. Photoredox-catalyzed deuteration and tritiation of pharmaceutical compounds. Science 358, 1182-1187 (2017).
44. Mahatthananchai, J. & J. W. Bode, J. W. On the mechanism of N-heterocyclic carbene-catalyzed reactions involving acyl azoliums. Acc. Chem. Res. 47, 696-707 (2014).
45. Mojtahedi, M. M., Akbarzadeh, E., Sharifi, R. & Abaee, M. S. Lithium bromide as a flexible, mild, and recyclable reagent for solvent-free Cannizzaro, Tishchenko, and Meerwein-Ponndorf-Verley reactions. Org. Lett., 9, 2791-2793 (2007).
46. Mukherjee, S., Yang, J. W., Hoffmann, S. & List, B. Asymmetric enamine catalysis. Chem. Rev. 107, 5471-5569 (2007).
47. Mullard, A. Deuterated drugs draw heavier backing. Nat. Rev. Drug Discovery 15, 219-221 (2016).
48. Namitharan, K. et al Metal and carbene organocatalytic relay activation of alkynes for stereoselective reactions. Nat. Commun. 5, 3982 (2014).
49. Olsen, E. P. K., Singh, T., Harris, P., Andersson, P. G. & Madsen, R. Experimental and theoretical mechanistic investigation of the iridium-catalyzed dehydrogenative decarbonylation of primary alcohols. J. Am. Chem. Soc. 137, 834-842 (2015).
50. Phillips, E. M., Chan, A. & Scheidt, K. A. Discovering new reactions with N-heterocyclic carbene catalysis. Aldrichimica Acta 42, 55-66 (2009).
51. Piel, I., Pawelczyk, M. D., Hirano, K., Fröhlich, R., Glorius, F. Eur. J. Org. Chem. 28, 5475-5484 (2011).
52. Pirali, T., Serafini, M., Cargnin, S. & Genazzani, A. A. Applications of deuterium in medicinal chemistry, J. Med. Chem. 62, 5276-5297 (2019).
53. Puleo, T. R., Strong, A. J. & Bandar, J. S. Catalytic α-selective deuteration of styrene derivatives. J. Am. Chem. Soc. 141, 1467-1472 (2019).
54. Ren, Q., Li, M., Yuana, L. & Wang, J. Recent advances in N-heterocyclic carbene catalyzed achiral synthesis. Org. Biomol. Chem. 15, 4731-4749 (2017).
55. Roche, S. P.; Teyssot, M.-L., Gautier, A. Tetrahedron Lett. 51, 1265-1268 (2010).
56. Romanov-Michailidis, F., Besnard, C., Alexakis, A. Org. Lett. 14, 4906-4909 (2012).
57. Rovis, T. Harit, Vora, H. U. US patent 2011224431, 2011.
58. Sattler, A. Hydrogen/deuterium (H/D) exchange catalysis in alkanes. ACS Catal. 8, 2296-2312 (2018).
59. Schmidt, C. First deuterated drug approved. Nat. Biotechnol. 35, 493-494 (2017).
60. Shi, X. X., Liu, S. L., Xu, W., Xu, Y. L. Tetrahedron: Asymmetry, 19, 435-442 (2008).
61. Sohn, S. S., Rosen, E. L., & Bode, J. W. N-Heterocyclic carbene-catalyzed generation of homoenolates: γ-butyrolactones by direct annulations of enals and aldehydes. J. Am. Chem. Soc. 126, 14370-14371 (2004).
62. Spletstoser, J. T., White, J. M. & Georg, G. I. One-step facile synthesis of deuterium labeled aldehydes from tertiary amides using Cp2Zr(D)Cl. Tetrahedron Lett. 45, 2787-2789 (2004).
63. Spletstoser, J. T., White, J. M., Tunoori, A. R. & Georg, G. I. Mild and selective hydrozirconation of amides to aldehydes using Cp2Zr(H)Cl: scope and mechanistic insight. J. Am. Chem. Soc. 129, 3408-3419 (2007).
64. Taddei, M. & Mann, A. Hydroformylation for organic synthesis in Topics in Current Chemistry; Springer: Berlin, 2013; Vol. 342.
65. Takikawa, H., Suzuki, K. Org. Lett. 9, 2713-2716 (2007).
66. Tang, P., Wang, W., Ritter, T. J. Am. Chem. Soc. 133, 11482-11484 (2011).
67. Türkmen, H., Qtinkaya, B. J. Organomet. Chem. 691, 3749-3759 (2006).
68. Valdés, H., Poyatos, M., Ujaque, G., Peris, E. Chem. Eur. J. 21, 1578-1588 (2015).
69. Valero, M., Weck, R., Ggssregen, S., Atzrodt, J. & Derdau, V. Highly selective directed iridium-catalyzed hydrogen isotope exchange reactions of aliphatic amides. Angew. Chem. Int. Ed. 57, 8159-8163 (2018).
70. Wang, X. et al General and practical potassium methoxide/disilane-mediated dehalogenative deuteration of (hetero)arylhalides. J. Am. Chem. Soc. 140, 10970-10974 (2018).

71. Yamada, S.; Yoshioka, R., Shibatani, T. Chem. Pharm. Bull. 45, 1922-1927 (1997).
72. Yang, Q. CN patent 103951568, 2014.
73. Yu, R. P., Hesk, D., Rivera, N., Pelczer, I. & Chirik, P. J. Iron-catalysed tritiation of pharmaceuticals. Nature 529, 195-199 (2016).
74. Zhang, M., Yuan, X., Zhu, C. & Xie, J. Deoxygenative deuteration of carboxylic acids with D2O. Angew. Chem. Int. Ed. 58, 312-316 (2019).
75. Zheng, Y. et al. J. Am. Chem. Soc. 139, 4322-4325 (2017).

What is claimed is:

1. A method for preparing a deuterated aldehyde of formula

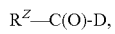

wherein
$R^Z$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^a$, and $R^Z$ is optionally deuterated;
$R^a$ at each occurrence is independently halogen, —CN, —OH, nitro, —O-benzyl, —NH(t-butoxycarbonyl), —NH(benzyloxycarbonyl), alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl, wherein the alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl is optionally substituted; and
the level of deuterium incorporation of the —C(O)-D moiety is at least 90%;
the method comprising:
contacting an aldehyde of formula

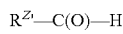

with an N-heterocyclic carbene catalyst in a solvent comprising D2O, thereby producing the deuterated aldehyde,
wherein $R^{Z1}$ is alkyl, alkenyl, cycloalkyl, cycloalkenyl, aryl, heteroaryl, or heterocyclyl; wherein the alkyl, alkenyl, cycloalkyl, cycloalkenyl, aryl, heteroaryl, and heterocyclyl are each optionally substituted with one or more $R^b$;
$R^b$ at each occurrence is independently halogen, —CN, —OH, nitro, —O-benzyl, —NH(t-butoxycarbonyl), —NH(benzyloxycarbonyl), alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl, wherein the alkyl, alkenyl, alkynyl, alkoxy, —OC(O)-alkyl, —C(O)O-alkyl, —C(O)NH-alkyl, cycloalkyl, aryl, —O-aryl, —C(O)-aryl, heteroaryl, or heterocyclyl is optionally substituted, and
wherein the N-heterocyclic carbene catalyst is a compound of formula (I)

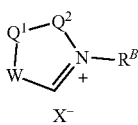

(I)

wherein
W is S or $NR^A$;
"-" in $Q^1$-$Q^2$ is a single bond, wherein $Q^1$-$Q^2$ is $CR^{x1}R^{y1}$—$CR^{x2}R^{y2}$;
$R^A$ and $R^B$ are each independently an optionally substituted alkyl, an optionally substituted cycloalkyl, an optionally substituted aryl, an optionally substituted heteroaryl, or an optionally substituted heterocyclyl;
$R^C$, and $R^D$ are each independently hydrogen, an optionally substituted alkyl, an optionally substituted cycloalkyl, an optionally substituted aryl, an optionally substituted heteroaryl, or an optionally substituted heterocyclyl;
$R^A$ and $R^C$, $R^B$ and $R^D$, and/or $R^C$ and $R^D$ alternatively together with the N or C atoms to which they are attached form a ring;
$R^B$ alternatively is an alkylene forming a dimer;
$R^{x1}$, $R^{y1}$, $R^{x2}$, and $R^{y2}$ are each independently hydrogen or alkyl; and
$X^-$ is counter ion.

2. The method of claim 1, wherein $R^Z$ is an optionally substituted aryl or an optionally substituted heteroaryl.

3. The method of claim 1, wherein $R^Z$ is an optionally substituted alkenyl or an optionally substituted cycloalkenyl.

4. The method of claim 1, wherein $R^Z$ is an optionally substituted alkyl or an optionally substituted cycloalkyl.

5. The method of claim 1, wherein $R^Z$ and $R^{Z1}$ are the same.

6. The method of claim 1, wherein the solvent further comprises an organic solvent.

7. The method of claim 1, wherein W is $NR^A$.

8. The method of claim 7, wherein
$R^A$ and $R^B$ are each independently an optionally substituted alkyl, an optionally substituted cycloalkyl, an optionally substituted aryl, an optionally substituted heteroaryl, or an optionally substituted heterocyclyl; and
$R^C$ and $R^D$ are each independently hydrogen, an optionally substituted alkyl, an optionally substituted cycloalkyl, an optionally substituted aryl, an optionally substituted heteroaryl, or an optionally substituted heterocyclyl.

9. The method of claim 7, wherein $R^A$ and $R^C$, $R^B$ and $R^D$, or $R^C$ and $R^D$ together with the N or C atoms to which they are attached form a ring.

10. The method of claim 1, wherein $R^A$ and $R^B$ are each independently an optionally substituted aryl.

11. The method of claim 1, wherein the N-heterocyclic carbene catalyst is a compound of formula (I-a)

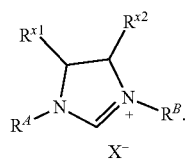

(I-a)

12. The method of claim 11, wherein $R^Z$ is an optionally substituted aryl or an optionally substituted heteroaryl.

13. The method of claim 12, wherein the N-heterocyclic carbene catalyst is

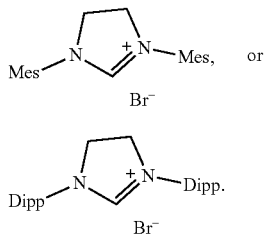

14. The method of claim 12, wherein $R^Z$ is

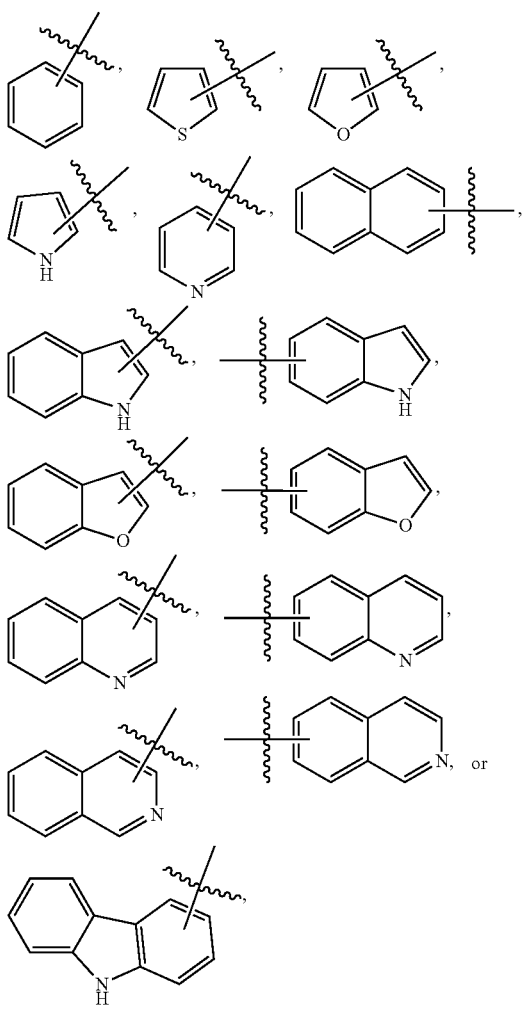

each of which is optionally substituted.

15. The method of claim 11, wherein $R^Z$ is an optionally substituted alkenyl or an optionally substituted cycloalkenyl.

16. The method of claim 15, wherein $R^Z$ is

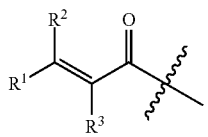

wherein $R^1$ and $R^2$ are independently hydrogen, alkyl, aryl, or heteroaryl, wherein the alkyl, aryl, and heteroaryl are optionally substituted; and $R^3$ is hydrogen, alkyl, or aryl, wherein the alkyl and aryl are optionally substituted, or $R^1$ and $R^3$ together with the carbon atoms to which they are attached form a 6- to 8-membered ring, which is optionally substituted.

17. The method of claim 13, wherein $R^Z$ is an optionally substituted alkyl or an optionally substituted cycloalkyl.

18. The method of claim 17, wherein N-heterocyclic carbene catalyst is

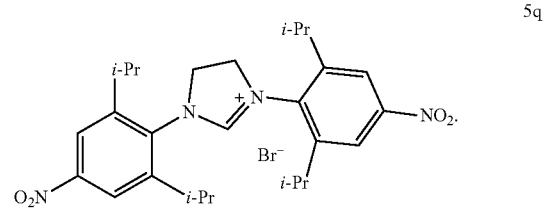

19. The method of claim 17, wherein $R^Z$ is $R^W$—$(CR^{aa}R^{bb})_p$—, wherein $R^W$ is hydrogen, deuterium, —NH(benzyloxycarbonyl), alkenyl, alkynyl, aryl, —C(O)-aryl, heteroaryl, or heterocyclyl, wherein the alkenyl, alkynyl, aryl, —C(O)-aryl, heteroaryl, and heterocyclyl are optionally substituted;

$R^{aa}$ and $R^{bb}$ at each occurrence are independently hydrogen, deuterium, alkyl, —NH(t-butoxycarbonyl), or —O-benzyl; and p is 1, 2, 3, 4, 5, 6, 7, or 8.

20. The method of claim 1, wherein $X^-$ is $Cl^-$, $Br^-$, $I^-$, or $BF^-_4$.

21. The method of claim 1, wherein the N-heterocyclic carbene catalyst is selected from the group consisting of

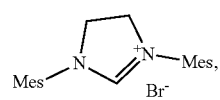

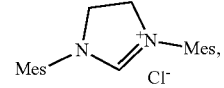

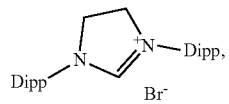

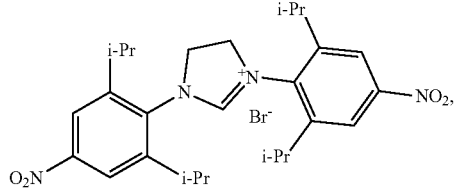

-continued
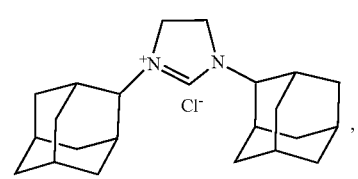
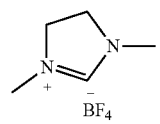
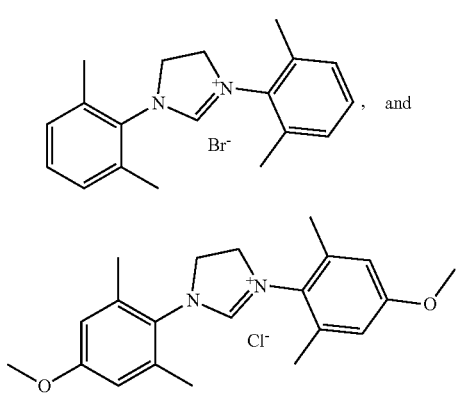
in which Mes is
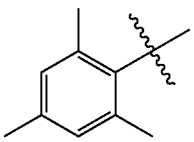 [SMILES: *c1c(C)cc(C)cc1C]
and Dipp is
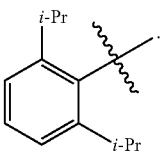 [SMILES: *c1c(C(C)C)cccc1C(C)C]
22. The method of claim 1, further comprising isolating the produced deuterated aldehyde.
23. The method of claim 1, wherein the level of deuterium incorporation of the —C(O)-D moiety is at least 95%.
* * * * *